(12) United States Patent
Sakamoto

(10) Patent No.: US 10,701,740 B2
(45) Date of Patent: Jun. 30, 2020

(54) INFORMATION PROCESSING SYSTEM

(71) Applicant: SHARP KABUSHIKI KAISHA, Sakai, Osaka (JP)

(72) Inventor: Akira Sakamoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 107 days.

(21) Appl. No.: 15/879,894

(22) Filed: Jan. 25, 2018

(65) Prior Publication Data
US 2018/0235017 A1 Aug. 16, 2018

(30) Foreign Application Priority Data

Feb. 15, 2017 (JP) .................................. 2017-026172

(51) Int. Cl.
| | |
|---|---|
| *G06F 3/038* | (2013.01) |
| *G06F 3/0488* | (2013.01) |
| *H04W 76/10* | (2018.01) |
| *H04W 36/00* | (2009.01) |
| *G06F 3/0354* | (2013.01) |

(Continued)

(52) U.S. Cl.
CPC .......... *H04W 76/10* (2018.02); *G06F 3/0383* (2013.01); *G06F 3/0386* (2013.01); *G06F 3/03545* (2013.01); *G06F 3/041* (2013.01); *G06F 3/0488* (2013.01); *G06F 3/04883* (2013.01); *H04W 36/0011* (2013.01); *G06F 2203/0384* (2013.01); *H04W 36/03* (2018.08); *H04W 76/20* (2018.02);

(Continued)

(58) Field of Classification Search
CPC .... G06F 3/03545; G06F 3/0383; G06F 3/041; G06F 3/0416; G06F 3/386; G06F 3/0488; H04B 5/0056; H04W 12/06; H04W 76/30; H04W 36/0011; H04W 36/03; H04W 76/10
USPC ........... 370/310, 311, 350; 455/39; 345/173, 345/179
See application file for complete search history.

(56) References Cited

U.S. PATENT DOCUMENTS 9,374,844 B2 6/2016 Kawasaki
2005/0048952 A1 3/2005 Saito et al.
(Continued)

FOREIGN PATENT DOCUMENTS

JP 2005-079975 A 3/2005
JP 2015-104001 A 6/2015

*Primary Examiner* — Harun Chowdhury
(74) *Attorney, Agent, or Firm* — ScienBiziP, P.C.

(57) ABSTRACT

An input pen includes a switching operation detection unit that detects an operation of switching connection between the input pen and an information processing device, a touch detection unit that detects whether or not the input pen touches the information processing device, and a device connection control unit that controls connection with the information processing device. The information processing device includes a touch information processing unit that detects that the input pen touches and obtains information of the touch position, and a pen connection control unit that controls connection with the input pen. In a case where the switching operation detection unit detects the operation of switching connection of a user and the touch information processing unit detects that the input pen touches within a predetermined time, the connection is established between the input pen and the information processing device which is touched by the input pen.

11 Claims, 33 Drawing Sheets

(51) Int. Cl.
*G06F 3/041* (2006.01)
*H04W 76/20* (2018.01)
*H04W 76/30* (2018.01)
*H04W 84/18* (2009.01)
*H04W 84/12* (2009.01)

(52) U.S. Cl.
CPC ............ *H04W 76/30* (2018.02); *H04W 84/12* (2013.01); *H04W 84/18* (2013.01)

(56) References Cited

U.S. PATENT DOCUMENTS

| 2015/0050879 A1* | 2/2015 | MacDuff ............... H04W 12/06 455/39 |
| 2015/0148097 A1 | 5/2015 | Kawasaki |
| 2017/0220789 A1* | 8/2017 | Raghunath .......... G06F 3/03545 |
| 2018/0129314 A1* | 5/2018 | Yamada ................ G06F 3/0383 |

* cited by examiner

FIG. 4A
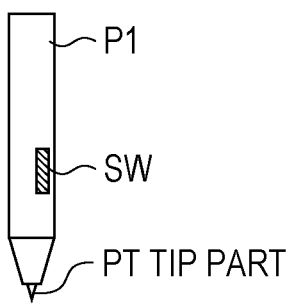
FIG. 4B
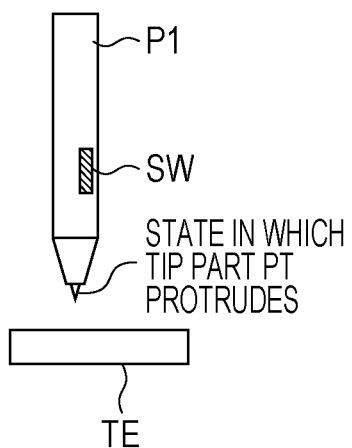
FIG. 4C
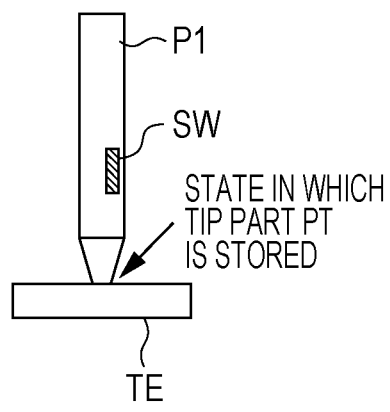
FIG. 5
| 1 | LONG PRESS PERFORMED ON SWITCH OF INPUT PEN |
| 2 | VIBRATION OF INPUT PEN EQUAL TO OR LONGER THAN PREDETERMINED TIME |
| 3 | GESTURE (DRAWING) OPERATION OF INPUT PEN |
| 4 | OPERATION (TOUCH-DOWN) OF CAUSING INPUT PEN TO TOUCH TOUCH PANEL |
| 5 | OPERATION (TOUCH-UP) OF RELEASING TOUCH OF INPUT PEN FROM TOUCH PANEL |
| 6 | OPERATION OF CAUSING INPUT PEN TO APPROACH INFORMATION PROCESSING DEVICE |

FIG. 6

| | Process of connection release from TE which is being connected | Process on side of input pen | | | | | Process on side of information processing device | |
|---|---|---|---|---|---|---|---|---|
| | | Process of switching connection | | Process of requesting connection | | | | |
| | | Detect operation of switching connection (Detection of long press performed on SW) | Detect long press performed on tip part of pen | Detect touch of tip part of pen — Touch-down | Detect touch of tip part of pen — Touch-up | Adjust radio wave output intensity (Lower output intensity in stages) | Detect touch of tip part of pen (Touch-down of pen) | Detect touch release of tip part of pen (Touch-up of pen) |
| First Example | O | O | X | O | X | X | O | X |
| Second Example | O | X | O | X | O | X | X | O |
| Third Example | O | O | X | O | O | X | O | O |
| Fourth Example | O | O | X | X | X | O | X | X |

O Perform    X Do not perform

FIG. 7A

| 71 | PEN IDENTIFICATION INFORMATION (PENID) | P001 | P002 |
|---|---|---|---|
| 73 | PEN DRAWING COLOR | BLACK | RED |
| 74 | PEN THICKNESS | THIN | THICK |

FIG. 7B

| 71 | PEN IDENTIFICATION INFORMATION (PENID) | P001 | P002 | P003 |
|---|---|---|---|---|
| 72 | TIP DETECTION INFORMATION | TOUCH (TOUCH-DOWN) | TOUCH (TOUCH-DOWN) | TOUCH RELEASE (TOUCH-UP) |
| 75 | WRITING PRESSURE INFORMATION | H05 (STRONG) | H01 (WEAK) | H00 (NULL) |
| 77 | MOTION INFORMATION | V02 (VIBRATION EXISTS) | V00 (VIBRATION DOES NOT EXIST) | V05 (STRONG VIBRATION EXISTS) |

FIG. 8A

| DATA IDENTIFIER | CREQ |
|---|---|
| PEN IDENTIFICATION INFORMATION (PENID) | P001 |

FIG. 8B

| DATA IDENTIFIER | CANS |
|---|---|
| DEVICE IDENTIFICATION INFORMATION (TEID) | T101 |
| PEN IDENTIFICATION INFORMATION (PENID) | P001 |

FIG. 8C

| DATA IDENTIFIER | XREQ |
|---|---|
| PEN IDENTIFICATION INFORMATION (PENID) | P001 |
| DEVICE IDENTIFICATION INFORMATION (TEID) | T101 |

FIG. 8D

| DATA IDENTIFIER | XANS |
|---|---|
| DEVICE IDENTIFICATION INFORMATION (TEID) | T101 |
| PEN IDENTIFICATION INFORMATION (PENID) | P001 |

FIG. 9A

| DATA IDENTIFIER | KREQ |
|---|---|
| DEVICE IDENTIFICATION INFORMATION (TEID) | T101 |
| PEN IDENTIFICATION INFORMATION (PENID) | P001 |
| PEN DRAWING COLOR | BLACK |
| PEN THICKNESS | THIN |

FIG. 9B

| DATA IDENTIFIER | KANS |
|---|---|
| PEN IDENTIFICATION INFORMATION (PENID) | P001 |
| DEVICE IDENTIFICATION INFORMATION (TEID) | T101 |

FIG. 9C

| DATA IDENTIFIER | YREQ |
|---|---|
| DEVICE IDENTIFICATION INFORMATION (TEID) | T101 |
| PEN IDENTIFICATION INFORMATION (PENID) | P001 |

FIG. 9D

| DATA IDENTIFIER | YANS |
|---|---|
| PEN IDENTIFICATION INFORMATION (PENID) | P001 |
| DEVICE IDENTIFICATION INFORMATION (TEID) | T101 |
| PEN DRAWING COLOR | BLACK |
| PEN THICKNESS | THIN |

FIG. 9E

| DATA IDENTIFIER | DSND |
|---|---|
| PEN IDENTIFICATION INFORMATION (PENID) | P001 |
| DEVICE IDENTIFICATION INFORMATION (TEID) | T101 |
| TIP DETECTION INFORMATION | TOUCH (TOUCH-DOWN) |
| WRITING PRESSURE INFORMATION | H05 (STRONG) |

FIG. 9F

| DATA IDENTIFIER | DRCV |
|---|---|
| DEVICE IDENTIFICATION INFORMATION (TEID) | T101 |
| PEN IDENTIFICATION INFORMATION (PENID) | P001 |

INFORMATION PROCESSING SYSTEM

BACKGROUND

1. Field

The present disclosure relates to an information processing system, and, particularly, an information processing system that performs connection establishment, connection release, and connection switching between a pen capable of inputting letters and figures on a screen of a display device integrated with a touch panel, and an information processing device which includes the display device.

2. Description of the Related Art

In the related art, a mobile information processing device (hereinafter, also referred to as a mobile terminal), such as a smart phone, a PDA, or a tablet, which includes a touch panel, or an information input device, such as an electronic blackboard, in which a touch panel is incorporated with a large-sized display panel, have been used.

In the devices, generally, a dedicated input pen for writing letters and figures is used. In cases where a user of the input pen performs a process of setting connection of causing the input pen to correspond to the mobile terminal or the like one to one and causes the input pen to touch the display screen, the letters and the like are input and the input letters are almost simultaneously displayed on the display screen at an input position.

In the process of setting connection between the input pen and the mobile terminal, the connection setting is performed between the input pen and the mobile terminal in such a way that, for example, the user performs a predetermined setting operation in a state in which a connection setting screen is displayed in the mobile terminal and the input pen approaches the mobile terminal.

In addition, in a case where it is desired to use the input pen in another mobile terminal different from the mobile terminal being currently connected, the user performs a process of releasing connection (process of connection release) between the input pen and the mobile terminal being currently connected by performing predetermined display and input operations in order to switch to a terminal, in which the input pen will be used, as a connection destination, and newly performs a connection setting process between the input pen and the other mobile terminal.

A process of connection establishment and a process of switching connection are performed between electronic machines which have wireless communication functions.

For example, Japanese Unexamined Patent Application Publication No. 2015-104001 proposes a connection destination switching method in which, in a case where a connection destination of a wireless LAN of a tablet computer which is an electronic machine is switched from a mobile router to a wireless LAN router installed in a user's home, the user previously performs a setting information registration process of associating a BT device (speaker or the like), which exists in the user's home, with the wireless LAN router using a tablet computer, using the BT device, which is capable of performing Bluetooth (registered trademark) communication and which exists in the user's home, and, in a case where the user comes home with the tablet computer, when the tablet computer and the BT device are brought into a state in which Bluetooth communication is enabled, the connection destination of the wireless LAN is automatically switched from the mobile router to the wireless LAN router associated with the BT device.

In addition, Japanese Unexamined Patent Application Publication No. 2005-79975 proposes a wireless network system which suppresses costs in such a way that connection to a fixed base station of wireless communication is made and initial registration is performed between a wireless terminal and the fixed base station in a case where the wireless terminal performs information communication through a network, such as the Internet, a wireless output of the base station is lowered in a case where the fixed base station receives an initial registration request from the wireless terminal, a predetermined initial registration sequence is performed in a case where the wireless terminal exists in an initial registration communication area which has a small communicable distance, the wireless output is returned to a normal output in a case where the sequence is normally performed, and encryption communication is performed.

However, in order to perform a process of setting connection, a process of releasing connection, and a process of switching connection between the input pen and the mobile terminal according to the related art, a complicated input operation, such as an operation of displaying a setting screen or an operation of inputting setting information, which is performed by the user and which demands labors and time, is demanded in both a terminal on which connection release will be performed and a terminal on which connection setting will be performed, and thus operational loads of the user is large.

In addition, for example, in a case where a teacher and respective students possesses terminals, which are capable of inputting information, such as solutions, using own input pens, in a classroom which includes one teacher and a plurality of students, there is a case where the teacher goes around positions of the respective students while possessing his/her input pen, views display screens of the terminals of the students, and performs input, such as grading or correction, using the input pen of the teacher. In this case, it is demanded to perform the process of switching connection between the input pen of the teacher and the terminals of the respective students every time.

In a case where a complicated input operation, which demands labors and time, is demanded to perform the process of switching connection, operational loads of the teacher is large, and thus it is not possible to perform rapid individual instructions using correction or the like.

In Japanese Unexamined Patent Application Publication No. 2015-104001, the BT device, which is capable of performing Bluetooth communication that is different from the wireless LAN communication, is demanded to switch the connection destination of the wireless LAN and, in addition, it is demanded to previously perform the setting information registration process of associating the BT device, accompanied by the setting input operation of the user, with a connection machine (router) of the wireless LAN, and thus there are problems from viewpoints of reduction of costs, which are desired to switch the connection destination of the wireless communication, and reduction of user's loads.

Furthermore, as disclosed in Japanese Unexamined Patent Application Publication No. 2005-79975, it is possible to perform a process of connection establishment between two wireless terminals by lowering the wireless output. However, even in a situation in which a terminal other than the two wireless terminals does not exist, it is demanded that the two wireless terminals desired to be connected exist in a predetermined communicable area. In contrast, in a situation in which a plurality of wireless terminals exist, it is demanded to limit a radius of the communicable area to be considerable small such that a terminal which is not related to the two wireless terminals does not enter the communicable area.

SUMMARY

It is desirable to provide an information processing system which is capable of making a process of switching connection between an input pen and an information processing device be efficient and reducing operational loads of a user in a case where one input pen is used in a plurality of information processing devices.

According to an aspect of the disclosure, there is provided an information processing system which includes an input pen and an information processing device and inputs information using the input pen, in which the input pen includes a switching operation detection unit that detects an operation of switching connection between the input pen and the information processing device; a touch detection unit that detects whether or not the input pen is in a state in which the input pen touches the information processing device; a storage unit that stores predetermined information; and a device connection control unit that controls connection with the information processing device, in which the information processing device includes a display unit that displays information; an input unit that is disposed to overlap the display unit and to which information of a position touched by the input pen is input; a touch information processing unit that detects that the input pen touches the information processing device and obtains information of a touch position; and a pen connection control unit that controls connection with the input pen, and in which, in a case where the switching operation detection unit detects an operation of switching connection performed by a user and the touch information processing unit detects that the input pen touches an information processing device within a predetermined time, the device connection control unit and the pen connection control unit wirelessly communicate a part or all of the predetermined information stored in the storage unit of the input pen and predetermined connection information, thereby establishing connection between the input pen and the information processing device which is touched by the input pen.

According to another aspect of the disclosure, there is provided a method for switching connection between an input pen and an information processing device in an information processing system which includes the input pen and the information processing device, the input pen including a switching operation detection unit that detects an operation of switching connection between the input pen and the information processing device, and a device connection control unit that controls connection with the information processing device, the information processing device including a touch information processing unit that detects that the input pen touches the information processing device and obtains information of a touch position, and a pen connection control unit that controls connection with the input pen, the method including: causing the switching operation detection unit to detect a predetermined operation of switching connection which is performed by a user in the input pen; causing the device connection control unit to wirelessly transmit a connection request in a case where the operation of switching connection is detected; causing the information processing device to check reception of the connection request; causing the touch information processing unit to detect that the input pen touches the information processing device in a case where the connection request is received; causing the pen connection control unit to wirelessly transmit a connection response after it is detected that the input pen touches the information processing device; and causing the device connection control unit to check reception of the connection response within a predetermined time after the operation of switching connection is detected, in which, in a case where the connection response is received, connection is established between the input pen and the information processing device which is touched by the input pen.

BRIEF DESCRIPTION OF THE DRAWINGS

FIGS. 4A to 4C are explanatory diagrams illustrating an example of the input pen according to the present disclosure;

FIG. 5 is an explanatory diagram illustrating an example of an operation of switching connection of the input pen according to the present disclosure;

FIG. 6 is an explanatory diagram illustrating an example of a process performed in a case of switching connection of the input pen according to the present disclosure;

FIGS. 7A and 7B are explanatory diagrams illustrating an example of information used in the present disclosure;

FIGS. 8A to 8D are explanatory diagrams illustrating an example of information which is communicated between the input pen and the information processing device according to the present disclosure;

FIGS. 9A to 9F are explanatory diagrams illustrating an example of information which is communicated between the input pen and the information processing device according to the present disclosure;

DESCRIPTION OF THE EMBODIMENTS

Hereinafter, embodiments according to the present disclosure will be described with reference to the accompanying drawings. Meanwhile, the present disclosure is not limited to description of examples below.

Configuration of Information Processing System

Figure 1A:
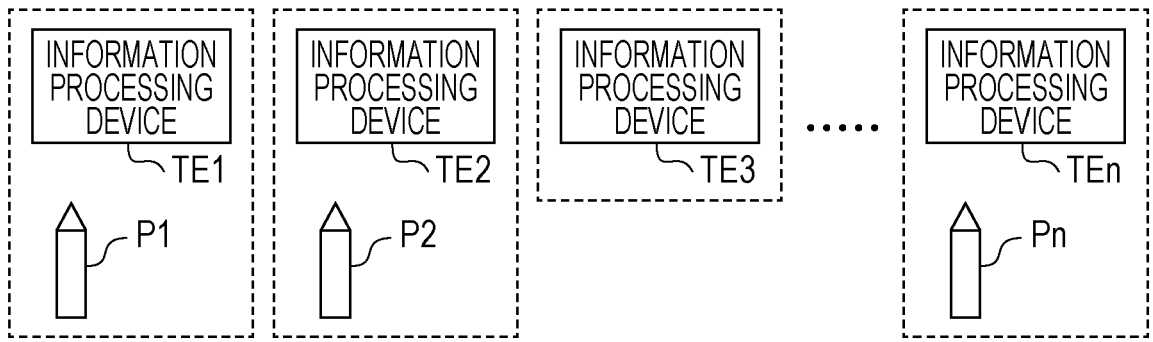
FIGS. 1A to 1C are schematic explanatory diagrams illustrating an example of switching connection of a pen in an information processing system according to the present disclosure.
Figure 1B:
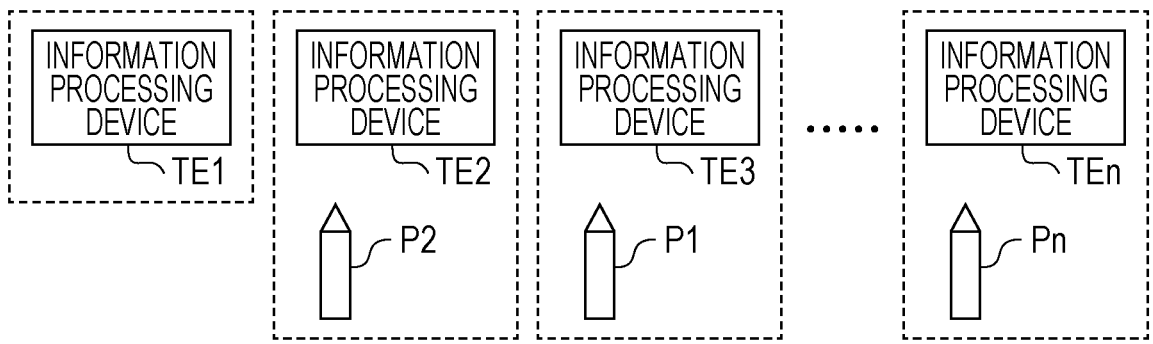
Figure 1C:
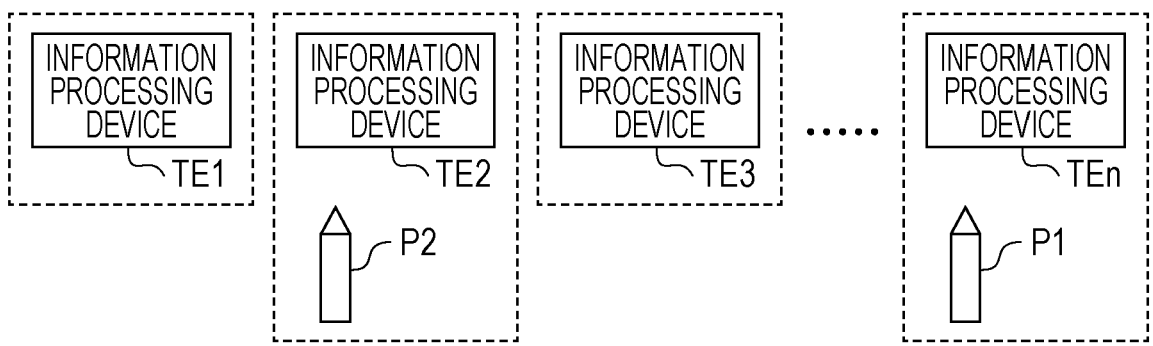

FIGS. 1A to 1C are schematic explanatory diagrams illustrating an example of switching connection of a pen in an information processing system according to the present disclosure.

In FIGS. 1A to 1C, the information processing system according to the present disclosure includes an information processing device 1 and an input pen 2, and inputs information using the input pen.

In a case where the input pen 2 is used in the information processing device 1, an initial setting process of associating the input pen 2 with the information processing device 1, and a process of switching connection are performed.

As will be described later, the information processing device 1 includes a display device in which a display screen of a display panel overlaps a touch panel that is an input unit, and inputs letters, figures, and the like by causing the input pen 2 to touch the touch panel disposed on the display screen.

Generally, in a case where n users respectively use own information processing devices (hereinafter, also referred to as TEs) 1, n information processing devices (TE1, TE2, . . . , TEn) are respectively associated with input pens (hereinafter, also referred to as PEN or P) 2 used in the respective information processing devices 1.

FIG. 1A illustrates a state in which the input pens are used after initial setting is performed to connect the pen. For example, in a case where an input pen P1 is associated with an information processing device TE1, it is possible to input letters and the like by causing the input pen P1 to touch the touch panel of the information processing device TE1.

In the same manner, in a case where each information processing device TEi (i=1, 2, . . . , n) is associated with each input pen Pi (i=1, 2, . . . , n), it is possible to use the relevant input pen Pi in the information processing device TEi. However, it is difficult to use the input pen Pi in the information processing device TEi which is not associated. For example, in a case where the input pen P1 is associated with the information processing device TE1, it is difficult to use the input pen P1 in another information processing device TE2 or the like.

The input pen 2 is associated with the information processing device 1 through wireless communication between the input pen 2 and the information processing device 1, and switches connection between the input pen 2 and the information processing device 1 is performed by an operation of switching connection of the input pen 2 performed by a user as will be described later and the wireless communication between the input pen 2 and the information processing device 1. Because connection is switched, a switch screen may not be displayed or displayed items may not be selectively input in the information processing device 1.

FIG. 1B illustrates a state of switching connection with the input pen P1 such that it is possible to use the input pen P1 in the information processing device TE3.

As illustrated in FIG. 1A, in a case where the input pen P1 is already associated with the information processing device TE1, first, a process of releasing connection (process of connection release) between the input pen P1 and the information processing device TE1 is performed and initial setting of pen connection between the input pen P1 and the information processing device TE3 is performed, and thus it is possible to use the input pen P1 in the information processing device TE3.

FIG. 1C illustrates a state in which connection with the input pen P1 is switched such that it is possible to use the input pen P1 in the information processing device TEn.

As illustrated in FIG. 1A, in a case where an input pen Pn is already associated with the information processing device TEn and the input pen Pn is used in the information processing device TEn, in order to use only the input pen P1 in the information processing device Ten, first, the process of releasing connection between the input pen P1 and the information processing device TE1 and the process of releasing connection between the input pen Pn and the information processing device TEn are performed, and a process of switching pen connection between the input pen P1 and the information processing device TEn is performed.

However, in a case where both the input pen P1 and the input pen Pn are used in the information processing device TEn, the process of releasing connection between the input pen Pn and the information processing device TEn is not performed. Instead, the process of switching pen connection between the input pen P1 and the information processing device TEn may be performed while a connection state between the input pen Pn and the information processing device TEn is maintained.

The information processing device (TE)1 corresponds to a personal computer, a table terminal, or a mobile terminal, such as a mobile phone, and is a device in which it is possible to input information using an input pen (PEN)2 according to the present disclosure. However, information may be input by touching a user's finger or the like in addition to the input pen.

It is preferable that the input pen PEN is an elongated rod-shaped device which is easy for the user to input letters and the like by hand.

FIGS. 4A to 4C are schematic configuration diagrams illustrating an example of the input pen according to the present disclosure.

In FIG. 4A, the input pen P1 includes a push-button switch SW on a side of a main body surface, and includes a tip part PT used to input the letters or the like.

The push-button switch SW is a part used to input an operation of switching connection with the pen. For example, in a case where long press input is performed on the push-button switch SW equal to or longer than a predetermined time (for example, 3 seconds or more), it is determined that input is provided to switch connection with the pen. In addition, another function selection and input of change in setting, such as a drawing color, may be possible by changing a method of pressing the switch SW in such a way that the switch SW is clicked only once or clicked twice in succession.

The tip part PT of the input pen PEN is a movable member attached to one end of the input pen, and is a part which touches the information processing device TE in a case where the letters and the like are input.

In a case where the input pen does not touch, that is, the letters and the like are not input, the tip part PT is in a state of being protruded (slide to the outside of the pen) from the pen main body, as illustrated in FIG. 4B.

However, in a case where the tip part PT of the input pen is caused to touch the touch panel of the information processing device TE and the letters and the like are input as illustrated in FIG. 4C, the tip part PT is in a state of sliding into an inner side of the pen main body.

That is, the tip part PT is movable by a spring or the like, and it is detected that the tip part PT does not touch the information processing device TE in a state of being protruded (slide to the outside of the pen), and it is detected that the tip part PT touches the information processing device TE in a state of sliding into the inner side of the pen main body.

A state in which the tip part PT of the input pen PEN touches the information processing device TE is referred to as a pen touch state or a touch-down state. In addition, a state in which the tip part PT of the input pen PEN does not touch the information processing device TE is called a pen touch release state or a touch-up state.

Description of Configuration of Information Processing Device

Figure 2:
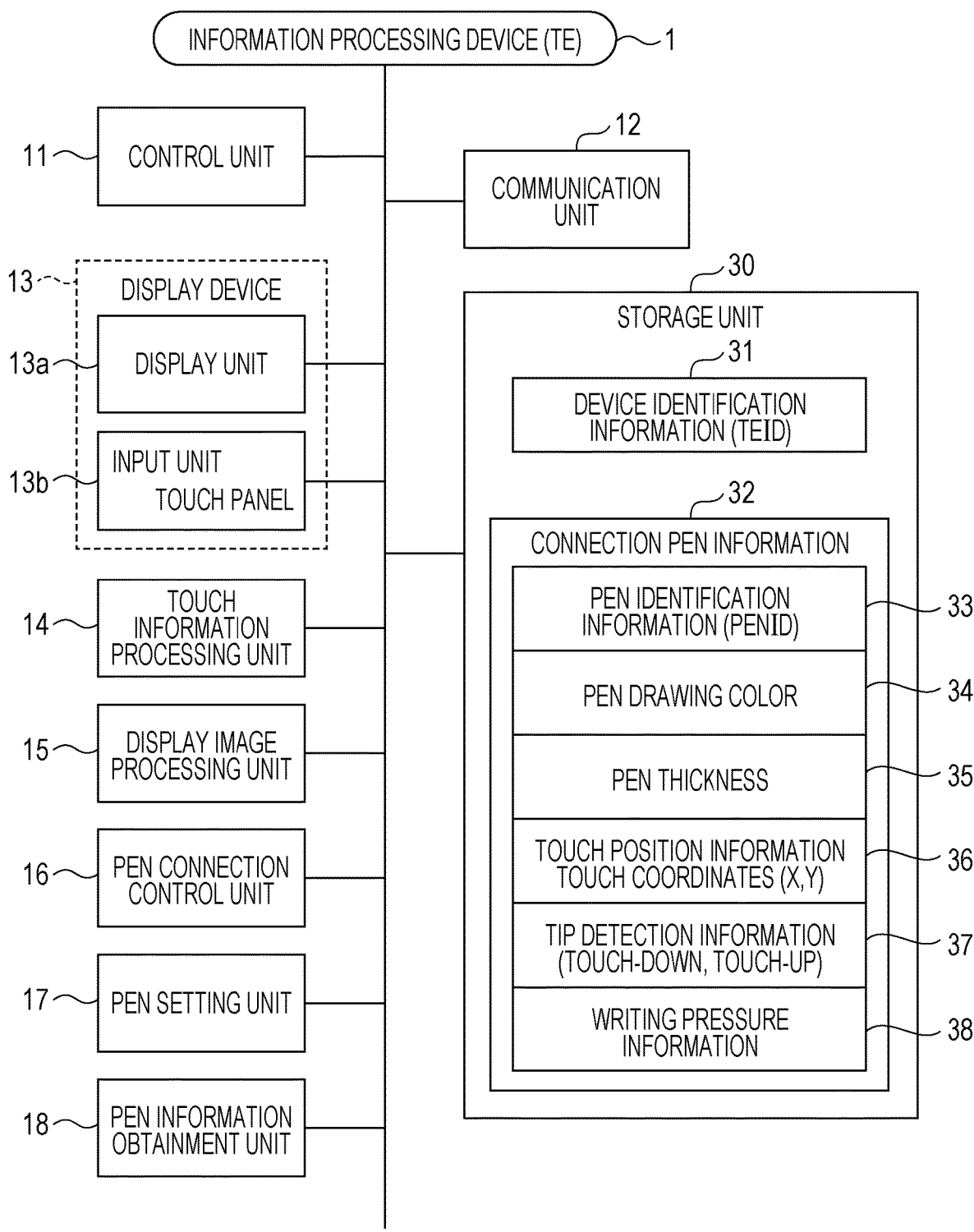
FIG. 2 is a block diagram illustrating a configuration of an example of an information processing device according to the present disclosure.

FIG. 2 is a block diagram illustrating a configuration of an example of the information processing device according to the present disclosure.

In FIG. 2, the information processing device (TE)1 according to the present disclosure includes, primarily, a control unit 11, a communication unit 12, a display device 13, a touch information processing unit 14, a display image processing unit 15, a pen connection control unit 16, a pen setting unit 17, a pen information obtainment unit 18, and a storage unit 30.

The control unit 11 of the information processing device TE is a part which controls an operation of each component, such as the communication unit, and is realized by a microcomputer which includes, primarily, a CPU, a ROM, a RAM, an I/O controller, a timer, and the like. The CPU functionally operates various types of hardware based on a control program which is previously stored in the ROM or the like, and performs an image display function, a pen touch control function, a communication function, and the like of the present disclosure.

The communication unit 12 is a part which performs communication with the input pen PEN. It is assumed that the communication unit 12 performs wireless communication using a predetermined wireless signal in a case where the user carries the input pen PEN.

Existing wireless communication method may be used as a wireless communication method, for example, any one wireless communication method may be used among a wireless LAN, Bluetooth, ZigBee (IEEE802.15.4), infrared communication, ultrasonic communication, and the like.

The display device 13 is a so-called a display with a touch panel, and includes a display panel (display unit) 13a that displays information and a touch panel (input unit) 13b that inputs information. The display device 13 is formed by overlapping the display panel and the touch panel or integrally forming the display panel and the touch panel.

In a case where an operation of drawing a line segment by touching the touch panel 13b using the input pen PEN is performed, the line segment is displayed on the display screen corresponding to a position at which the line segment is drawn.

For example, a panel, such as an LCD or an organic EL, is used as the display panel (display unit) 13a.

The touch panel (input unit) 13b is disposed to overlap the display unit 13a, is used to input information of a position touched by the input pen PEN, and outputs a signal indicative of coordinates of the touch position. The signal indicative of the coordinates of the touch position is given to the touch information processing unit 14.

For example, a method for detecting the touch position includes a capacitance method, an infrared interception method, an infrared camera method, a resistive film method, and the like, and any one of the methods may be used.

The touch information processing unit 14 is a part which detects that the input pen PEN touches and obtains information of the touch position.

The touch information processing unit 14 first obtains positional coordinates on the display screen touched by the input pen PEN using the signal output from the touch panel (input unit) 13b.

In addition, it is detected whether or not the input pen PEN touches the touch panel (input unit) 13b, that is, whether the input pen PEN is in a touch-down state or a touch-up state based on the existence/non-existence of the signal output from the touch panel (input unit) 13b.

For example, in a state in which the positional coordinates are obtained, a state (touch-down) in which the input pen PEN touches the touch panel is determined. In addition, in a case where situation is changed from the state in which the positional coordinates are obtained to a state in which the positional coordinates are not obtained equal to or longer than a fixed time, a state (touch-up) in which the input pen PEN does not touch the touch panel is determined.

The positional coordinates obtained by the touch information processing unit 14 are stored in the storage unit 30 as touch position information 36.

The control unit 11 displays the letters and the like on the display screen using the touch position information 36 or performs a selected function associated with display information.

The display image processing unit 15 is a part which generates an image to be displayed on the display unit 13a.

For example, input letters and figures are displayed at positions of the display screen corresponding to the touch panel using the touch position information 36.

The pen connection control unit 16 is a part which controls connection between the information processing device TE and the input pen PEN, generates information to be transmitted to the input pen PEN, causes predetermined connection information to be wirelessly communicated between TE and PEN, and performs processes, such as connection, connection switching, and connection release (cut), through the communication unit 12.

For example, as will be described later, the pen connection control unit 16 receives a connection request from the input pen PEN and establishes connection with a specific input pen PEN. In addition, the pen connection control unit 16 receives a cut request from the input pen PEN and releases connection with the connected input pen PEN.

The pen setting unit 17 is a part which performs setting of predetermined data to the connected input pen PEN. For example, the pen setting unit 17 generates a setting connection request in order to initially set the setting data (pen setting data) relevant to the pen or an update request in order to update pen setting data acquired after the pen is connected, and transmits the generated request to the input pen PEN. The pen setting data includes, for example, a pen drawing color, a pen thickness, and the like.

The pen information obtainment unit 18 is a part which obtains pen information, acquired after the pen is connected, from the input pen PEN. The pen information obtainment unit 18 receives information (pen detection data) detected by the input pen, and stores the information in the storage unit 30. The pen detection data includes, for example, pen identification information, tip detection information, writing pressure information, motion information, and the like.

The storage unit 30 is a part which stores information and a program desired to perform each function of information processing device 1, and a semiconductor storage element, such as a ROM, a RAM, or a flash memory, a storage device, such a HDD or an SSD, and another storage medium are used.

For example, device identification information 31, connection pen information 32, and the like are stored in the storage unit 30, and the connection pen information 32 includes pen identification information 33, pen drawing color 34, pen thickness 35, touch position information 36, tip detection information 37, writing pressure information 38, and the like.

The device identification information (TEID) 31 is information used to specify the device, and corresponds to, for example, an identification number, an identification name, a connection address, or the like. Generally, the device identification information is fixedly set and stored so as not to be removed in advance.

In a case where the input pen PEN is connected to the information processing device TE, information relevant to the input pen PEN is stored as the connection pen information 32. In a case where there is no input pen which is connected to the information processing device TE, the connection pen information 32 is not stored.

However, pieces of information (33 to 35) of the input pen, which has been connected once, are stored in the storage unit 30 as a history. In a case where the input pen, which is stored in the history, is connected again, the stored information is read, and the read information may be used as a part of the connection pen information 32.

The pen identification information 33 is information used to specify a currently connected input pen PEN, and corresponds to, for example, a pen identification number (PENID), a pen identification name, a connection address, or the like.

In a case where the letters and the like are input using the input pen PEN, the pen drawing color 34 indicates color information of the letters and the like displayed on the display screen.

In a case where the letters and the like are input using the input pen PEN, the pen thickness 35 indicates information of thickness of line segments of the letters and the like displayed on the display screen.

The pen drawing color 34 and the pen thickness 35 are pieces of information which are initially set by, for example, an image process program of the information processing device TE, and are given as initial values to the input pen to be used.

The touch position information 36 is touch coordinates (X,Y) indicative of a position of the touch panel which is touched by the input pen. The touch position information 36 is obtained based on information output from the input unit (touch panel) 13b. In a case where the positional coordinates of the touch panel coincide with the positional coordinates of the display screen, the touch position corresponds to a display position.

The tip detection information 37 is information indicative of a state of the tip part PT of the input pen PEN, and includes any one of, for example, touch-down indicative of a state (touch state) in which the tip part PT touches the information processing device and touch-up indicative of a state (touch release state) in which the tip part PT does not touch the information processing device. The tip detection information 37 is obtained from the pen detection data transmitted from the input pen.

The writing pressure information 38 is information indicative of strength acquired in a case where the user presses the input pen at the time of drawing.

In a case where the user uses the input pen PEN, the user inputs the letters and the like while pushing the input pen PEN on the display screen. However, there is a case where force (pressing force) generated when the input pen is pushed on the display screen becomes different. The pressing force is measured by installing a pressure sensor, which detects weight applied to the tip part PT of the input pen, on the input pen. The pressing force corresponds to the user's writing pressure. The writing pressure information 38 is used to determine thickness and density of the letters and the like displayed on the display screen.

The configuration of the information processing device TE is not limited to the configuration illustrated in FIG. 2, and another configuration may be provided. For example, in a case where connection with the input pen is switched but it is difficult to switch the connection, an information notification unit may be provided that notifies occurrence of defects (errors) in a case of switching connection. The information notification unit may notify the occurrence of the defects (errors) using one or more means among, for example, display, voice, light flickering, vibration, and the like.

Description of Configuration of Input Pen

Figure 3:
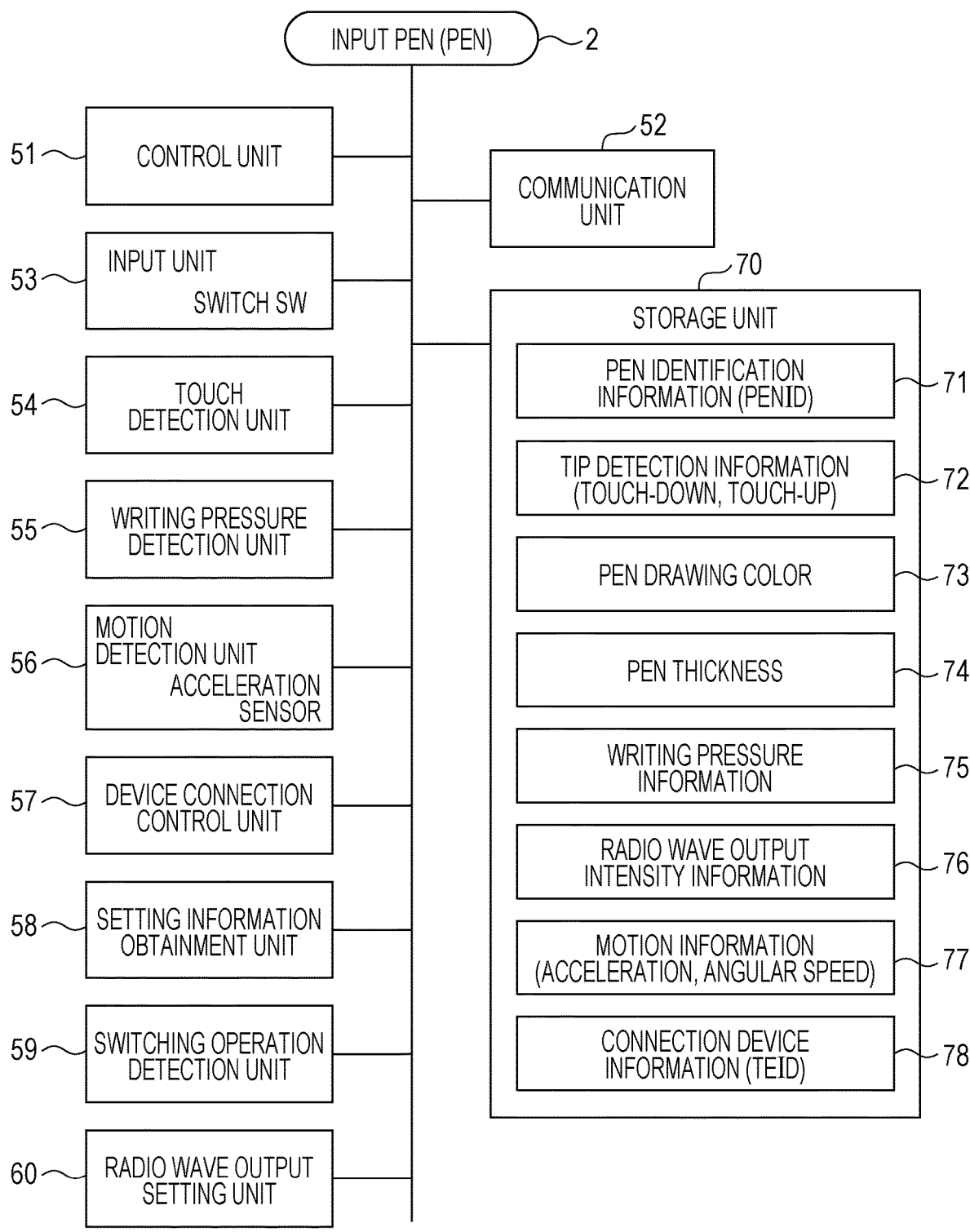
FIG. 3 is a block diagram illustrating a configuration of an example of an input pen according to the present disclosure.

FIG. 3 is a block diagram illustrating a configuration of an example of the input pen according to the present disclosure.

In FIG. 3, the input pen (PEN)2 according to the present disclosure includes, primarily, a control unit 51, a communication unit 52, an input unit 53, a touch detection unit 54, a writing pressure detection unit 55, a motion detection unit 56, a device connection control unit 57, a setting information obtainment unit 58, a switching operation detection unit 59, a radio wave output setting unit 60, and a storage unit 70.

The control unit 51 of the input pen PEN is a part which controls an operation of each component, such as the communication unit, and is realized, primarily, by a microcomputer which includes a CPU, a ROM, a RAM, an I/O controller, and a timer.

The CPU organically operates various types of hardware based a control program previously stored in the ROM or the like, and performs an input function, a motion detection function, a communication function, or the like of the input pen.

The communication unit 52 is a part which performs communication with the information processing device TE. It is assumed that the communication unit 52 performs wireless communication using a predetermined wireless signal as described above. For example, the communication unit 52 wirelessly transmits a connection request signal and a cut request signal to the information processing device TE. As described above, existing wireless communication method, such as the wireless LAN, the Bluetooth, the ZigBee (IEEE802.15.4), the infrared communication, or the ultrasonic communication, may be used as the wireless communication method.

The input unit 53 is a part used to instruct and input a predetermined function. For example, as illustrated in FIGS. 4A to 4C, the push-button switch SW corresponds to the input unit 53.

It is assumed that, in a case where the user performs long press on the push-button switch SW equal to or longer than a predetermined time, that is, in a case where a state in which the switch SW is turned on is continued equal to or longer than a predetermined time, the process of switching connection starts. However, in a case where there is an information processing device TE which is already connected to the input pen PEN, a process for releasing the connection between the input pen PEN and the information processing device TE is performed first.

The touch detection unit 54 is a part which detects whether or not the input pen is in a state in which the input pen touches the information processing device TE. The touch detection unit 54 detects whether or not the input pen touches according to a sliding state of the tip part PT of the input pen or the like.

Whether or not the tip part PT is in the state of touching the information processing device TE is determined based on the sliding state of the tip part PT as illustrated in FIGS. 4A to 4C.

For example, in a case where the tip part PT slides to the outside of the pen, it is determined that the tip part PT does not touch the information processing device TE (touch-up state).

In addition, in a case where the tip part PT is in the sliding state to the inside of the pen, it is determined that the tip part PT touches the information processing device TE (touch-down state). However, there is a case where the writing pressure, acquired in a case where the user uses the input pen, is different and there is a case where the tip part PT is not in a complete storage state in the pen main body. Therefore, even in a case where the tip part PT is not in the complete storage state in the pen main body, it is preferable to determine that the input pen touches the information processing device TE (touch-down state) in a state in which the tip part PT is pressed longer than a predetermined distance and is slid to the inside of the pen.

The writing pressure detection unit 55 is a part which detects the writing pressure in a case where the user possesses the input pen and inputs the letters and the like. As described above, the writing pressure detection unit 55 includes the pressure sensor, and measures pressing force of the tip part PT of the input pen.

The motion detection unit 56 is a part which detects motion and vibration added to the input pen, and, for example, an acceleration sensor, an angular speed sensor (a gyro sensor), a magnetic sensor, an atmosphere sensor, or the like is used.

For example, in a case where an acceleration sensor is provided that detects vibration in three axial directions and a signal corresponding to strength of vibration output from the acceleration sensor is measured, it is possible to detect a vibration state, a movement operation (gesture), and the like of the input pen.

The motion and the vibration detected by the motion detection unit 56 is used to detect an operation of switching connection of the input pen as will be described later. For example, in a case where the motion detection unit 56 detects a predetermined motion, it is determined that an operation of switching connection between the input pen and the information processing device is performed.

The device connection control unit 57 is a part which controls connection between the input pen PEN and the information processing device TE. The device connection control unit 57 wirelessly communicates the predetermined connection information between TE and PEN, and performs processes, such as connection, connection switching, and connection release (cut), through the communication unit 52.

In addition, the device connection control unit 57 is a part which generates information to be transmitted from the input pen to the information processing device. For example, as will be described later, the device connection control unit 57 generates a connection request, a cut request, a pen detection data transmission request, and the like. The generated information includes the pen drawing color and pieces of information, which are detected by the touch detection unit 54, the writing pressure detection unit 55, and the like, based on content of the information to be transmitted.

The setting information obtainment unit 58 is a part which obtains setting information which is transmitted from the information processing device TE. For example, the setting information obtainment unit 58 receives a setting update request transmitted from the information processing device TE, and obtains the pen drawing color and the pen thickness which are initially set by the information processing device TE. In a case where the letters and the like are input using the input pen after the setting information is obtained, the input letters and the like are displayed on the display unit 13*a* of TE based on the information such as the obtained pen drawing color or the like.

The switching operation detection unit 59 is a part which detects an operation for switching connection between the input pen PEN and the information processing device TE. An operation of switching connection as illustrated in FIG. 5 which will be described later is considered as the operation for switching connection between the input pen PEN and the information processing device TE. For example, in a case where an operation in which the switch SW of the input pen is pressed equal to or longer than a predetermined time (long press operation) is previously set to the operation of switching connection and in a case where the user performs the long press operation on the switch SW of the input pen equal to or longer than a predetermined time, it is determined that the operation for switching connection between the input pen PEN and the information processing device TE is performed.

FIG. 5 is an explanatory diagram illustrating an example of an operation of switching connection of the input pen according to the present disclosure.

Here, six operations of switching connection performed by the user are illustrated.

That is, a case where the long press is performed on the switch SW of the input pen, a case where vibration is given to the input pen equal to or longer than a fixed time, a case where an operation of making a predetermined gesture (drawing) is performed using the input pen, a case where an operation (touch-down operation) of causing the input pen to touch the touch panel is performed, a case where an operation (touch-up operation) of releasing the touch of the input pen which is caused to touch the touch panel is performed, and a case where an operation of causing the input pen to approach the information processing device is performed.

In a case where the user detects that any one operation of the six operations of switching connection is performed, it is determined that an operation which means connection switching is performed. However, any one operation or any two or more operations may be previously set as operations which mean the connection switching without using all the six operations of switching connection.

In FIG. 5, the six operations of switching connection are illustrated. However, the present disclosure is not limited thereto.

In addition, the user may autonomously set the operation of switching connection.

For example, in a case where the switching operation detection unit 59 detects the operation of switching connection performed by the user and the touch information processing unit 14 of the information processing device detects that the input pen PEN touches within a predetermined time, the device connection control unit 57 and the pen connection control unit 16 wirelessly communicate the predetermined connection information (the connection request and the connection response), and thus connection is established between the input pen PEN and the information processing device TE which t by the input pen.

In addition, in cases where the touch detection unit 54 of the input pen detects a state in which the input pen PEN touches the information processing device TE, the motion detection unit 56 does not detect a motion, and the touch information processing unit 14 of the information processing device detects that the input pen PEN touches for a predetermined time, it may be determined that the operation for switching connection between the input pen PEN and the information processing device TE is performed.

In addition, according to change in the touch state of the input pen on the information processing device, which is detected by the touch detection unit 54 of the input pen, in a case where a time difference between timing, at which the information processing device TE receives the connection request wirelessly transmitted from the input pen PEN, and timing, at which the touch information processing unit 14 of the information processing device detects the change in the touch state of the input pen, is within a predetermined time, the device connection control unit 57 and the pen connection control unit 16 wirelessly communicate the predetermined connection information, and thus the connection between the input pen PEN and the information processing device TE which is touched by the input pen may be established.

Here, the change in the touch state of the input pen on the information processing device, which is detected by the touch detection unit 54 of the input pen, and the change in the touch state of the input pen, which is detected by the touch information processing unit 14 of the information processing device correspond to at least one or both of the change in a state from non-touch to touch and change in a state from touch to non-touch.

In addition, in a case where the touch detection unit 54 of the input pen detects that the input pen PEN is in the state in which the input pen PEN touches the information processing device TE and the touch information processing unit 14 of the information processing device detects that the input pen touches within the predetermined time, the device connection control unit 57 and the pen connection control unit 16 wirelessly communicate the predetermined connection information, and thus connection may be established between the input pen PEN and the information processing device TE which is touched by the input pen.

Furthermore, in cases where the input pen PEN and the predetermined information processing device TE are already in the connection state and the switching operation detection unit 59 detects the operation of switching connection between the input pen PEN and the information processing device TE, the device connection control unit 57 of the input pen first performs the process of connection release from the predetermined information processing device which is already in the connection state. Thereafter, the device connection control unit 57 of the input pen and the pen connection control unit 16 of the information processing device, which is touched by the input pen, wirelessly communicate the predetermined connection information, and thus the connection is established between the input pen PEN and the information processing device TE which is touched by the input pen.

The radio wave output setting unit 60 is a part which sets radio wave intensity of a wireless signal output from the input pen.

In order to communicated with a near information processing device TE, a wireless signal having predetermined radio wave intensity is output from the input pen PEN. However, in a case where a plurality of information processing devices exist in a range in which it is possible to perform communication, there is a case where it is not possible to connect to a desired information processing device. In this case, in order to enable connection of the desired one information processing device, it is preferable to adjust the radio wave intensity of the wireless signal such as the connection request signal transmitted from the input pen PEN.

For example, the wireless signal is output after setting the initial radio wave intensity to a maximum value, and the magnitude of the radio wave intensity is gradually lowered until the number of information processing devices which can be connected becomes one.

That is, after the switching operation detection unit 59 detects a predetermined operation of switching connection performed by the user, the radio wave output setting unit 60 gradually lowers the radio wave intensity of the connection request signal, the communication unit 52 repeatedly transmits the connection request signal, and the number of information processing devices, which send a connection response signal for the connection request signal as a reply, is one. In this case, the connection is established between the input pen PEN and the information processing device TE.

As will be described later, in situations in which the user who possess the input pen PEN moves near to the information processing device TE desired to use, a distance between the possessed input pen PEN and another information processing device is longer than a distance between the possessed input pen PEN and the information processing device TE desired to use, and only the information processing device TE desired to use exists in a range in which it is possible to communicate the wireless signal output from the input pen, the connection is established between the input pen PEN and the information processing device TE desired to use, and subsequent wireless communication is possible.

Therefore, after the user performs the predetermined operation of switching connection, the user who possess the input pen PEN moves near to the information processing device TE desired to use, the radio wave output setting unit 60 gradually lowers the magnitude of the radio wave intensity of the wireless signal output from the input pen PEN, and the process of narrowing the information processing device which can perform connection is performed. Therefore, the one-to-one connection is possible between the input pen PEN and the information processing device TE desired to use.

The storage unit 70 is a part which stores pieces of information and programs desired to perform respective functions of the input pen PEN, and a semiconductor storage element, such as a ROM, a RAM, or a flash memory, a storage device, such as an HDD or an SSD, or another storage medium is used.

The storage unit 70 stores, for example, pen identification information 71, tip detection information 72, a pen drawing color 73, pen thickness 74, writing pressure information 75, radio wave output intensity information 76, motion information 77, connection device information 78, and the like.

The pen identification information (PENID) 71, the tip detection information 72, the pen drawing color 73, the pen thickness 74, and the writing pressure information 75 are the same pieces of information stored in the storage unit 30 of the information processing device TE. The tip detection information 72 is information detected by the touch detection unit 54.

The writing pressure information 75 is information detected by the writing pressure detection unit 55.

The connection device information 78 corresponds to the device identification information (TEID) 31, and is information used to specify the information processing device TE to be connected to the input pen PEN. In a case where the information processing device TE is not connected to the input pen PEN, the connection device information 78 is not stored.

The radio wave output intensity information 76 is acquired by previously storing a maximum value of the radio wave intensity of the wireless signal which is output from the input pen PEN or a maximum numerical value of a level of the radio wave intensity. In a case where the connection with information processing device TE is switched, the radio wave output intensity information 76 is set to an initial value. Thereafter, while the information processing device TE which can be connected is recognized, the radio wave intensity is gradually lowered. However, in a case where adjustment of the radio wave intensity is not used for the process of switching connection, the radio wave output intensity information 76 may not be stored.

The motion information 77 is information relevant to a motion detected by the motion detection unit 56. For example, the motion information 77 is information which is output from the acceleration sensor or the like corresponding to the motion detection unit 56, and pieces of information relevant to strength of vibration added to the input pen and relevant to a direction of the vibration are stored.

In a case where the motion information 77 is continuously measured, it is possible to detect that the predetermined operation of switching connection is performed.

For example, predetermined reference vibration intensity V, which becomes reference used to determine the fact that the operation of switching connection is performed, is previously stored in the storage unit 70. In a case where the motion information 77 having intensity which is higher than the reference vibration intensity V is measured equal to or longer than a fixed time, it may be determined that the operation of switching connection is performed.

The motion information 77 is used to detect that the user makes the predetermined gesture using the input pen.

Description of Information to be Transmitted and Received

FIGS. 7A and 7B are explanatory diagrams illustrating an example of information used in the present disclosure.

FIG. 7A illustrates an example of the pen setting data stored in the input pen.

The pen setting data is data relevant to drawing. Here, the pen identification information (PENID) 71, the pen drawing color 73, and the pen thickness 74 are illustrated as the pen setting data.

For example, it is illustrated that, in an input pen having pen identification information (PENID) P001, information which includes pen drawing color 73 "black" and the pen thickness 74 "narrow" is set.

In the same manner, in an input pen having pen identification information (PENID) P002, information which includes pen drawing color 73 "red" and the pen thickness 74 "thick" is set.

In a case where letters and the like are input using the input pen PEN, the input letters and the like are displayed on the display unit of TE using the pen setting data.

Generally, the pen setting data is initially set in any one of information processing devices TE in which the input pen PEN is used, and the initially set pen setting data is transmitted from the information processing device TE to the input pen PEN.

In addition, in a case where the information processing device TE in which the input pen PEN is used is switched, the pen setting data stored in the input pen PEN is transmitted from the input pen to the information processing device, acquired after switch is performed, when connection is switched.

For example, after the connection between the input pen PEN and the information processing device TE is switched, the pen setting data stored in the storage unit 70 of the input pen is transmitted from the input pen PEN to the information processing device TE, the information processing device TE obtains the pen setting data, and the setting data of the input pen PEN is synchronized with the setting data of the information processing device TE.

In addition, in a case where the information processing device TE connected to the input pen transmits the setting update request, which includes newly set pen setting data to the input pen, the input pen PEN cause the storage unit 70 to update and store the pen setting data included in the received setting update request.

FIG. 7B illustrates an example of the pen detection data detected in the input pen.

Here, the pen identification information (PENID) 71, the tip detection information 72, the writing pressure information 75, and the motion information 77 are illustrated as the pen detection data.

For example, in an input pen having pen identification information (PENID) P001, pen detection data, which includes the tip detection information 72 "touch (touch-down)", the writing pressure information 75 "H05 (strong)", and the motion information 77 "V02 (vibration exits)", is detected. According to the pen detection data, it is possible to describe that the input pen P001 is currently used, touches the display screen with relatively strong writing pressure, and is in the vibration state.

In addition, it is illustrated that, in an input pen having pen identification information (PENID) P002, pen detection data, which includes the tip detection information 72 "touch (touch-down)", the writing pressure information 75 "H01 (weak)", and the motion information 77 "V00 (vibration does not exist)", is detected.

In addition, it is illustrated that, in an input pen having pen identification information (PENID) P003, pen detection data, which includes the tip detection information 72 "touch release (touch-up)", the writing pressure information 75 "H00 (null)", and the motion information 77 "V05 (strong vibration exists)", is detected.

The pen detection data is transmitted from the input pen PEN to the information processing device TE periodically or according to a request from the information processing device.

FIGS. 8A to 8D and FIGS. 9A to 9F are explanatory diagrams illustrating an example of information communicated between the input pen and the information processing device according to the present disclosure.

FIG. 8A illustrates an example of data content of the connection request.

As will be described later, the connection request is information used in a case where the input pen PEN requests connection at non-specific information processing device TE, and is information to be transmitted from the input pen PEN.

The connection request includes, for example, a data identifier and pen identification information (PENID).

As an example, information, which includes a data identifier "CREQ" and pen identification information (PENID) "P001", is transmitted from the input pen PEN to the non-specific information processing device TE.

FIG. 8B illustrates an example of data content of the connection response.

The connection response is reply data with respect to a connection request (CREQ).

The connection response is information which is transmitted from the information processing device TE that receives the connection request (CREQ) to the input pen PEN that transmits CREQ.

The connection response includes, for example, a data identifier, device identification information (TEID), and pen identification information (PENID).

As an example, information, which includes data identifier "CANS", device identification information (TEID) "T101", and pen identification information (PENID) "P001", is transmitted from the information processing device TE to the input pen PEN.

For example, as will be described later, transmission and reception of the connection request (CREQ) and the connection response (CANS) are performed between the input pen PEN and a newly connected information processing device TE in a case where connection between PEN and TE is switched.

FIG. 8C illustrates an example of data content of the cut request.

The cut request is information used in a case where the input pen PEN requests connection release at the information processing device TE which is being currently connected, and the cut request is transmitted from the input pen PEN to the information processing device TE which is being connected.

The cut request includes, for example, a data identifier, pen identification information (PENID), and device identification information (TEID).

As an example, information, which includes a data identifier "XREQ", pen identification information (PENID) "P001", and device identification information (TEID) "T101", is transmitted from the input pen PEN to the information processing device TE.

FIG. 8D illustrates an example of data content of the cut response.

The cut response is reply data with respect to a cut request (XREQ).

The cut response is information which is transmitted from the information processing device TE that receives the cut request (XREQ) to the input pen PEN that transmits XREQ.

The cut response includes, for example, a data identifier, device identification information (TEID), and pen identification information (PENID).

As an example, information, which includes data identifier "XANS", device identification information (TEID) "T101", and pen identification information (PENID) "P001", is transmitted from the information processing device TE to the input pen PEN.

For example, transmission and reception of the cut request (XREQ) and the cut response (XANS) are performed between the input pen PEN and the information processing device TE which is connected until now in a case where connection between PEN and TE is switched.

FIG. 9A illustrates an example of data content of the setting update request.

The setting update request is information used in a case where the information processing device TE requests to update the setting data of the input pen at the input pen PEN which is currently being connected, and is information to be transmitted from the information processing device TE to the input pen PEN which is being connected. For example, in a case where the input pen PEN is used and it is desired to change a color of the letters and the like to be input using the input pen, the setting update request is transmitted.

The setting update request includes, for example, a data identifier, device identification information (TEID), pen identification information (PENID), a pen drawing color, and pen thickness.

As an example, information, which includes a data identifier "KREQ", device identification information (TEID) "T101", pen identification information (PENID) "P001", a pen drawing color "black", and pen thickness "narrow", is transmitted from the information processing device TE to the input pen PEN.

FIG. 9B illustrates an example of data content of a setting update response.

The setting update response is reply data with respect to a setting update request (KREQ).

The setting update response is information which is transmitted from the input pen PEN that receives the setting update request (KREQ) to the information processing device TE that transmits KREQ.

The setting update response includes, for example, a data identifier, pen identification information (PENID), and device identification information (TEID).

As an example, information, which includes a data identifier "KANS", pen identification information (PENID) "P001", and device identification information (TEID) "T101", is transmitted from the input pen PEN to the information processing device TE.

Transmission and reception of the setting update request (KREQ) and the setting update response (KANS) are performed between the information processing device TE, in which setting is changed, and the input pen PEN which is currently connected in a case where setting of the input pen is changed using a program which is being used in the information processing device TE. After the transmission and reception are established, input letters and the like are displayed based on the updated setting.

FIG. 9C illustrates an example of data content of the pen setting data obtainment request.

The pen setting data obtainment request is information used to request current pen setting data of the input pen in a case where the pen setting data of the input pen PEN is not stored after the information processing device TE is connected to the input pen PEN, and is information to be transmitted from the information processing device TE to the connected input pen PEN.

The pen setting data obtainment request includes, for example, a data identifier, device identification information (TEID), and pen identification information (PENID).

As an example, information, which includes a data identifier "YREQ", device identification information (TEID) "T101", and pen identification information (PENID) "P001", is transmitted from the information processing device TE to the input pen PEN.

FIG. 9D illustrates an example of data content of the pen setting data obtainment response.

The pen setting data obtainment response is reply data with respect to a pen setting data obtainment request (YREQ).

The pen setting data obtainment response is information transmitted from the input pen PEN, which receives the pen setting data obtainment request (YREQ), to the information processing device TE which transmits YREQ.

The pen setting data obtainment response includes, for example, a data identifier, pen identification information (PENID), device identification information (TEID), a pen drawing color, and pen thickness.

As an example, information, which includes a data identifier "YANS", pen identification information (PENID) "P001", device identification information (TEID) "T101", a pen drawing color "black", and pen thickness "narrow", is transmitted from the input pen PEN to the information processing device TE.

After transmission and reception of the pen setting data obtainment request (YREQ) and a pen setting data obtainment response (YANS) are established, the pen setting data is stored in the information processing device TE, and the input letters and the like are displayed using the set pen drawing color and the pen thickness.

FIG. 9E illustrates an example of data content of the pen detection data transmission request.

The pen detection data transmission request is information used to notify the information processing device TE which is being currently connected of information detected by the input pen PEN from the input pen PEN. For example, the tip detection information and the writing pressure information, which indicate a current usage state of the input pen PEN, are transmitted from the input pen PEN to the information processing device TE.

The pen detection data transmission request includes, for example, a data identifier, pen identification information (PENID), device identification information (TEID), the tip detection information, and writing pressure information. Meanwhile, the pen detection data transmission request may include motion information.

As an example, information, which includes a data identifier "DSND", pen identification information (PENID) "P001", device identification information (TEID) "T101", tip detection information "touch (touch-down)", and writing pressure information "H05 (strong)", is transmitted from the input pen PEN to the information processing device TE.

FIG. 9F illustrates an example of data content of the pen detection data reception response.

The pen detection data reception response is reply data with respect to the pen detection data transmission request (DSND).

The pen detection data reception response is information which is transmitted from the information processing device TE, which receives the pen detection data transmission request (DSND), to the input pen PEN which transmits DSND.

The pen detection data reception response includes, for example, a data identifier, device identification information (TEID), and pen identification information (PENID).

As an example, information, which includes a data identifier "DRCV", device identification information (TEID) "T101", and pen identification information (PENID) "P001", is transmitted from the information processing device TE to the input pen PEN.

Transmission and reception of the pen detection data transmission request (DSND) and the pen detection data reception response (DRCV) are primarily performed while the user is using the input pen, and pen detection data transmission request (DSND) is transmitted from the input pen PEN at predetermined time intervals (for example, 16 milliseconds).

Description of Example of Process of Switching Connection Between Input Pen and Information Processing Device Hereinafter, examples of a process of setting data and a process of switching connection, which are performed between the input pen PEN and the information processing device TE, will be described.

In a case where it is desired to use the input pen P1 in another information processing device TE2 in a state in which the input pen P1 is connected to one information processing device TE1, it is desired to switch connection between the input pen and the information processing device.

In order to switch connection, first, the user who possesses the input pen performs an operation of switching connection, the operation expressing an intention to switch connection. In a case where the operation of switching connection is detected, a process of releasing (cutting) connection is performed between the input pen P1 and the information processing device TE1 which is being connected. Thereafter, a process of connection establishment is performed between the input pen P1 and a new information processing device TE2.

The operation of switching connection is performed by the user while the user possesses the input pen PEN. In addition, primarily, the switching operation detection unit 59 of the input pen detects the operation of switching connection performed by the user.

As the operation of switching connection, any operation as illustrated in the above-described FIG. 5 may be performed.

Here, in a case where an operation of causing the input pen PEN to touch the display unit 13a of TE is performed, the touch of the input pen PEN is detected by both the touch detection unit 54 of the input pen PEN and the touch panel 13b of the information processing device TE.

Here, in the present disclosure, the process of switching connection of the input pen is performed using, primarily, an operation of switching connection detected in the input pen PEN and touch detected in the input pen PEN and the information processing device TE.

FIG. 6 is an explanatory diagram illustrating an example of a process performed in a case of switching connection of the input pen according to the present disclosure. FIG. 6 illustrates four (first to fourth) examples.

In addition, FIG. 6 illustrates whether or not long press performed on the switch SW, long press performed on the tip part of the input pen PEN, touch (touch-down) of the tip part of the input pen PEN to the touch panel of TE, or touch release (touch-up) is detected among the above-described operations of switching connection as an operation of switching connection of a process on a side of the input pen PEN. Furthermore, FIG. 6 illustrates whether or not the radio wave output intensity is adjusted as a process on the side of the input pen which corresponds to a case where an operation of causing the input pen PEN to approach the information processing device TE is performed.

In addition, FIG. 6 illustrates whether touch (touch-down) of the tip part PT of the input pen is detected or touch release (touch-up) is detected as a process on a side of the information processing device TE.

First, in both examples, in a case where the information processing device TE which is being connected to the input pen PEN exists, a process of connection release from the information processing device TE which is being connected is performed.

The process of connection release is performed after the operation of switching connection is detected in the input pen PEN.

In the first example, on a side of the input pen which is possessed by the user, it is detected that long press is performed on the switch SW as the operation of switching connection. The long press performed on the switch SW may be detected by detecting, for example, a fact that the switch SW is continuously pressed longer than a predetermined time (for example, 3 seconds). In addition, on the side of the input pen, a fact that the tip part PT of the possessed input pen PEN touches (touch-down) the touch panel of TE may be detected.

In addition, on a side of the information processing device TE that the user desires to use, the fact that the tip part PT of the possessed input pen PEN touches (touch-down) the touch panel of TE is detected by the user.

In the first example, in a case where, after a fact that the switch SW is pressed by the input pen PEN is detected, the fact that the tip part PT of the input pen PEN touches-down is detected on the side of the information processing device TE which the user desires to use within a predetermined time, the connection is established between the input pen PEN and the information processing device TE which the user desires to use.

Detailed content of the process will be illustrated in flowcharts which will be described later.

In the second example, on the side of the input pen possessed by the user, it is detected that long press is continuously performed on the tip part PT of the input pen PEN longer than a predetermined time (for example, 3 seconds) as the operation of switching connection. That is, a fact that the tip part PT of the input pen PEN touches (touch-down) the touch panel of the information processing device TE which the user desires to use, and a fact that the touch-down state is continued for a predetermined time and the touch is released (touch-up) after the predetermined time elapses are detected. In the input pen PEN, touch-down and touch-up are respectively detected according to the slide of the tip part PT to the inside of the pen and slide of the tip part PT to the outside of the pen.

In addition, on the side of the information processing device TE which the user desires to use, the fact that touch of the tip part PT of the possessed input pen PEN to the touch panel is released (touch-up) is detected by the user.

Touch-down and touch-up detected in the input pen PEN and touch-down and touch-up detected in the information processing device TE are caused by the same touch operation performed by the user.

In the second example, in a case where the touch detection unit 54 of the input pen detects a state (touch-down) in which the tip part PT of the input pen PEN touches the information processing device TE and a state (touch-up) in which the tip part PT of the input pen PEN does not touch the information processing device TE after predetermined time elapses, a fact that long press is performed on the input pen PEN is detected. In cases where the motion detection unit 56 does not detect motion and vibration and the touch information processing unit 14 of the information processing device TE which the user desires to use detects a fact that the input pen PEN does not touch (touch-up) within the predetermined time, it is determined that the operation of switching connection between the input pen and the information processing device is performed, and connection is established between the input pen PEN and the information processing device TE which the user desires to use.

Detailed content of the process will be illustrated in flowcharts which will be described later.

Primarily, the third example approximately corresponds to a case where a process acquired by combining the first example with the second example is performed.

In the third example, first, on the side of the input pen possessed by the user, a fact that long press is performed on the switch SW is detected as the operation of switching connection. Thereafter, on the side of the input pen possessed by the user, the fact that the tip part PT of the input pen PEN touches (touch-down) the touch panel of the information processing device TE which the user desires to use and, thereafter, the touch is released (touch-up) is detected as the operation of switching connection.

In addition, on the side of the information processing device which the user desires to use, the fact that the tip part PT of the possessed input pen PEN touches (touch-down) the touch panel and, thereafter, the touch is released (touch-up) is detected by the user.

In addition, it is not demanded that positions of touch panel, which are touched-down and touched-up by the user, are necessarily the same position. For example, the user may perform an operation of moving (swiping) the input pen PEN on the touch panel while touching the input pen PEN after performing touch-down at a certain position of the touch panel of TE and may separate the input pen PEN at a position which is different from the touch-down position.

That is, the user possesses the input pen PEN and may perform a series of operations of touch-down, swipe, and touch-up in the information processing device TE which the user desires to use.

In the third example, after the fact that the switch SW is pressed in the input pen PEN is detected, touch-down and touch-up in the input pen PEN is detected. In a case where the fact that the tip part PT of the input pen PEN touches-down or touches-up is detected within a predetermined time on the side of the information processing device TE which the user desires to use, connection is established between the input pen PEN and the information processing device TE which the user desires to use.

Detailed content of the process will be illustrated in flowcharts which will be described later.

In the fourth example, in the same manner as in the first example, the fact that long press is performed on the switch SW is detected as the operation of switching connection on the side of the input pen possessed by the user.

The user moves in a direction of the information processing device TE, which is desired to use, while possessing the input pen PEN. In a case where another information processing device TE exists around the information processing device TE desired to use, the input pen PEN is caused to approach the information processing device TE desired to use rather than another information processing device TE.

In the fourth example, after the fact that the switch SW is pressed by the input pen PEN is detected, as a process on the side of the input pen, the connection request signal is transmitted until the number of information processing devices TE which can be connected becomes one in principle while performing adjustment of the radio wave output intensity of the wireless signal transmitted from the input pen PEN. In the adjustment of the radio wave output intensity, initially, relatively large radio wave output intensity is set as an initial value, and, thereafter, the radio wave output intensity is gradually lowered.

In a cases where the input pen PEN receives the connection response for the connection request and the number of information processing devices TE, which transmit the connection response, is one, connection is established between the input pen PEN and the information processing device TE.

However, in a case where a plurality of information processing devices TE, which transmit the connection response, exist, the radio wave output intensity is lowered in order to narrow the number of information processing devices TE to one such that connection is established between the input pen PEN and an information processing device TE whose distance to the input pen PEN is shorter.

Figure 10:
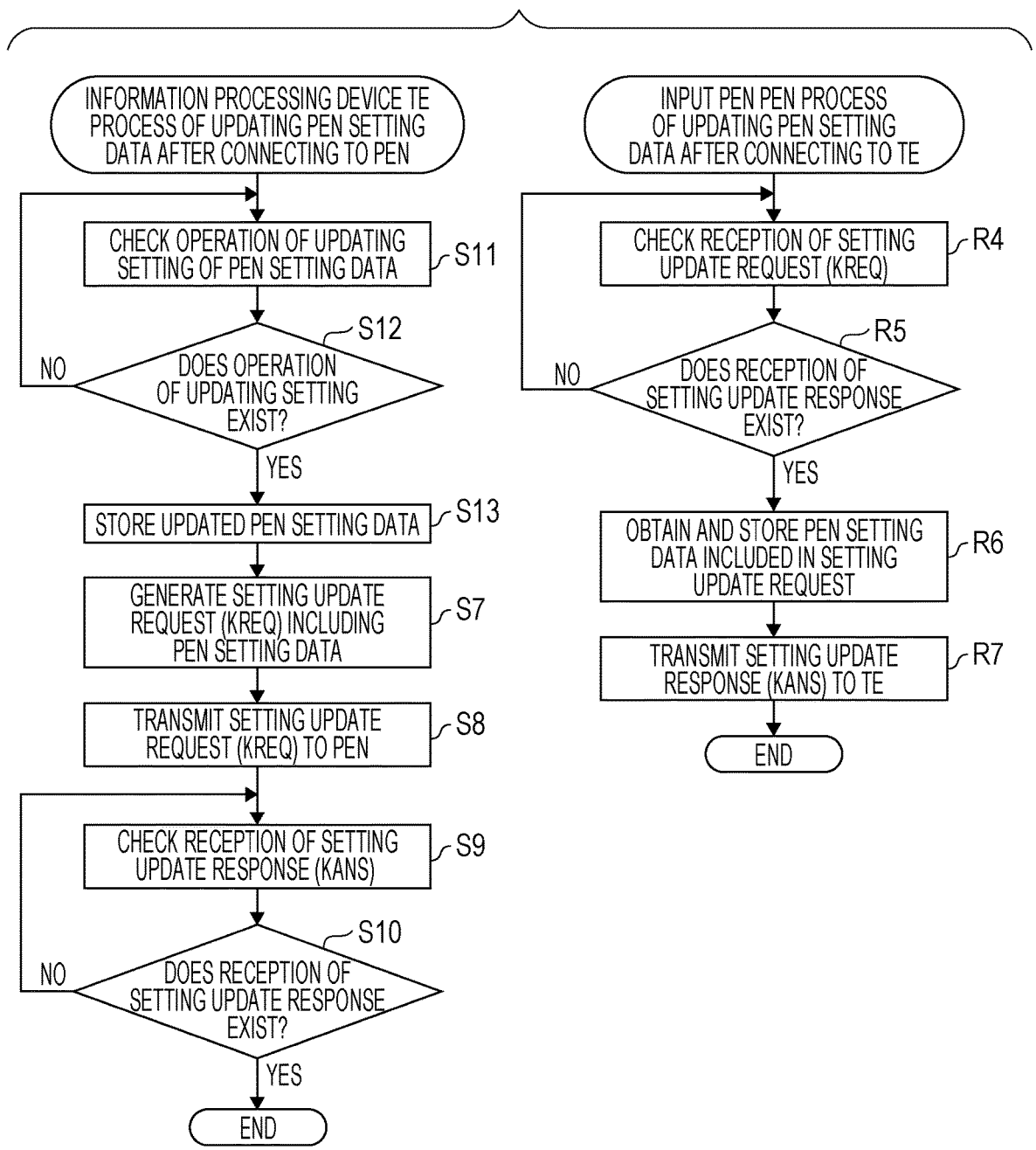
FIG. 10 is a flowchart illustrating an example of a process of updating pen setting data after the input pen is connected according to the present disclosure.

Detailed content of the process will be illustrated in flowcharts which will be described later. Process of Updating Pen Setting Data After Input Pen Is Connected FIG. 10 is a flowchart illustrating an example of a process of updating pen setting data after the input pen is connected according to the present disclosure.

Here, a process of updating the information processing device TE after the input pen is connected and a process of updating the input pen PEN after the information processing device is connected is performed.

A process will be described in a case where the input pen PEN is used in a state in which the input pen PEN and the information processing device TE are already connected and the user changes the pen setting data, such as the pen drawing color, in the information processing device TE.

In step S11 in which the process of updating the information processing device TE is performed, the control unit 11 checks whether or not an input operation of updating the pen setting data is performed.

In a case where an input operation of updating the pen setting data is performed in step S12, the process proceeds to step S13. Otherwise, the process returns to step S11.

In step S13, the updated pen setting data is stored.

Thereafter, in steps S7 to S10, the setting update request (KREQ) is transmitted to the input pen PEN, and reception of the setting update response (KANS) is checked.

That is, in step S7, the setting update request (KREQ) including the stored pen setting data is generated. For example, the setting update request (KREQ) as illustrated in FIG. 9A is generated.

In step S8, the pen setting unit 17 transmits the setting update request (KREQ) to the input pen PEN.

In step S9, it is checked whether or not the setting update response (KANS) transmitted from the input pen PEN is received.

In step S10, in a case where the setting update response (KANS) is not received, the process returns to step S9. In a case where the setting update response (KANS) is received, the process ends.

In a process of updating the input pen PEN, reception of the setting update request (KREQ) is checked in steps R4 to R7. In a case where the setting update request (KREQ) is received, the updated pen setting data is stored, and the setting update response (KANS) is transmitted to the information processing device TE.

That is, in step R4, the setting information obtainment unit 58 checks whether or not the setting update request (KREQ) transmitted from the information processing device TE is received.

In a case where the setting update request (KREQ) is received in step R5, the process proceeds to step R6. Otherwise, the process returns to step R4.

In step R6, the setting information obtainment unit 58 obtains and stores the pen setting data included in the received setting update request (KREQ).

In step R7, the setting update response (KANS) is transmitted to the information processing device TE, and the process ends.

As described above, the pen setting data updated in the information processing device TE is set and stored in the already connected input pen PEN, and, thereafter, the letters and the like are input using new pen setting data.

Process of Obtaining Pen Setting Data after Input Pen is Connected

Figure 11:
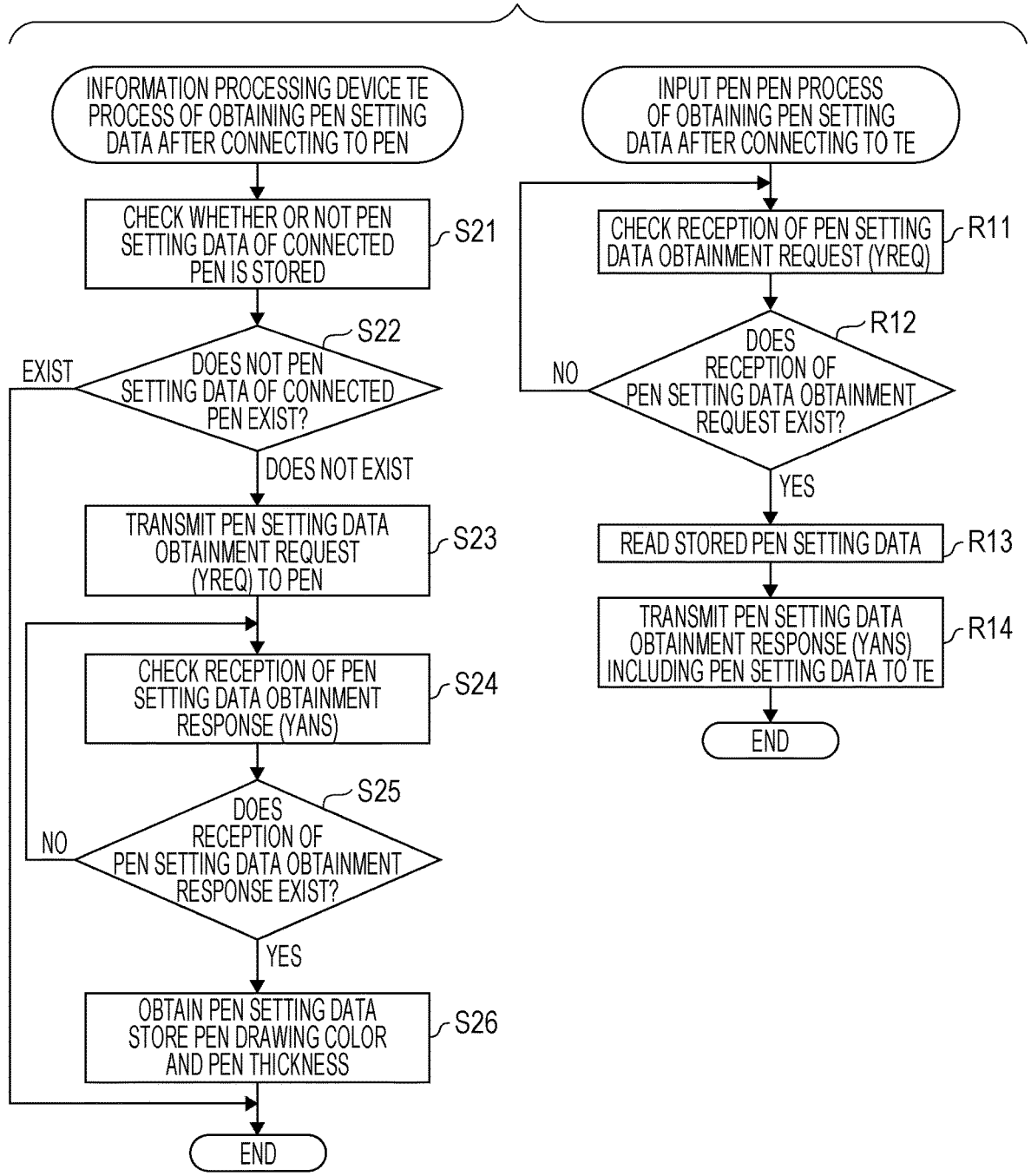
FIG. 11 is a flowchart illustrating an example of a process of obtaining the pen setting data after the input pen is connected according to the present disclosure.

FIG. 11 is a flowchart illustrating an example of a process of obtaining the pen setting data after the input pen is connected according to the present disclosure.

Here, a process of obtaining the pen setting data of the information processing device TE after the input pen is connected and a process of obtaining the pen setting data of the input pen PEN after the information processing device is connected are described.

It is assumed that the input pen PEN and the information processing device TE are in a state in which the input pen PEN and the information processing device TE are already connected and are capable of transmitting and receiving data.

In a case where the input pen PEN is used in the information processing device TE after the input pen PEN and the information processing device TE become a connected state, there is a case where the pen setting data of the connected input pen PEN is not stored yet in the information processing device TE.

In such a case, the information processing device TE requests the pen setting data from the input pen PEN, and obtains the pen setting data stored in the input pen PEN from the input pen PEN.

In step S21 of the process of obtaining the pen setting data of the information processing device TE, it is checked whether or not the pen setting data of the connected input pen PEN is stored in the storage unit 30 of TE.

In a case where the pen setting data of the connected input pen PEN does not exist in step S22, the process proceeds to step S23. In a case where the pen setting data of the connected input pen PEN exists, it is not desired to obtain the pen setting data, the process ends.

In step S23, the pen setting unit 17 transmits the pen setting data obtainment request (YREQ) to the input pen PEN.

In step S24, it is checked whether or not the pen setting data obtainment response (YANS) is received.

In step S25, in a case where the pen setting data obtainment response (YANS) is received, the process proceeds to step S26. Otherwise, the process returns to step S24.

In step S26, the pen setting unit 17 obtains the pen setting data included in the received pen setting data obtainment response (YANS). For example, the pen drawing color and the pen thickness are stored in the storage unit 30, and the process ends.

In step R11 of the process of obtaining the pen setting data of the input pen PEN, it is checked whether or not the pen setting data obtainment request (YREQ) is received.

In a case where the pen setting data obtainment request (YREQ) is received in step R12, the process proceeds to step R13. Otherwise, the process returns to step R11.

In step R13, the pen setting data stored in the storage unit 70 of the input pen PEN is read. For example, the pen drawing color and the pen thickness are read.

In step R14, the device connection control unit 57 generates the pen setting data obtainment response (YANS) including the read pen setting data and transmits the generated pen setting data obtainment response (YANS) to the information processing device TE. Thereafter, the process ends.

According to the above process, the pen setting data of the input pen PEN connected to the information processing device TE is stored in the information processing device TE. Thereafter, the input letters and the like are displayed using the stored pen setting data.

Process of Communicating Pen Detection Data after Input Pen is Connected

Figure 12:
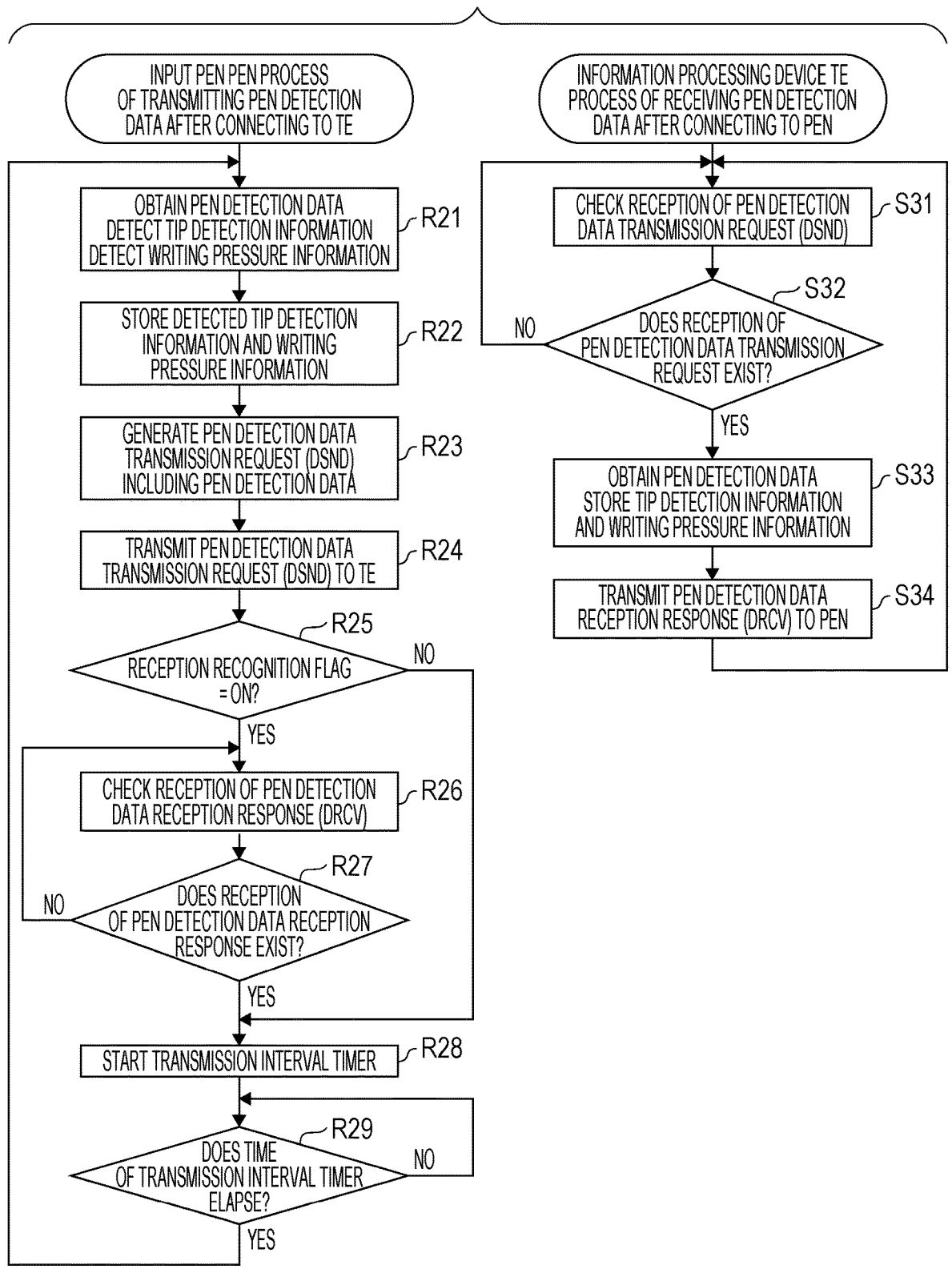
FIG. 12 is a flowchart illustrating an example of a process of communicating pen detection data after the input pen is connected according to the present disclosure.

FIG. 12 is a flowchart illustrating an example of a process of communicating the pen detection data after the input pen is connected according to the present disclosure.

Here, a process of transmitting the pen detection data of the input pen PEN after the information processing device TE is connected and a process of receiving the pen detection data of the information processing device TE after the input pen PEN is connected.

The pen detection data includes the tip detection information and the writing pressure information which are obtained using the input pen PEN as described above, and changes according to a state in which the input pen PEN is used.

It is preferable that the pen detection data is transmitted to the information processing device TE at every fixed time or in a case where a predetermined change exists. In addition, whenever a request is provided from the information processing device TE, the pen detection data may be obtained and transmitted to the information processing device TE.

FIG. 12 illustrates a process of obtaining the pen detection data using the input pen PEN at every fixed time and transmitting the obtained pen detection data to the information processing device TE.

It is assumed that the input pen PEN and the information processing device TE are in a state in which the input pen PEN and the information processing device TE are already connected and are capable of transmitting and receiving the data. In addition, in FIG. 12, a reception recognition flag is a flag used to previously set whether or not reception of the pen detection data reception response (DRCV) is checked. For example, the reception of the pen detection data reception response (DRCV) is checked in a case where the reception recognition flag is set to "ON" and the reception of the pen detection data reception response (DRCV) is not checked in a case where the reception recognition flag is set to "OFF."

In step R21 of a process of transmitting the pen detection data of the input pen PEN, the pen detection data is obtained. For example, the touch detection unit 54 detects the tip detection information 72, and the writing pressure detection unit 55 detects the writing pressure information 75. Furthermore, the motion detection unit 56 may detect the motion information 77.

In step R22, the detected tip detection information, the writing pressure information, and the like are stored as the pen detection data in the storage unit 70.

In step R23, the device connection control unit 57 generates the pen detection data transmission request (DSND) including the stored pen detection data.

In step R24, the pen detection data transmission request (DSND) is transmitted to the information processing device TE.

In step R25, it is checked whether or not the reception recognition flag is set to "ON".

In a case where the reception recognition flag is set to "ON", the process proceeds to step R26. Otherwise, the process proceeds to step R28.

In step R26, it is checked whether or not the pen detection data reception response (DRCV) is received.

In step R27, in a case where the pen detection data reception response (DRCV) is received, the process proceeds to step R28. Otherwise, the process returns to step R26.

In step R28, a transmission interval timer starts. The transmission interval timer is a timer that measures a time interval to transmit the pen detection data transmission request (DSND). Although the time interval may be set to an arbitrary numerical value, the time interval may be set to, for example, a numerical value of a degree of 16 milliseconds.

Otherwise, the user may change the setting of the transmission time interval.

In step R29, it is checked whether or not time which is set to the transmission interval timer elapses. Step R29 is looped until the set time elapses. In a case where the set time elapses, the process returns to step R21, and the processes in steps R21 to R29 are repeated again.

In step S31 of a process of receiving the pen detection data of the information processing device TE, it is checked whether or not the pen detection data transmission request (DSND) is received.

In a case where the pen detection data transmission request (DSND) is received in step S32, the process proceeds to step S33. Otherwise, the process returns to step S31.

In step S33, the pen information obtainment unit 18 obtains the pen detection data included in the pen detection data transmission request (DSND). That is, the tip detection information, the writing pressure information, and the like are obtained and stored in the storage unit 30.

In step S34, the pen detection data reception response (DRCV) is transmitted to the input pen PEN. Thereafter, the process returns to step S31, and the processes are repeated.

According to the above process, the obtained tip detection information, the writing pressure information, and the like are used in a program of the information processing device TE which uses the information input using the input pen PEN.

Process of Switching Connection of Input Pen: First Example

Figure 13:
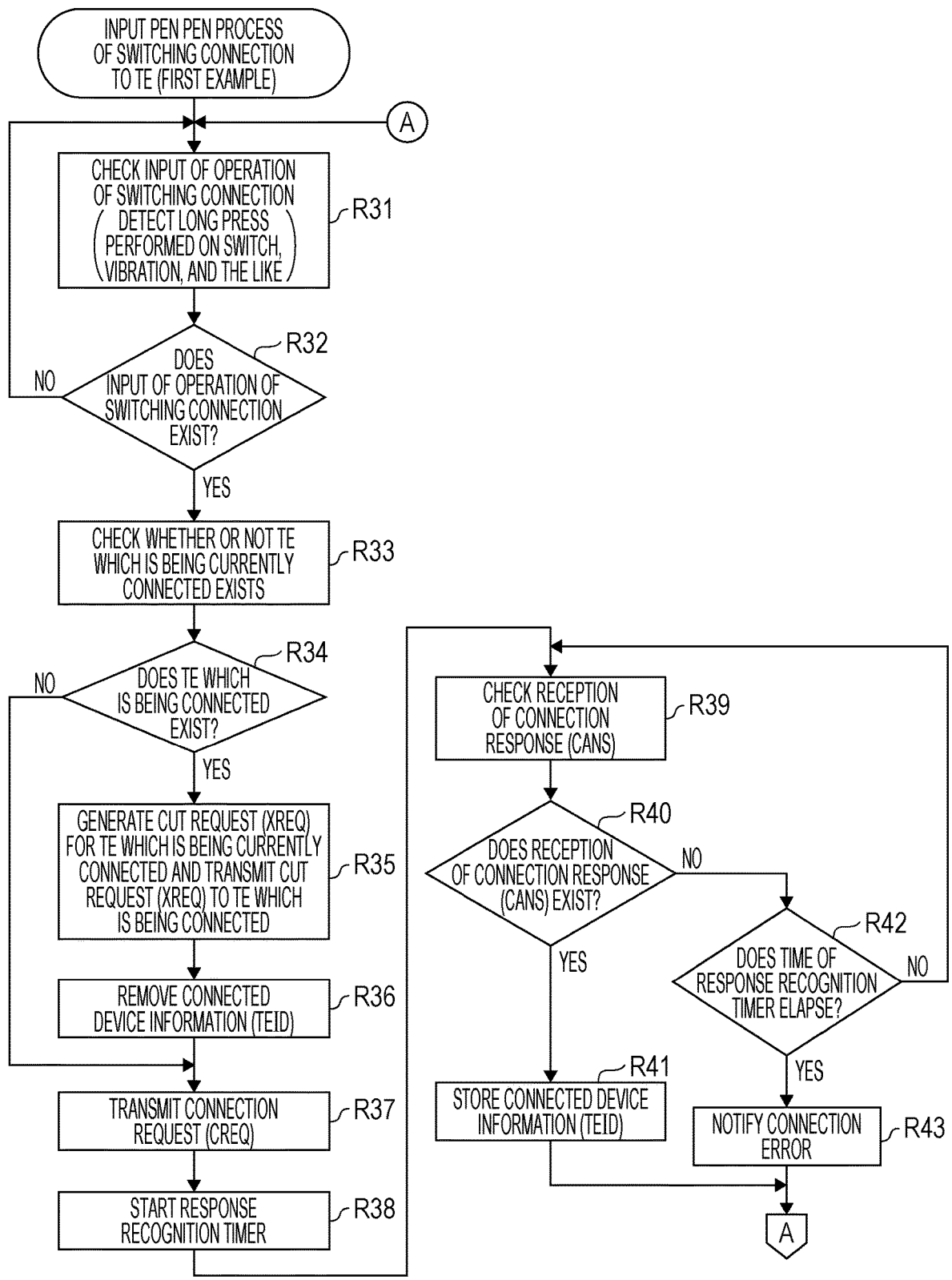
FIG. 13 is a flowchart illustrating a first example of a process of switching connection of the information processing device in the input pen according to the present disclosure.

FIG. 13 is a flowchart illustrating a first example of a process of switching connection of the information processing device TE in the input pen according to the present disclosure.

Figure 14:
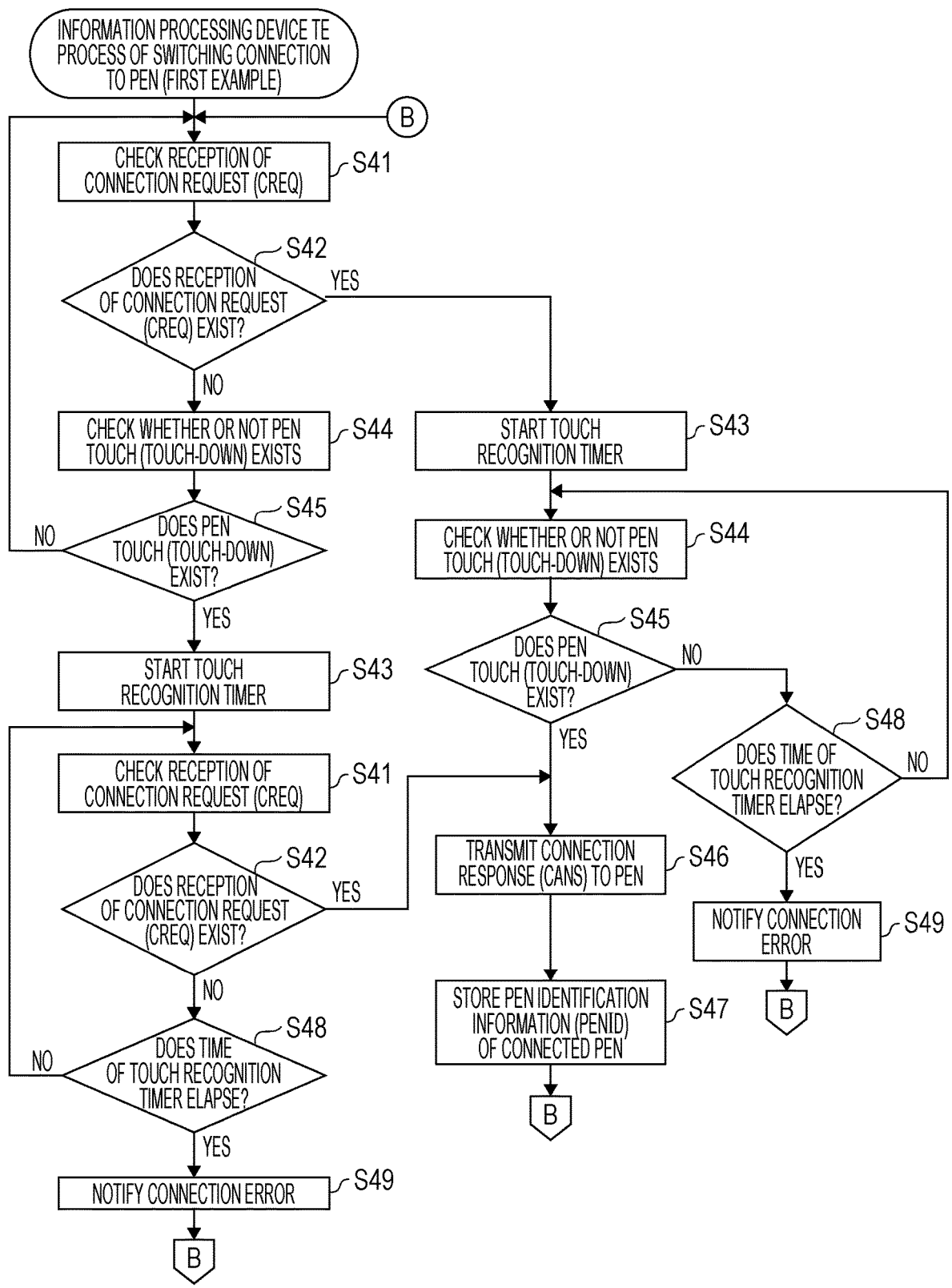
FIG. 14 is a flowchart illustrating the first example of a process of switching connection of the input pen in the information processing device according to the present disclosure.

FIG. 14 is a flowchart illustrating the first example of the process of switching connection of the input pen PEN in the information processing device according to the present disclosure.

The process of switching connection corresponds to the process of the first example illustrated in FIG. 6.

In addition, FIGS. 27A to 27D are schematic explanatory diagrams illustrating an operation performed by the user in the first example.

Figure 27A:
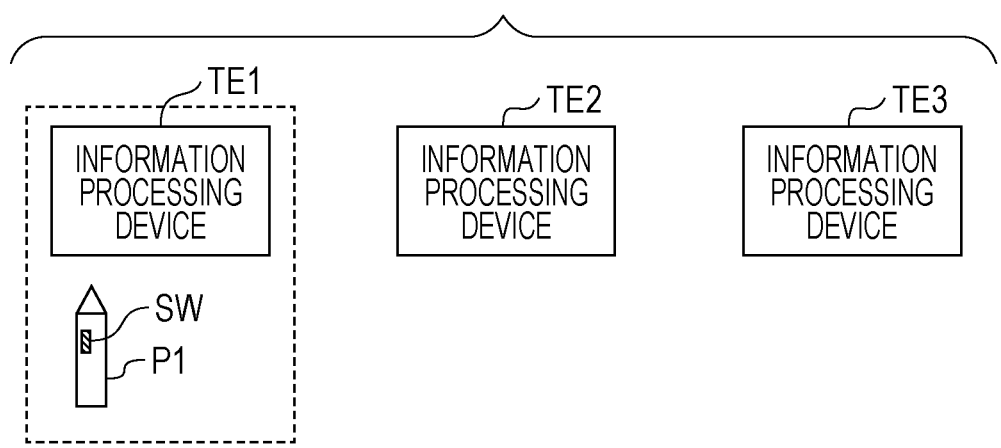
FIGS. 27A to 27D are schematic explanatory diagrams illustrating a user operation in a first example of the process of switching connection of the input pen according to the present disclosure.
Figure 27B:
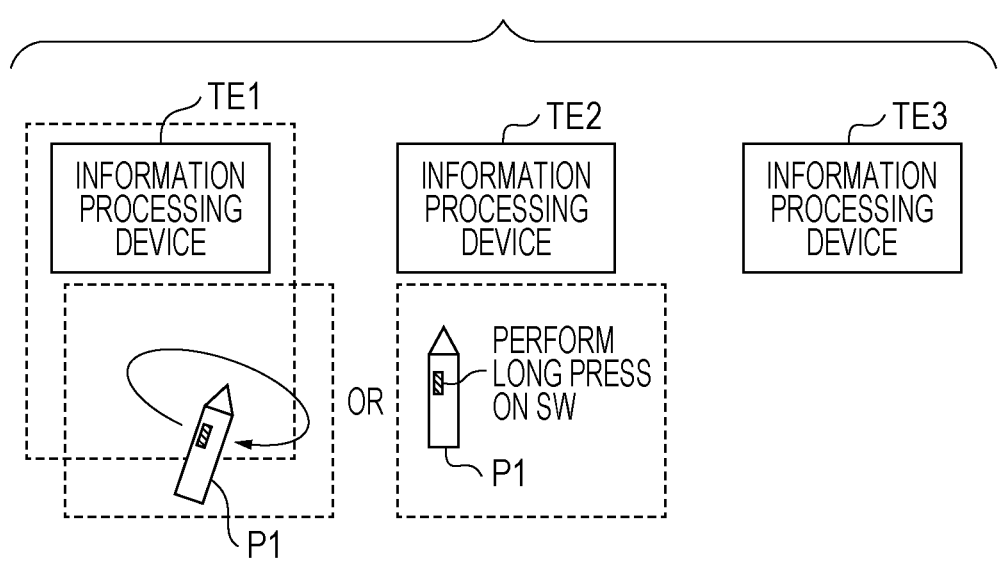

Here, it is assumed that, for example, in cases where the input pen P1 and the information processing device TE1 are in the connection state as illustrated in FIG. 27A and the user desires to switch connection of the input pen, the user performs the operation of switching connection as illustrated in FIG. 27B on the input pen.

In the process of switching connection performed in the input pen PEN of FIG. 13, first, the switching operation detection unit 59 checks whether or not input corresponding to the operation of switching connection is performed in step R31.

For example, it is detected that long press is performed on the switch SW of the input pen PEN as illustrated in FIG. 27B, or it is detected that predetermined vibration is added to the input pen PEN and the gesture is made using the input pen PEN.

In a case where the input corresponding to the operation of switching connection is performed in step R32, the process proceeds to step R33. Otherwise, the process returns to step R31.

In step R33, it is checked whether or not the information processing device TE which is being currently connected exists.

In a case where the information processing device TE which is being currently connected exists in step R34, the process proceeds to step R35. Otherwise, the process proceeds to step R37.

As illustrated in FIG. 27A, in a case where the input pen P1 and the information processing device TE1 are in the connection state, the operation of switching connection illustrated in FIG. 27B is performed, and a process of connection release from the information processing device TE1 which is currently being connected is performed.

In step R35, the cut request (XREQ) is generated in order to cut the information processing device TE which is being currently connected, and the cut request (XREQ) is transmitted to the information processing device TE which is being connected.

In step R36, the connection device information (TEID) stored in the storage unit 70 is removed. Otherwise, the connection device information (TEID) may remain in the storage unit 70 as history information of the information processing device TE which has been connected.

In addition, although not illustrated in the flowchart, after the cut request (XREQ) is transmitted, a step in which it is checked whether or not the cut response (XANS) corresponding to the cut request is received may be provided.

In step R37, the device connection control unit 57 generates the connection request (CREQ), and the communication unit 52 transmits the connection request (CREQ).

The connection response (CANS) with respect to the connection request (CREQ) is transmitted from the information processing device TE which is caused to touch the input pen PEN by the user, and thus the connection request (CREQ) may be transmitted without specifying the information processing device TE which is a counterpart to which the connection request (CREQ) is transmitted.

In step R38, the response recognition timer starts.

The response recognition timer is a timer which measures time in which the connection response (CANS) is received. Although the time may be set to an arbitrary numerical value, the time may be set to, for example, a numerical value of a degree of 500 milliseconds. Otherwise, the user may change the setting of the time.

In a case where, after the connection request (CREQ) is transmitted, the connection response (CANS) is received until the time which is set to the response recognition timer elapses, it is determined that the connection is established between the input pen PEN and the information processing device TE.

In step R39, it is checked whether or not the connection response (CANS) transmitted from the information processing device TE is received.

In a case where the connection response (CANS) is received in step R40, the process proceeds to step R41. Otherwise, the process proceeds to step R42.

Since the connection response (CANS) is received in step R41, the connection is established with the information processing device TE, and thus the device identification information (TEID) included in the connection response (CANS) is stored as the connection device information (TEID) 78 in the storage unit 70. Thereafter, the process returns to step R31. Otherwise, the process may end.

In a case where time which is set to the response recognition timer elapses in step R42, the process proceeds to step R43. In a case where the time does not elapse, the process returns to step R39.

In step R43, a connection error which indicates that the process of connection establishment with the information processing device TE is not possible is notified to the user. The connection error may be notified using, for example, sounds or light.

Thereafter, the process may return to step R31 or the process may end.

Meanwhile, the process in step R43 may be omitted.

Hereinabove, the process of switching connection on a side of the input pen in the first example has been described.

The process of switching connection in the information processing device TE illustrated in FIG. 14 is a process performed in an information processing device TE that the user desires to use the input pen PEN from now on.

Figure 27C:
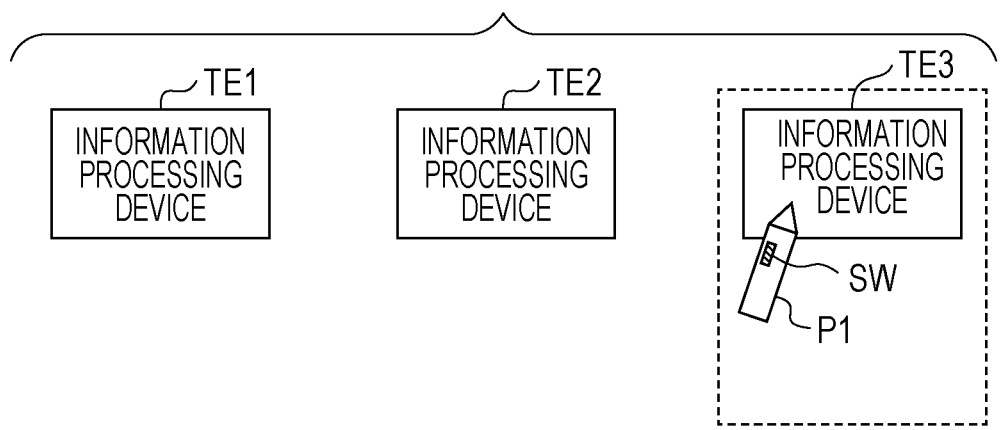

After the user performs the operation of switching connection as illustrated in FIG. 27B, the user possess the input pen P1 and moves to the information processing device TE3 that the user desires to use from now on, and touches (touch-down) the input pen P1 to the display screen of the information processing device TE3, as illustrated in FIG. 27C.

In the process of switching connection in the information processing device TE of FIG. 14, first, the pen connection control unit 16 checks whether or not the connection request (CREQ) is received in step S41.

In a case where the connection request (CREQ) is received in step S42, the process proceeds to step S43. Otherwise, the process proceeds to step S44.

In step S43, the touch recognition timer starts.

The touch recognition timer is a timer which measures time in which touch (touch-down) of the input pen is recognized. Although the time may be set to an arbitrary numerical value, the time may be set to, for example, a numerical value of a degree of 100 milliseconds. Otherwise, the user may change the setting of the time.

In a case where a fact that touch-down exists is recognized until the time which is set in the touch recognition timer elapses after the connection request (CREQ) is received, it is determined that the connection is established between the input pen PEN and the information processing device TE.

After step S43, the touch information processing unit 14 checks whether or not touch (touch-down) of the input pen exists in step S44.

In a case where the touch (touch-down) of the input pen exists in step S45, the process proceeds to step S46. Otherwise, the process proceeds to step S48.

In step S46, the pen connection control unit 16 transmits the connection response (CANS) to the input pen PEN which transmitted the connection request (CREQ).

In step S47, the pen identification information (PENID) is stored in the connected input pen PEN. Thereafter, the process returns to step S41. Otherwise, the process may end.

In a case where time which is set in the touch recognition timer elapses in step S48, the process proceeds to step S49. In a case where the time does not elapse, the process returns to step S44.

In step S49, a connection error which indicates that the process of connection establishment with the input pen PEN is not possible is notified to the user. Thereafter, the process may return to step S41 or the process may end.

Meanwhile, the process in step S49 may be omitted.

In contrast, after step S42, a process which is the same as the process in the above-described step S44 is performed. That is, the touch information processing unit 14 checks whether the touch (touch-down) of the input pen exists.

Here, in a case where the touch (touch-down) of the input pen exists in step S45, the process proceeds to step S43. Otherwise, the process returns to step S41.

Subsequently, in step S43, the touch recognition timer starts. In step S41, the pen connection control unit 16 checks whether the connection request (CREQ) is received.

In a case where the connection request (CREQ) is received in step S42, the process proceeds to step S46. Otherwise, the process proceeds to step S48.

In a case where time which is set in the touch recognition timer elapses in step S48, the process proceeds to step S49. In a case where the time does not elapse, the process returns to step S41.

In subsequent steps S46, S47, and S49, the same process as described above may be performed.

Hereinabove, the process of switching connection on a side of the information processing device in the first example has been described.

Figure 26:
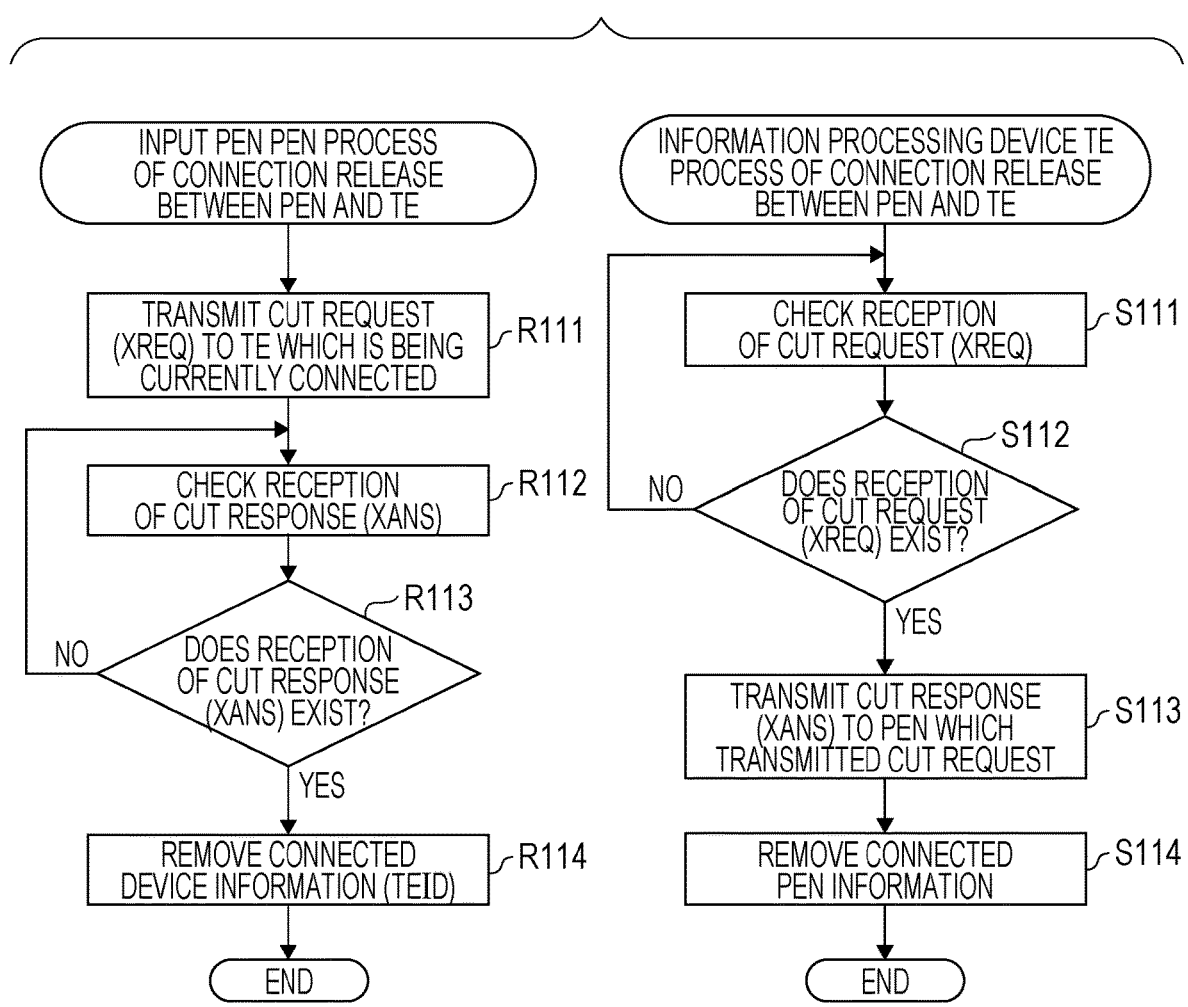
FIG. 26 is a flowchart illustrating an example of a process of connection release between the input pen and the information processing device according to the present disclosure.

FIG. 26 is a flowchart illustrating an example of a process of connection release between the input pen and the information processing device according to the present disclosure.

In step R111 of a process of connection release from the input pen PEN, the cut request (XREQ) is transmitted to the information processing device TE which is being currently connected.

In step R112, reception of the cut response (XANS) is checked.

In a case where the cut response (XANS) is received in step R113, the process proceeds to R114. Otherwise, the process returns to step R112.

In step R114, the connection device information (TEID) stored in the storage unit 70 is removed, and the process ends.

Meanwhile, in a case where it is not possible to receive the cut response (XANS) equal to or longer than a predetermined time, the process may end.

In step S111 of a process of connection release from the information processing device TE, reception of the cut request (XREQ) is checked.

In a case where the cut request (XREQ) is received in step S112, the process proceeds to S113. Otherwise, the process returns to step S111.

In step S113, the cut response (XANS) is transmitted to the input pen PEN which transmitted the cut request (XREQ).

In step S114, the connection pen information (PENID) stored in the storage unit 30 is removed, and the process ends.

Figure 27D:
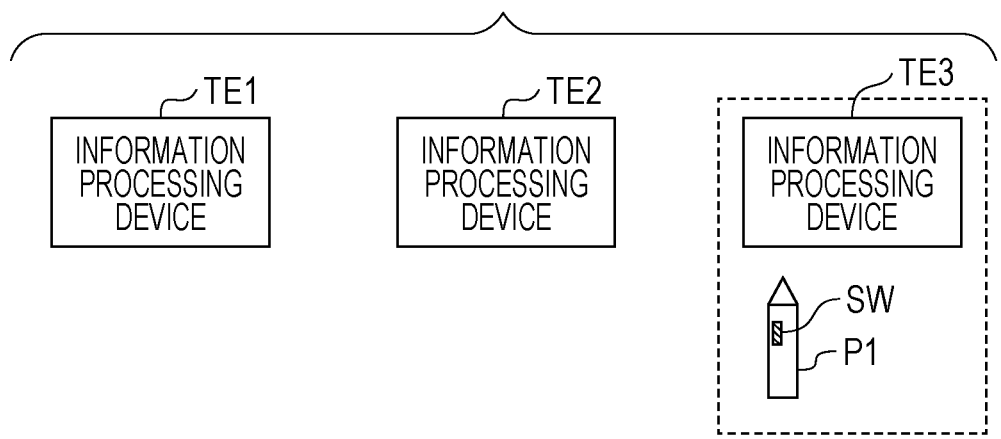

As described above, in a case where the process of switching connection of FIGS. 13 and 14 is performed, the connection between the input pen P1 and the information processing device TE1 is released as illustrated in FIG. 27D, the input pen P1 is connected to the information processing device TE3, and thus it is possible to use the input pen P1 in the information processing device TE3.

In this case, the process of switching connection is performed in a case where the user just performs the operation of switching connection in FIG. 27B and the touch operation in FIG. 27C, and thus, it is possible to rapidly perform the process of switching connection. The input operation of displaying the switch display screen or the like is not performed, and thus it is possible to reduce operational loads of the user.

Process of Switching Connection to Input Pen: Second Example

Figure 15:
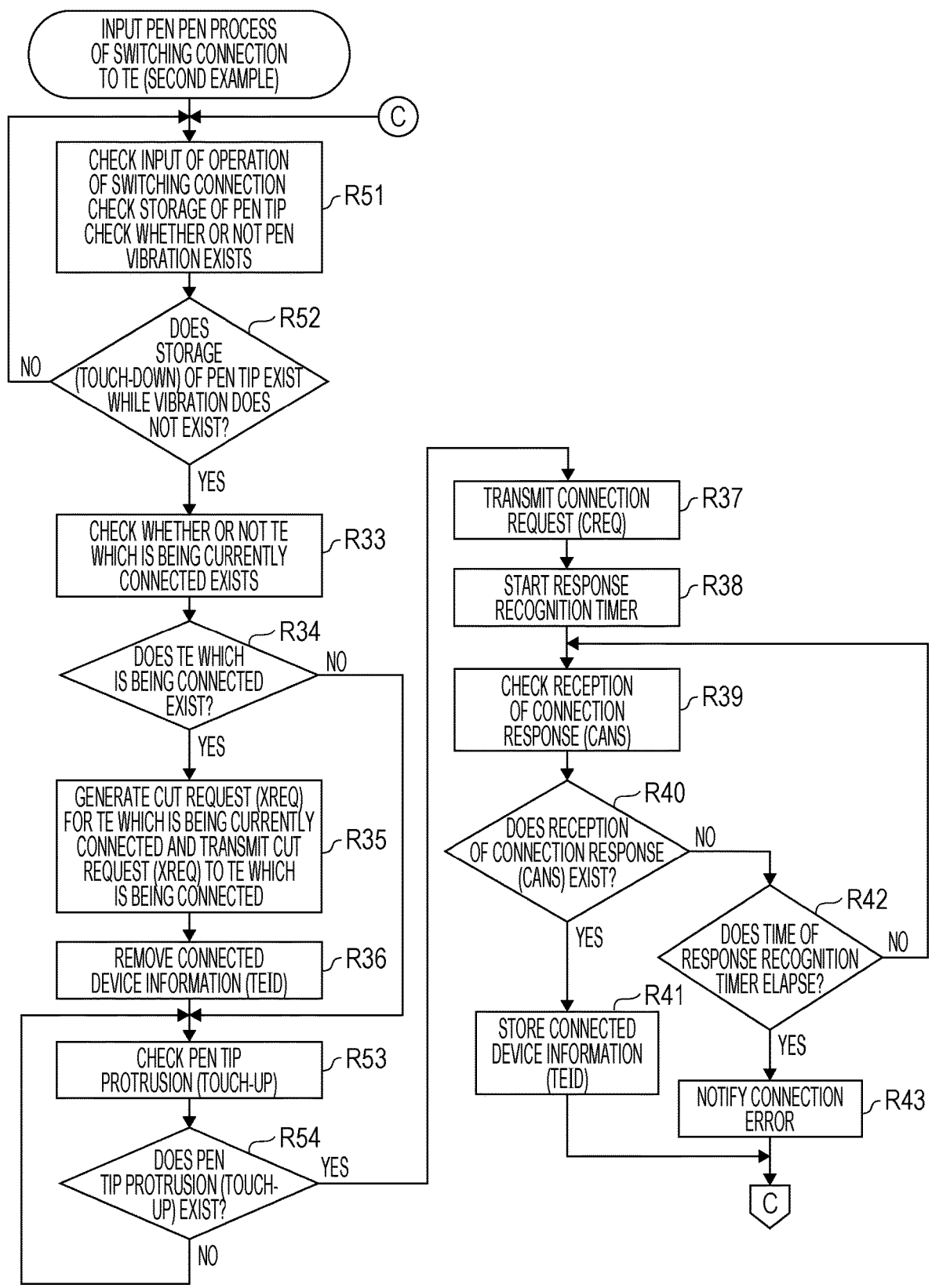
FIG. 15 is a flowchart illustrating a second example of the process of switching connection of the information processing device in the input pen according to the present disclosure.

FIG. 15 is a flowchart illustrating a second example of the process of switching connection of the information processing device TE in the input pen according to the present disclosure.

Figure 16:
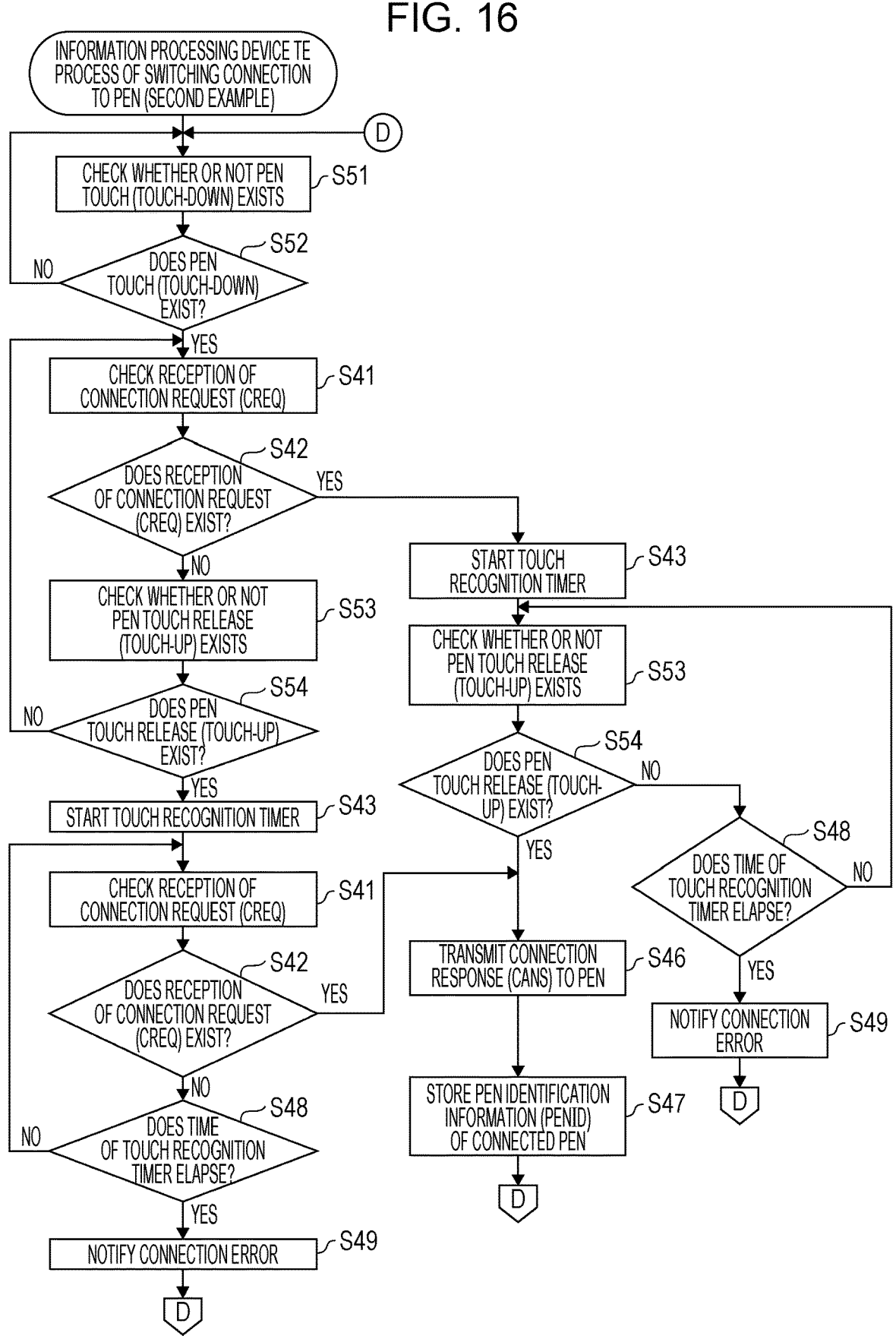
FIG. 16 is a flowchart illustrating the second example of the process of switching connection of the input pen in the information processing device according to the present disclosure.

FIG. 16 is a flowchart illustrating the second example of the process of switching connection of the input pen PEN in the information processing device according to the present disclosure.

The process of switching connection corresponds to the process of the second example illustrated in FIG. 6.

In steps below, the same step numbers are given in a case where processes which are the same as the processes illustrated in FIG. 13 or the like are performed.

In addition, FIGS. 28A to 28D are schematic explanatory diagrams illustrating an operation performed by the user in the second example.

Figure 28A:
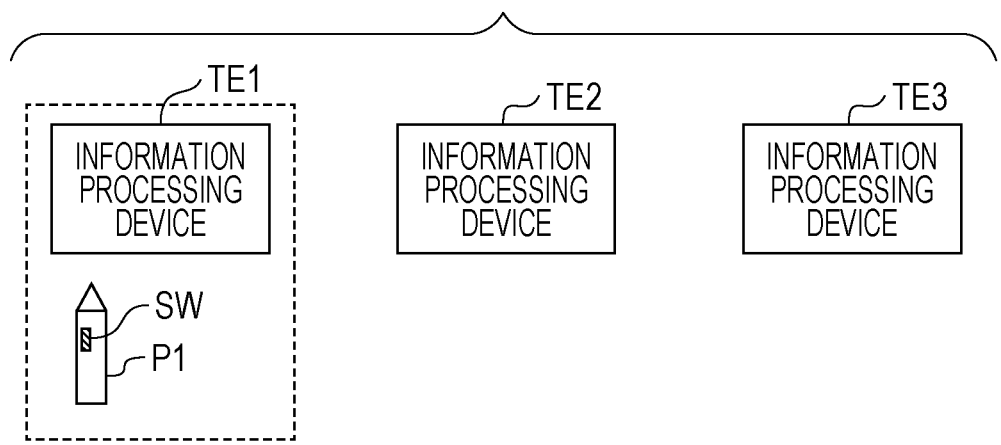
FIGS. 28A to 28D are schematic explanatory diagrams illustrating a user operation in a second example of the process of switching connection of the input pen according to the present disclosure.
Figure 28B:
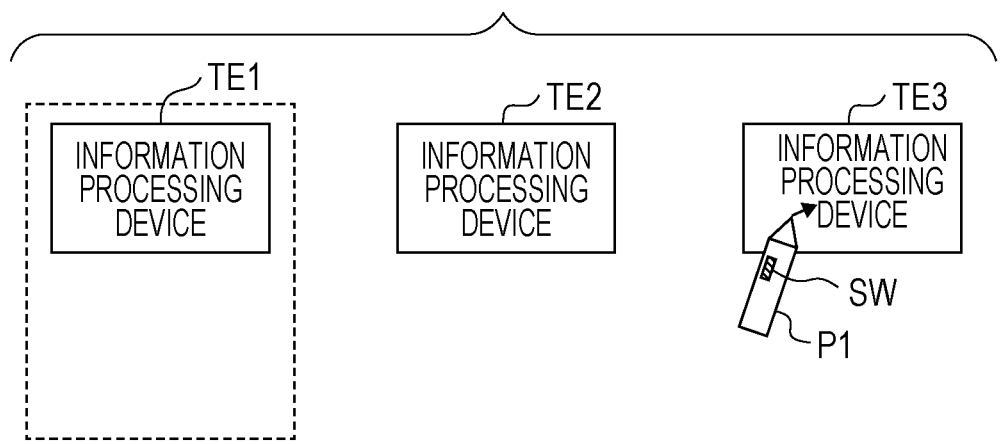
Figure 28C:
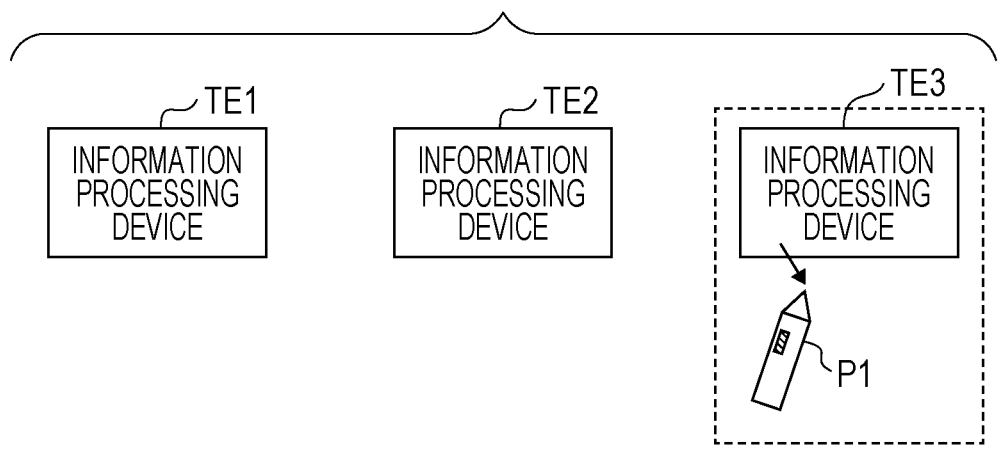

Here, it is assumed that, for example, in cases where the input pen P1 and the information processing device TE1 are in the connection state as illustrated in FIG. 28A and the user desires to switch connection of the input pen, the user performs the operation of switching connection as illustrated in FIGS. 28B and 28C on the input pen.

In the second example, the user continuously performs an operation (touch-down) of causing the input pen P1 to touch the touch panel of the information processing device TE3 which is desired to use and an operation (operation of releasing the touch: touch-up) of separating the input pen P1 from the touch panel. In addition, in order to clearly detect that the user touches-down the touch panel, it is preferable that the input pen P1 is caused to continuously touch the touch panel equal to or longer than a predetermined time (for example, 3 seconds or more) in the operation (touch-down) of causing the input pen P1 to touch the touch panel of the information processing device TE3. In a case where it is detected that the input pen P1 is continuously touched to the touch panel equal to or longer than a predetermined time, it is preferable that it is determined that the touch-down operation is performed.

In the process of switching connection in the input pen PEN of FIG. 15, first, in step R51, the switching operation detection unit 59 checks whether or not input corresponding to the operation of switching connection is performed.

Here, the touch detection unit 54 checks storage of the tip part PT of the input pen (slide to the inside of the pen) and the motion detection unit 56 checks whether or not vibration exists.

That is, the touch-down operation of causing the tip part PT of the input pen PEN to touch the information processing device TE is performed as illustrated in FIG. 28B, and it is checked that motion and vibration are not generated in the input pen PEN.

In step R52, in a case where the touch-down operation is performed in such a way that the tip part PT of the input pen PEN slides to the inside of the pen and it is detected that motion and vibration are not generated in the input pen PEN, the process proceeds to step R33. Otherwise, the process returns to step R51.

In the same manner as illustrated in FIG. 13, it is checked whether or not information processing device TE which is being currently connected exists in step R33. In a case where the information processing device TE which is being currently connected exists in step R34, the process proceeds to step R35. Otherwise, the process proceeds to step R53.

As illustrated in FIG. 28A, in a case where it is assumed that the input pen P1 and the information processing device TE1 are in the connection state, a process of connection release from the information processing device TE1 which is currently being connected is performed by performing the operation of switching connection of FIG. 28B.

In step R35, in order to cut the information processing device TE which is being currently connected, the cut request (XREQ) is generated, and the cut request (XREQ) is transmitted to the information processing device TE which is being connected.

In step R36, the connection device information (TEID) stored in the storage unit 70 is removed. Otherwise, the connection device information (TEID) may remain in the storage unit 70 as history information of the information processing device TE which has been connected.

In step R53, the touch detection unit 54 checks protrusion (slide to the outside of the pen) of the tip part PT of the input pen.

That is, as illustrated in FIG. 28C, in a case where an operation (touch release: touch-up operation) of separating the tip part PT of the input pen PEN, which touches the information processing device TE, from the information processing device TE is performed, a fact that the tip part PT of the input pen PEN protrudes (slides to the outside of the pen) is detected.

In a case where the fact that the tip part PT of the input pen slides to the outside of the pen (touch-up operation) is detected in step R54, the process proceeds to step R37. Otherwise, the process returns to step R53.

Step R37 is the same process as illustrated in FIG. 13, and, hereinafter, processes in steps R38 to R43 are performed in the same manner as in FIG. 13.

Here, in a case where the connection response (CANS) is received until time which is set in the response recognition timer elapses after the connection request (CREQ) is transmitted, it is determined that the connection is established between the input pen PEN and the information processing device TE, and the device identification information (TEID) of the information processing device TE is stored as the connection device information (TEID) 78 in the storage unit 70.

Hereinabove, the process of switching connection on the side of the input pen according to the second example is described.

The process of switching connection in the information processing device TE of FIG. 16 is a process executed in the information processing device TE that the user desires to use the input pen PEN from now on.

As illustrated in FIG. 28B, the user possesses the input pen P1, moves to the information processing device TE3 that the user desires to use from now on, touches (touch-down) the input pen P1 to the touch panel of the information processing device TE3, and performs the operation (touch-up) of separating the input pen P1, as illustrated in FIG. 28C.

In the process of switching connection in the information processing device TE of FIG. 16, first, in step S51, it is checked whether or not the input pen PEN touches (touch-down) the touch panel.

In a case where the input pen PEN touches (touch-down) in step S52, the process proceeds to step S41. Otherwise, the process returns to step S51.

In step S41, reception of the connection request (CREQ) transmitted from the input pen PEN is checked in the same manner as in FIG. 14. In a case where the connection request (CREQ) is received in step S42, the process proceeds to step S43. In a case where the connection request (CREQ) is not received, the process proceeds to step S53.

In step S43, in the same manner as in FIG. 14, the touch recognition timer starts.

Subsequent to step S43, it is checked whether or not the touch of the input pen PEN is released (touch-up) in step S53.

In a case where the touch of the input pen PEN is released (touch-up) in step S54, the process proceeds to step S46. Otherwise, the process proceeds to step S48.

Processes in steps S46 to S49 are the same as those in FIG. 14.

In a case where it is detected that the touch of the input pen PEN is released (touch-up) in step S46, the connection response (CANS) is transmitted to the input pen PEN which transmitted the connection request (CREQ), and the pen identification information (PENID) of the connected input pen PEN is stored in step S47.

In contrast, subsequent to step S42, a process which is the same as in step S53 is performed. That is, it is checked whether or not the touch release (touch-up) of the input pen PEN exists.

Here, in a case where the touch release (touch-up) of the input pen exists in step S54, the process proceeds to step S43. Otherwise, the process returns to step S41.

Subsequently, in step S43, the touch recognition timer starts. In step S41, the pen connection control unit 16 checks whether or not the connection request (CREQ) is received.

In a case where the connection request (CREQ) is received in step S42, the process proceeds to step S46. Otherwise, the process proceeds to step S48.

In a case where time which is set in the touch recognition timer elapses in step S48, the process proceeds to step S49. In a case where the time does not elapse, the process returns to step S41.

Hereinabove, the process of switching connection on the side of the information processing device according to the second example is described.

Figure 28D:
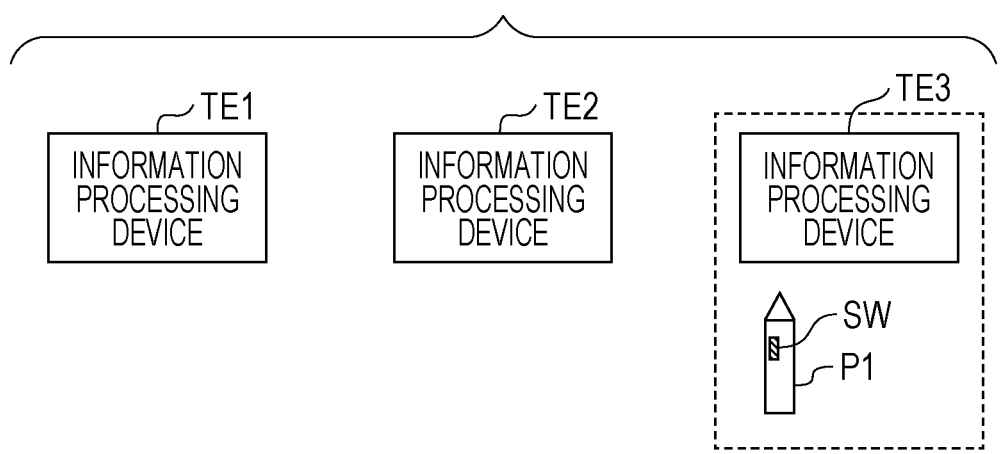

As described above, in a case where the process of switching connection illustrated in FIGS. 15 and 16 are performed, the connection between the input pen P1 and the information processing device TE1 is released, the input pen P1 is connected to the information processing device TE3, and the input pen P1 can be used in the information processing device TE3, as illustrated in FIG. 28D.

In this case, the process of switching connection is performed in a case where the user just performs the touch operation (touch-down) and the touch release operation (touch-up) of FIGS. 28B and 28C in the information processing device TE that the user desires to use from now on, and thus it is possible to rapidly perform the process of switching connection. Furthermore, the input operation of displaying the switch display screen or the like is not performed, and thus it is possible to reduce operational loads of the user.

Process of Switching Connection to Input Pen: Third Example

Figure 17:
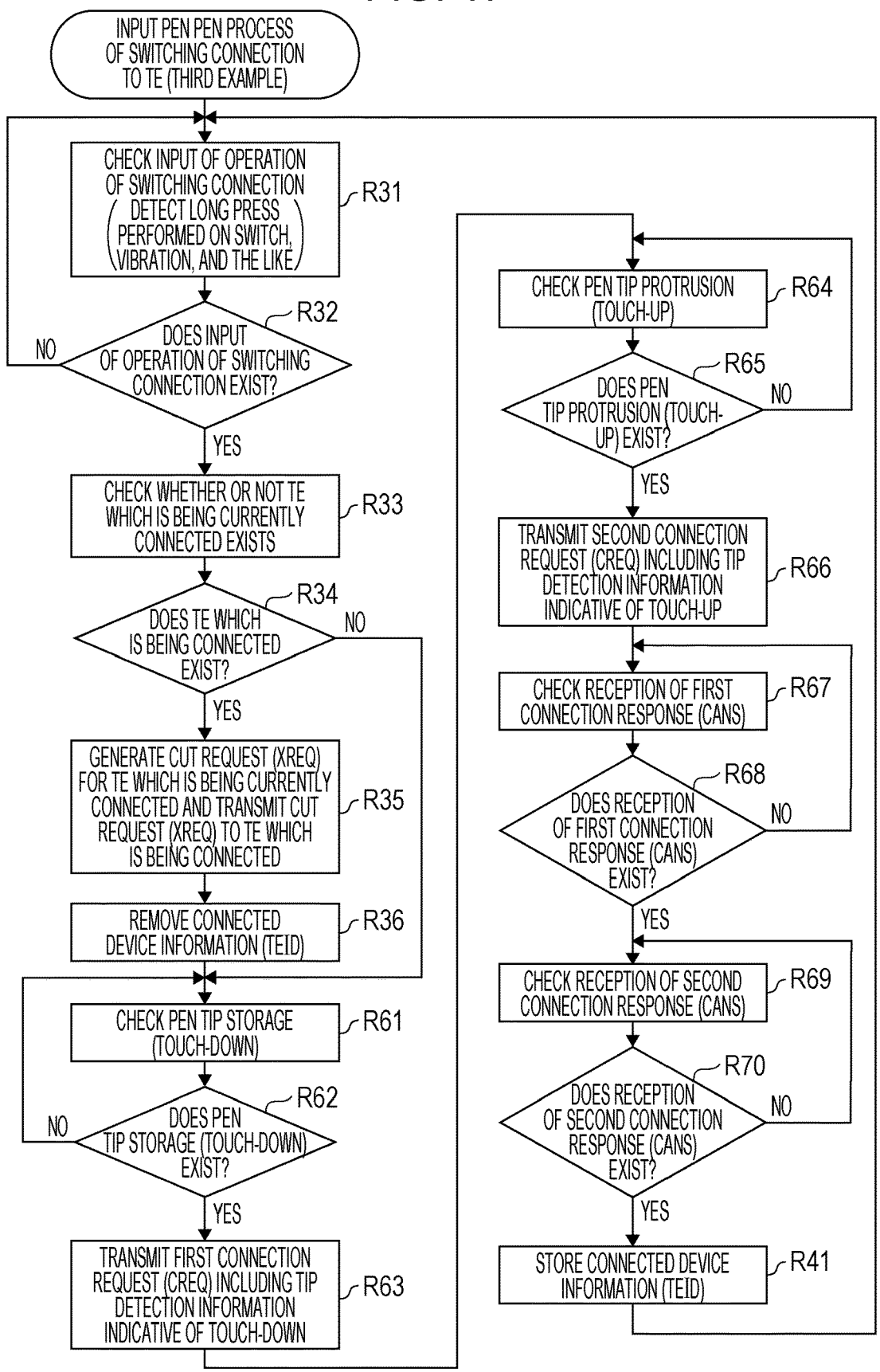
FIG. 17 is a flowchart illustrating a third example of the process of switching connection of the information processing device in the input pen according to the present disclosure.

FIG. 17 is a flowchart illustrating a third example of the process of switching connection of the information processing device TE in the input pen according to the present disclosure.

Figure 18:
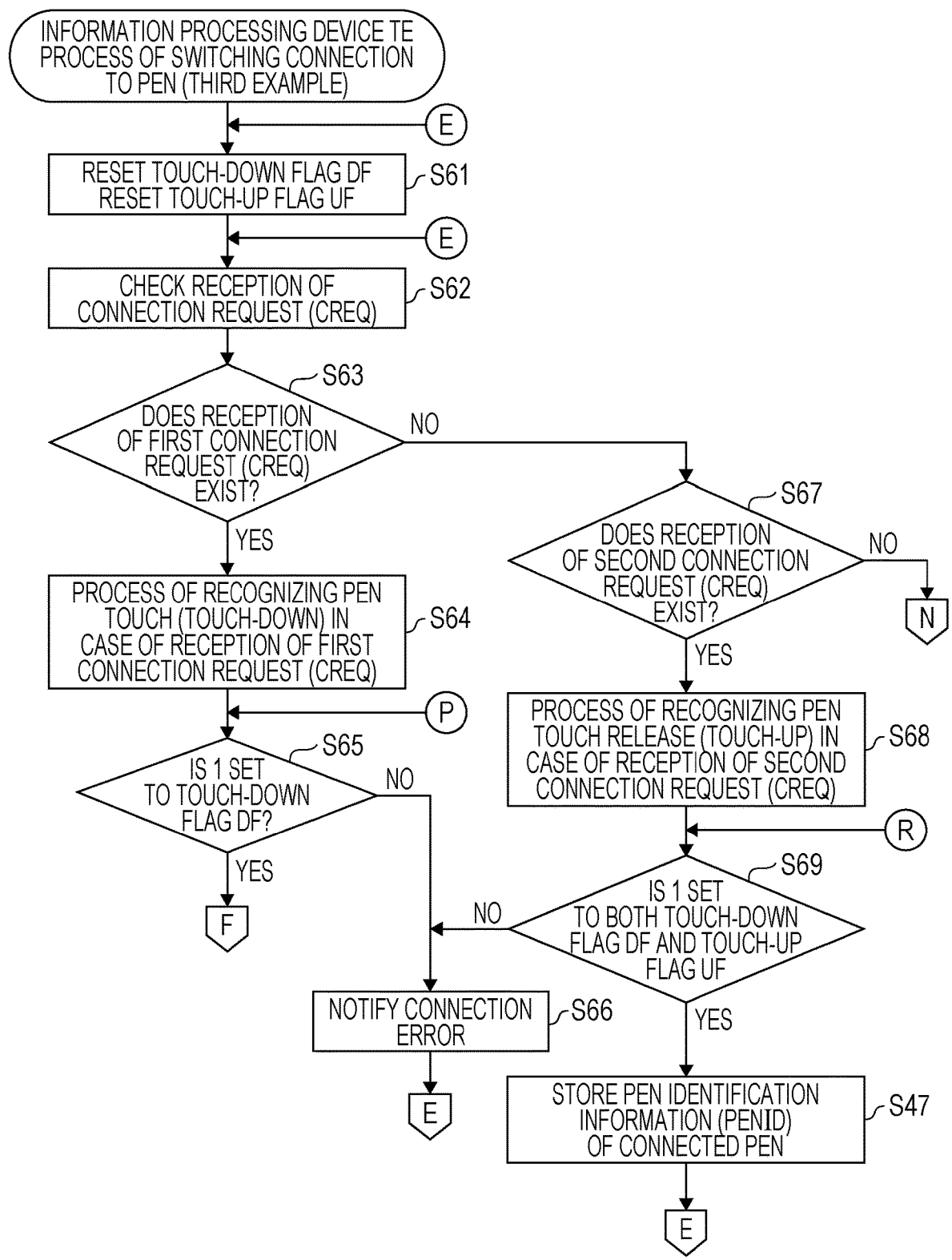
FIG. 18 is a flowchart illustrating the third example of the process of switching connection of the input pen in the information processing device according to the present disclosure.

FIG. 18 is a flowchart illustrating the third example of the process of switching connection of the input pen PEN in the information processing device according to the present disclosure.

The process of switching connection corresponds to the process of the third example illustrated in FIG. 6.

In steps below, the same step numbers are given in a case where processes which are the same as the processes illustrated in FIG. 13 or the like are performed.

In addition, FIGS. 29A to 29E are schematic explanatory diagrams illustrating an operation performed by the user according to the third example.

Figure 29A:
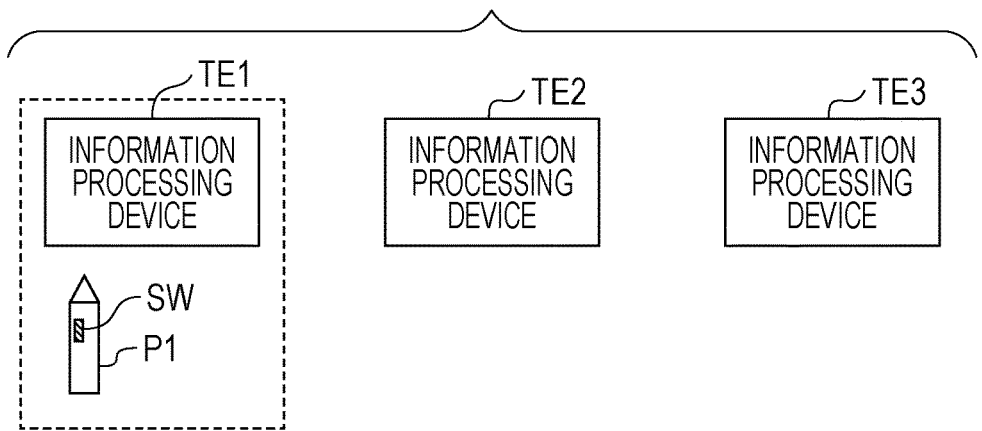
FIGS. 29A to 29E are schematic explanatory diagrams illustrating a user operation in a third example of the process of switching connection of the input pen according to the present disclosure.
Figure 29B:
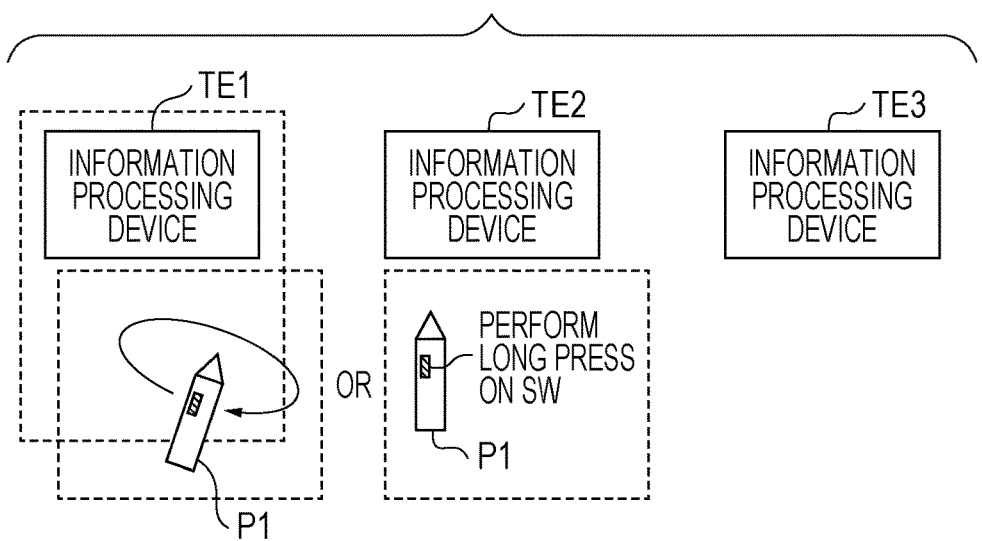

Here, it is assumed that, for example, in cases where the input pen P1 and the information processing device TE1 are in the connection state as illustrated in FIG. 29A and the user desires to switch connection of the input pen, the user first performs the operation of switching connection as illustrated in FIG. 29B on the input pen P1 in the same manner as in the first example. The user performs long press on the switch SW of the input pen P1 or vibrates the input pen P1.

Figure 29C:
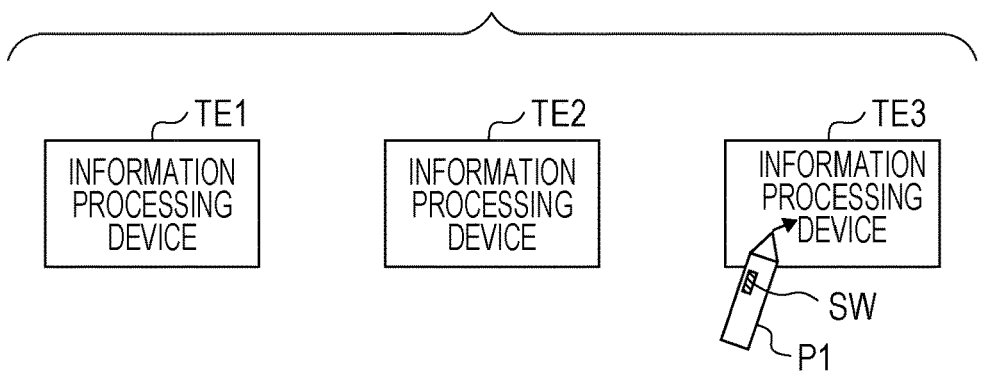
Figure 29D:
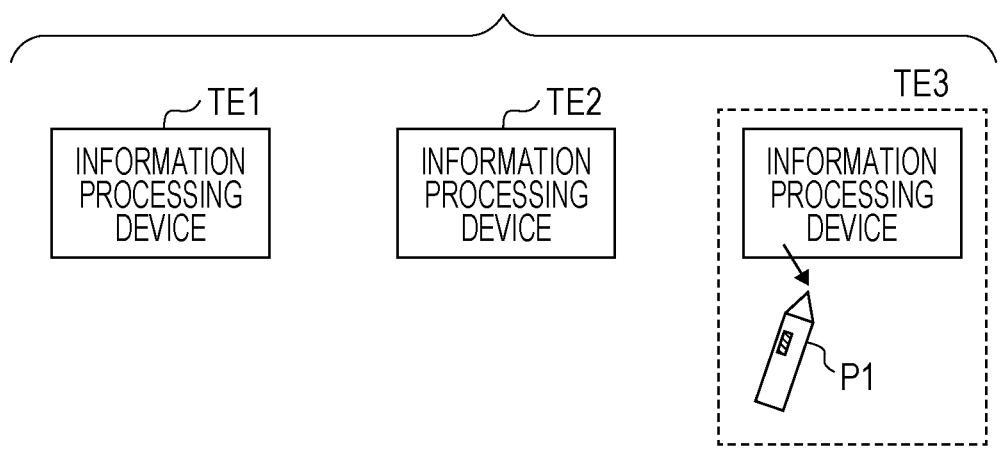

Subsequently, it is assumed that the user possesses the input pen P1, moves to the information processing device TE3 which is desired to be used, and performs the operation of switching connection of the input pen P1 as illustrated in FIGS. 29C and 29D. In the third example, the user continuously performs an operation (touch-down) of causing the input pen P1 to touch the touch panel of the information processing device TE3 which is desired to be used and an operation (operation of releasing the touch: touch-up) of causing the input pen P1 to be separated from the touch panel in the same manner as in the second example.

In the process of switching connection in the input pen PEN of FIG. 17, first, processes which are the same as processes in steps R31 to R36 illustrated in FIG. 13 are performed.

That is, input of the operation of switching connection is checked and the process of connection release from the information processing device TE which is being connected is performed.

Subsequent to step R36, in step R61, storage (slide to the inside of the pen) of the tip part PT of the input pen, that is, whether or not the input pen PEN touches (touch-down) the information processing device TE is checked.

In a case where it is detected that the tip part PT of the input pen slides to the inside of the pen and the input pen PEN touches (touch-down) the information processing device TE in step R62, the process proceeds to step R63. Otherwise, the process returns to step R61.

In step R63, a first connection request (CREQ) including the tip detection information 72 indicative of touch-down is transmitted.

The first connection request (CREQ) is data in which the tip detection information 72 indicative of touch-down is added to the connection request (CREQ) illustrated in FIG. 8A.

In a case where the information processing device TE receives the connection request (CREQ) and the tip detection information 72 included in the connection request (CREQ) is recognized, a fact that the first connection request (CREQ) corresponding to touch-down is received is understood.

In step R64, protrusion (slide to the outside of the pen) of the tip part PT of the input pen is checked, that is, a fact that the input pen PEN is separated from the information processing device TE (touch release: touch-up) is checked.

In a case where facts that the tip part PT of the input pen slides to the outside of the pen and the input pen PEN is separated from the information processing device TE (touch release: touch-up) are detected in step R65, the process proceeds to step R66. Otherwise, the process returns to step R64.

In step R66, a second connection request (CREQ) including the tip detection information 72 which indicates that touch-up is performed is transmitted.

The second connection request (CREQ) is data in which the tip detection information 72, which indicates that touch-up is performed, is added to the connection request (CREQ) illustrated in FIG. 8A.

In a case where the information processing device TE receives the connection request (CREQ) and the tip detection information 72 included in the connection request (CREQ) is recognized, it is understood that the second connection request (CREQ) corresponding to touch-up is received.

In step R67, reception of the first connection response (CANS) is checked.

It is assumed that the first connection response (CANS) includes the tip detection information 72 indicative of touch-down. In a case where the received connection response (CANS) includes the tip detection information 72 indicative of touch-down, it is determined that the connection response (CANS) is the first connection response (CANS). In a case where the first connection response (CANS) is received in step R68, the process proceeds to step R69. Otherwise, the process returns to step R67.

In step R69, reception of the second connection response (CANS) is checked.

The second connection response (CANS) includes the tip detection information 72, which indicates that touch-up is performed. In a case where the received connection response (CANS) includes the tip detection information 72, which indicates that touch-up is performed, it is determined that the connection response (CANS) is the second connection response (CANS). In a case where the second connection response (CANS) is received in step R70, the process proceeds to step R41. Otherwise, the process returns to step R69.

Since the second connection response (CANS) corresponding to the touch-up is received in step R41, the connection is established with the information processing device TE, and the device identification information (TEID) included in the second connection response (CANS) is stored in storage unit 70 as the connection device information (TEID) 78 in the same manner as illustrated in FIG. 13. Thereafter, the process returns to step R31. Otherwise, the process may end.

Hereinabove, the process of switching connection on the side of the input pen according to the third example has been described.

The process of switching connection in the information processing device TE of FIG. 18 is a process executed in the information processing device TE that the user desires to use the input pen PEN from now on.

The user possess the input pen P1, moves to the information processing device TE3 that the user desires to use from now on, touches (touch-down) the input pen P1 to the touch panel of the information processing device TE3 as illustrated in FIG. 29C, and performs an operation (touch-up) of separating the input pen P1 as illustrated in FIG. 29D.

In the process of switching connection in the information processing device TE of FIG. 18, first, in step S61, a touch-down flag DF is reset (for example, is set to 0), and a touch-up flag UF is reset (for example, is set to 0).

The touch-down flag DF is a flag which indicates that the input pen P1 touches (touch-down) the information processing device TE. For example, in a case where the input pen P1 does not touch (touch-down) the information processing device TE, the touch-down flag DF is set to 0. In a case where the input pen P1 touches (touch-down) the information processing device TE, the touch-down flag DF is set to 1.

The touch-up flag UF is a flag which indicates that the touch release (touch-up) is performed on the input pen P1 from the information processing device TE. For example, in a case where the touch release (touch-up) is not performed, the touch-up flag UF is set to 0. In a case where the touch release (touch-up) is performed, the touch-up flag UF is set to 1.

In step S62, reception of the connection request (CREQ) is checked.

In a case where the connection request (CREQ) is received, the tip detection information 72 included in the connection request (CREQ) is recognized, and the first connection request or the second connection request is determined.

In a case where the tip detection information 72 indicates that touch-down is performed, it is determined that the first connection request is received. In addition, in a case where the tip detection information 72 indicates that touch-up is performed, it is determined that the second connection request is received.

In a case where the first connection request (CREQ) is received in step S63, the process proceeds to step S64. Otherwise, the process proceeds to step S67.

In a case where the second connection request (CREQ) is received in step S67, the process proceeds to step S68. Otherwise, the process proceeds to step S82 of FIG. 21.

In step S64, a process of recognizing pen touch (touch-down) in the case where the first connection request (CREQ) is received is performed. Here, it is checked whether or not the input pen PEN touches (touch-down) the information processing device TE. In a case where it is detected that touch-down is performed, the first connection response (CANS) is transmitted, and the touch-down flag DF is set to 1 indicative of touch (touch-down).

Details of the process will be illustrated in FIG. 19 which will be described later.

In step S68, a process of recognizing the pen touch release (touch-up) in a case where the second connection request (CREQ) is received is performed. Here, it is checked whether or not touch release (touch-up) of the input pen PEN from the information processing device TE is performed. In a case where it is detected that touch-up is performed, the second connection response (CANS) is transmitted, and the touch-up flag UF is set to 1 indicative of touch release (touch-up).

Details of the process will be illustrated in FIG. 20 which will be described later.

Subsequent to step S64, in step S65, it is checked whether the touch-down flag DF is set to 1 indicative of touch (touch-down).

In a case where the touch-down flag DF is set to 1, the process returns to step S62. Otherwise, the process proceeds to step S66.

In step S66, a connection error notification is provided in the same manner as in step S49 of FIG. 14. Thereafter, the process returns to step S61. However, the process in step S66 may be omitted.

Subsequent to step S68, in step S69, it is checked whether or not the touch-down flag DF is set to 1 indicative of touch (touch-down), and, furthermore, the touch-up flag UF is se to 1 indicative of touch release (touch-up) is performed.

A case where both the touch-down flag DF and the touch-up flag UF are set to 1 means that the touch-down operation and the touch-up operation illustrated in FIGS.

29C and 29D are performed. That is, the case means that, since it is recognized that the operation of switching connection according to the third example is performed, the connection is established between the input pen PEN and the information processing device TE.

The case where both the touch-down flag DF and the touch-up flag UF are set to 1, the process proceeds to step S47. Otherwise, the process proceeds to step S66. In step S47, the pen identification information (PENID) of the connected input pen PEN is stored. Thereafter, the process returns to step S61.

Meanwhile, it is preferable that the recognition process relevant to reception of the first connection request in step S64 and the recognition process relevant to reception of the second connection request in step S68 are processed in parallel such that an erroneous operation due to shift in reception timing and an abnormal state, such as connection abnormality, are not generated.

Figure 19:
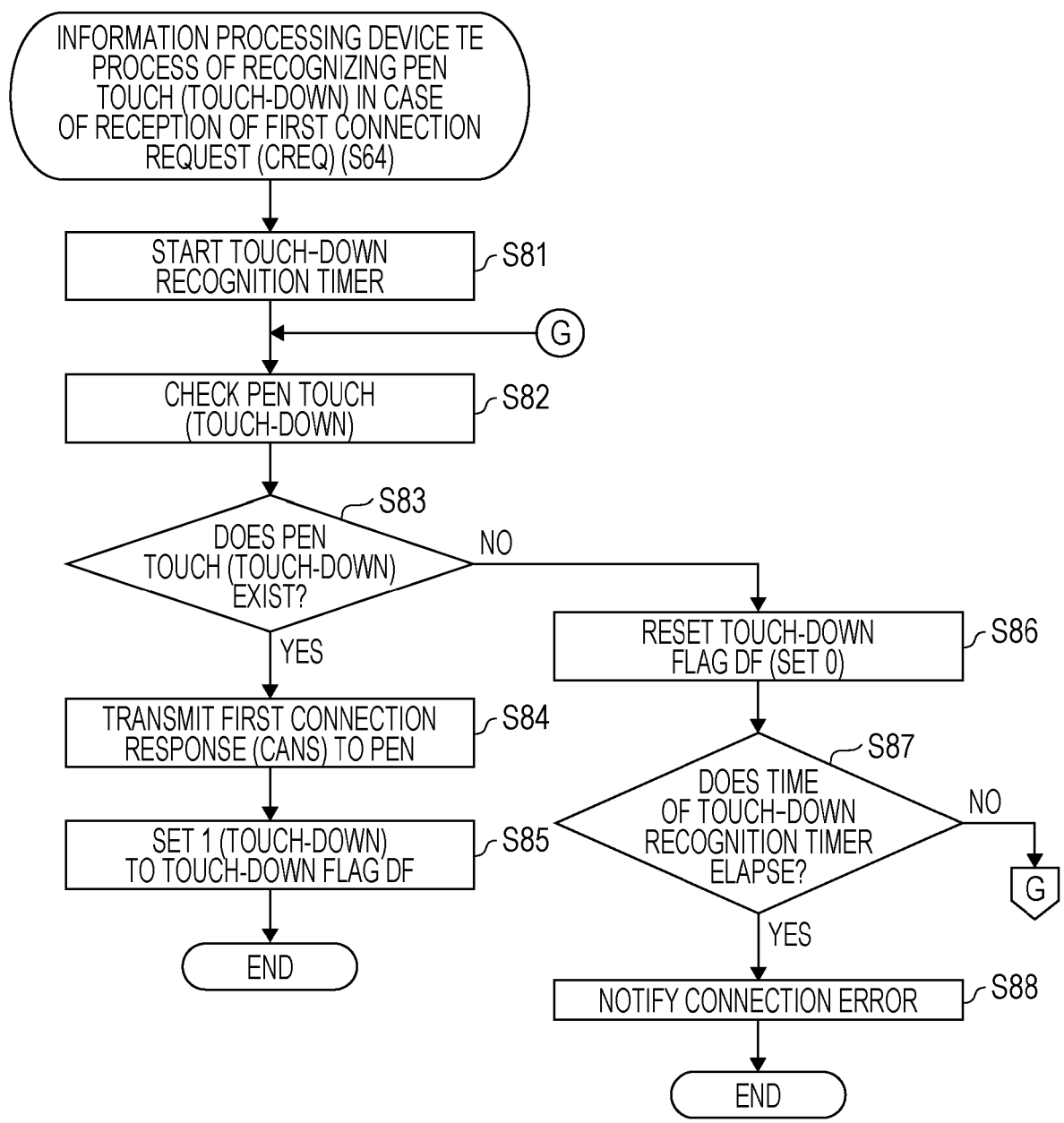
FIG. 19 is a flowchart illustrating a process of recognizing pen touch in the third example of the process of switching connection of the input pen according to the present disclosure.

FIG. 19 is a flowchart illustrating details of a process (step S64) of recognizing pen touch (touch-down) in the case where the first connection request (CREQ) is received in the third example of the process of switching connection of the input pen according to the present disclosure.

In step S81, a touch-down recognition timer starts.

The touch-down recognition timer measures time in which the pen touch (touch-down) is recognized.

In step S82, it is checked whether or not the pen touch (touch-down) exists.

In step S83, in a case where the pen touch (touch-down) exists, the process proceeds to step S84. Otherwise, the process proceeds to step S86.

In step S84, the first connection response (CANS) is transmitted to input pen PEN.

In step S85, the touch-down flag DF is set to 1 indicative of touch (touch-down), and the process ends.

In step S86, the touch-down flag DF is reset.

In a case where time which is set in the touch-down recognition timer elapses in step S87, the process proceeds to step S88. Otherwise, the process returns to step S82.

In step S88, a connection error notification is provided in the same manner as in step S49 of FIG. 14. Thereafter, the process ends. However, the process in step S88 may be omitted.

Figure 20:
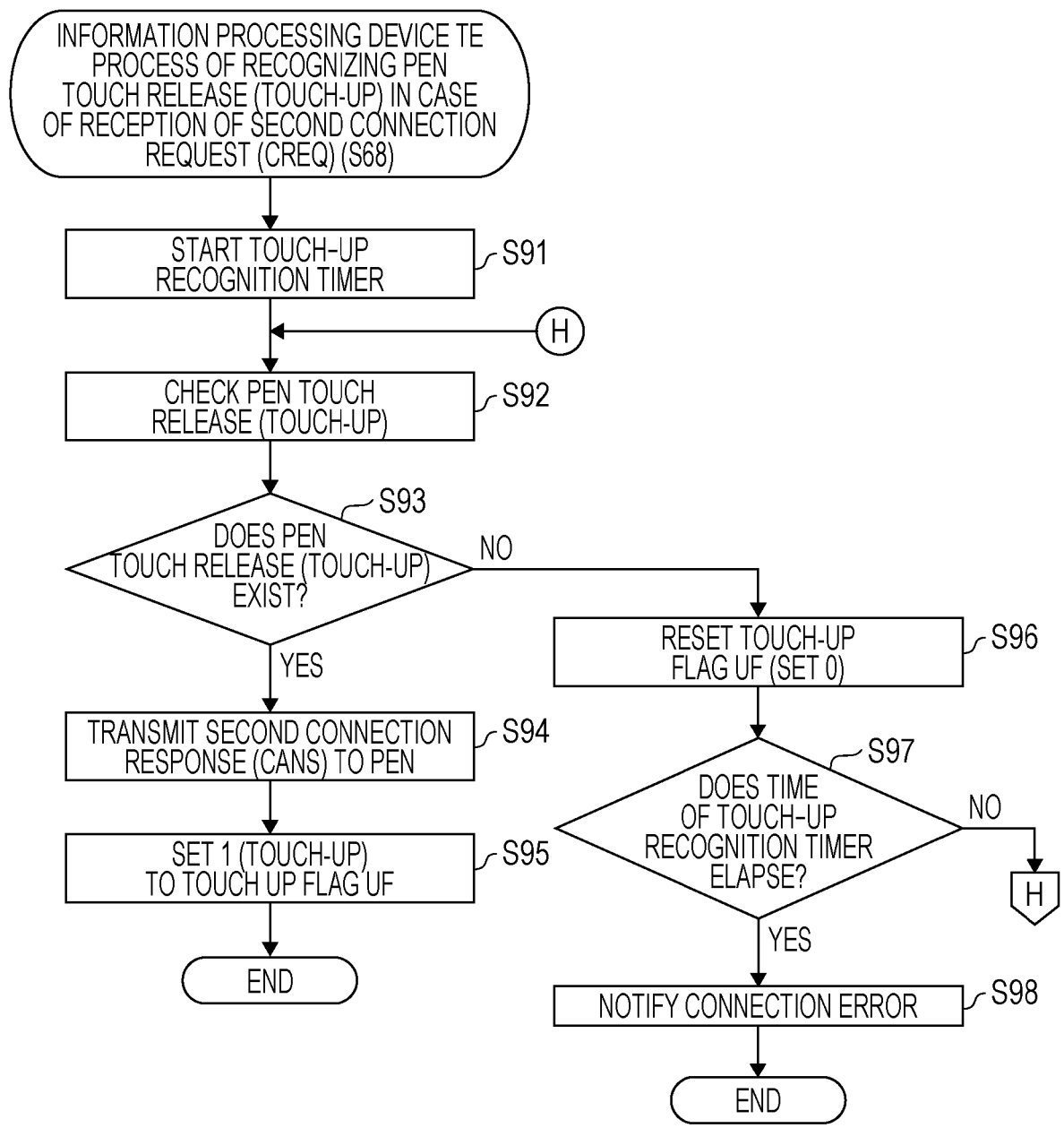
FIG. 20 is a flowchart illustrating a process of recognizing release of the pen touch in the third example of the process of switching connection of the input pen according to the present disclosure.

FIG. 20 is a flowchart illustrating details a process (step S68) of recognizing pen touch release (touch-up) in a case where the second connection request (CREQ) is received in the third example of the process of switching connection of the input pen according to the present disclosure.

In step S91, a touch-up recognition timer starts.

The touch-up recognition timer measures time in which the pen touch release (touch-up) is recognized.

In step S92, it is checked whether or not pen touch release (touch-up) exists.

In a case where the pen touch release (touch-up) exists in step S93, the process proceeds to step S94. Otherwise, the process proceeds to step S96.

In step S94, the second connection response (CANS) is transmitted to the input pen PEN.

In step S95, the touch-up flag UF is set to 1 indicative of the touch release (touch-up), and the process ends.

In step S96, the touch-up flag UF is reset.

In a case where time which is set in the touch-up recognition timer elapses in step S97, the process proceeds to step S98. Otherwise, the process returns to step S92.

In step S98, a connection error notification is provided in the same manner as in step S49 of FIG. 14. Thereafter, the process ends. However, the process in step S98 may be omitted.

Figure 21:
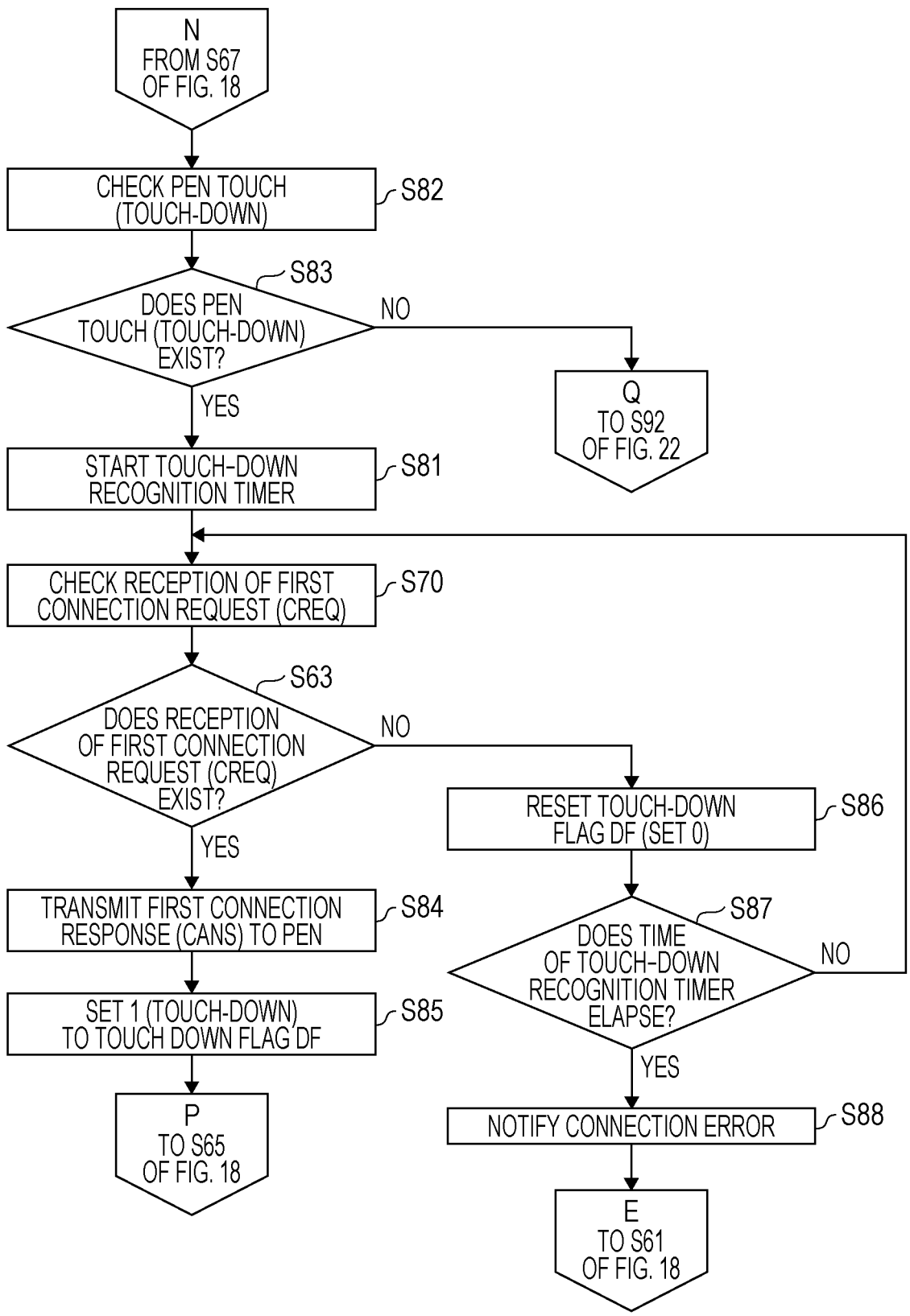
FIG. 21 is a flowchart illustrating the third example of the process of switching connection of the input pen in the information processing device according to the present disclosure.

In a case where the process proceeds from step S67 in FIG. 18 to step S82 in FIG. 21, the first connection request (CREQ) is not received. Therefore, before the first connection request (CREQ) is received, first, it is checked whether or not the pen touch (touch-down) exists. In addition, in a case where the pen touch (touch-down) exists, it is checked again whether or not the reception of the first connection request (CREQ) exists within the predetermined time.

In step S82 of FIG. 21, it is checked whether or not the pen touch (touch-down) exists. In a case where the pen touch (touch-down) exists in step S83, the process proceeds to step S81. Otherwise, the process proceeds to step S92 of FIG. 22.

In step S81, the touch-down recognition timer starts.

In step S70, the reception of the first connection request (CREQ) is checked.

In a case where the first connection request (CREQ) is received in in step S63, the process proceeds to step S84. Otherwise, the process proceeds to step S86.

In step S84, the first connection response (CANS) is transmitted to the input pen PEN, and, in step S85, the touch-down flag DF is set to 1 indicative of touch (touch-down) in the same manner as in FIG. 19. Thereafter, the process proceeds to step S65 of FIG. 18.

In step S86, the touch-down flag DF is reset in the same manner as in FIG. 19.

In a case where time which is set in the touch-down recognition timer elapses in step S87, the process proceeds to step S88. Otherwise, the process returns to step S70.

In step S88, the connection error notification is provided in the same manner as in step S49 of FIG. 14. Thereafter, the process proceeds to step S61 of FIG. 18.

Figure 22:
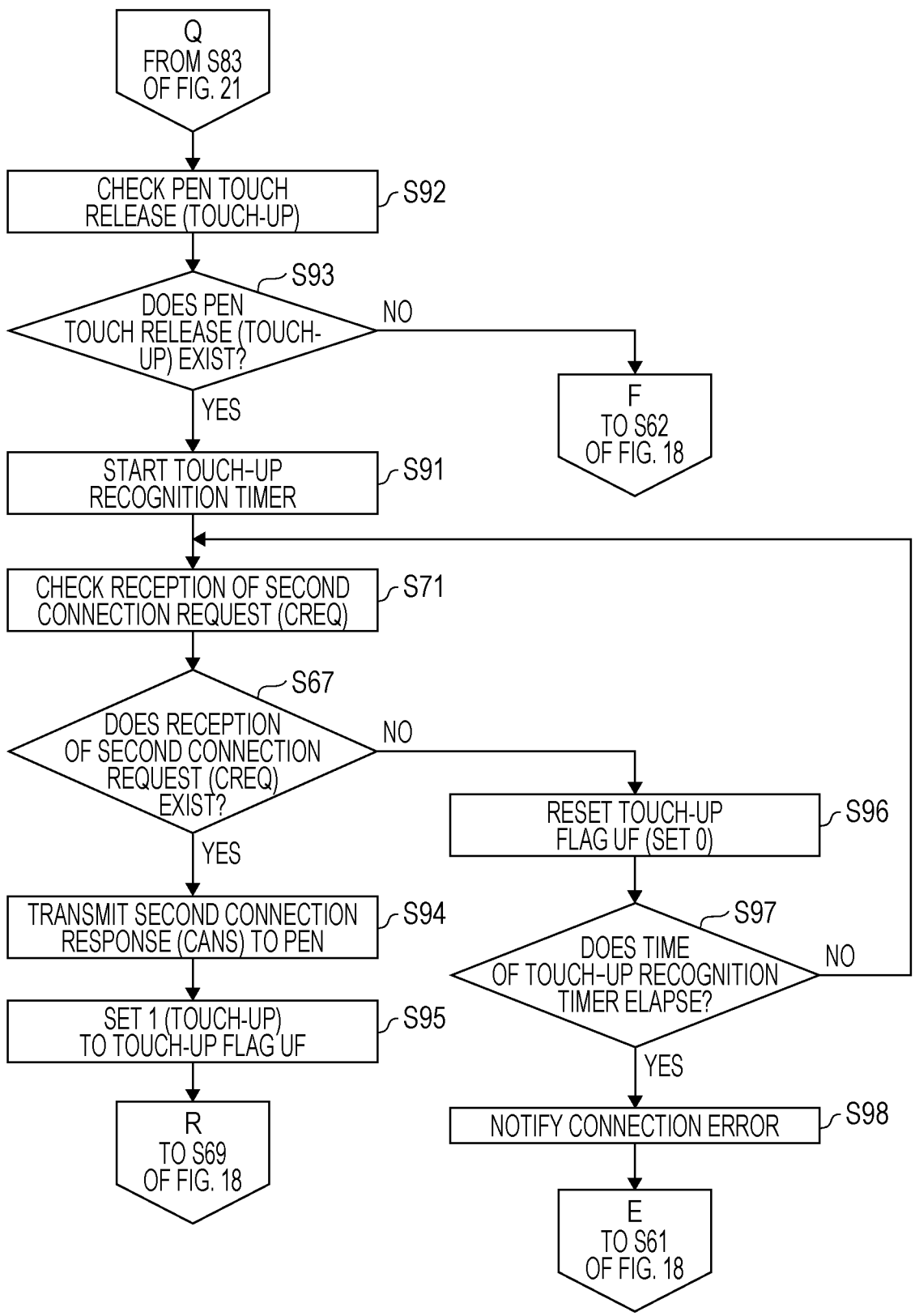
FIG. 22 is a flowchart illustrating the third example of the process of switching connection of the input pen in the information processing device according to the present disclosure.

In a case where the process proceeds from step S83 of FIG. 21 to step S92 of FIG. 22, the second connection request (CREQ) is not received. Therefore, before the second connection request (CREQ) is received, it is checked first whether or not the pen touch release (touch-up) exists. In addition, in a case where the pen touch release (touch-up) exists, it is checked whether or not reception of the second connection request (CREQ) exists again within the predetermined time.

In step S92 of FIG. 22, it is checked whether or not the pen touch release (touch-up) exists. In a case where the pen touch release (touch-up) exists in step S93, the process proceeds to step S91. Otherwise, the process proceeds to step S62 of FIG. 18.

In step S91, the touch-up recognition timer starts.

In step S71, the reception of the second connection request (CREQ) is checked.

In a case where the second connection request (CREQ) is received in in step S67, the process proceeds to step S94. Otherwise, the process proceeds to step S96.

In step S94, the second connection response (CANS) is transmitted to the input pen PEN, and, in step S95, the touch-up flag UF is set to 1 indicative of touch release (touch-up) in the same manner as in FIG. 20. Thereafter, the process proceeds to step S69 of FIG. 18.

In step S96, the touch-up flag UF is reset in the same manner as in FIG. 20.

In a case where the time which is set in the touch-up recognition timer elapses in step S97, the process proceeds to step S98. Otherwise, the process returns to step S71.

In step S98, the connection error notification is provided in the same manner as in step S49 of FIG. 14. Thereafter, the process proceeds to step S61 of FIG. 18.

Hereinabove, the process of switching connection on the side of the information processing device in the third example is described.

Figure 29E:
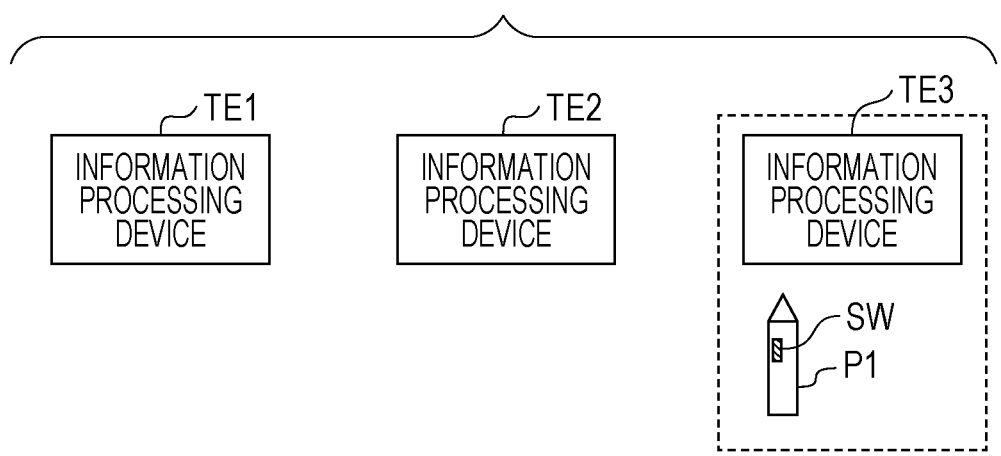

As described above, in a case where the process of switching connection in FIGS. 17 to 22 is performed, the connection between the input pen P1 and the information processing device TE1 is released, the input pen P1 and the information processing device TE3 are connected, and thus the input pen P1 can be used in the information processing device TE3, as illustrated in FIG. 29E.

Here, in a case where the user performs the operation of switching connection of FIG. 29B and the touch operation (touch-down) and the touch release operation (touch-up) of FIGS. 29C and 29D in the information processing device TE that the user desires to use from now on, the process of switching connection is performed, and thus, it is possible to rapidly perform the process of switching connection. Furthermore, the input operation of displaying the switch display screen or the like is not performed, and thus it is possible to reduce operational loads of the user.

Process of Switching Connection to Input Pen: Fourth Example

Figure 23:
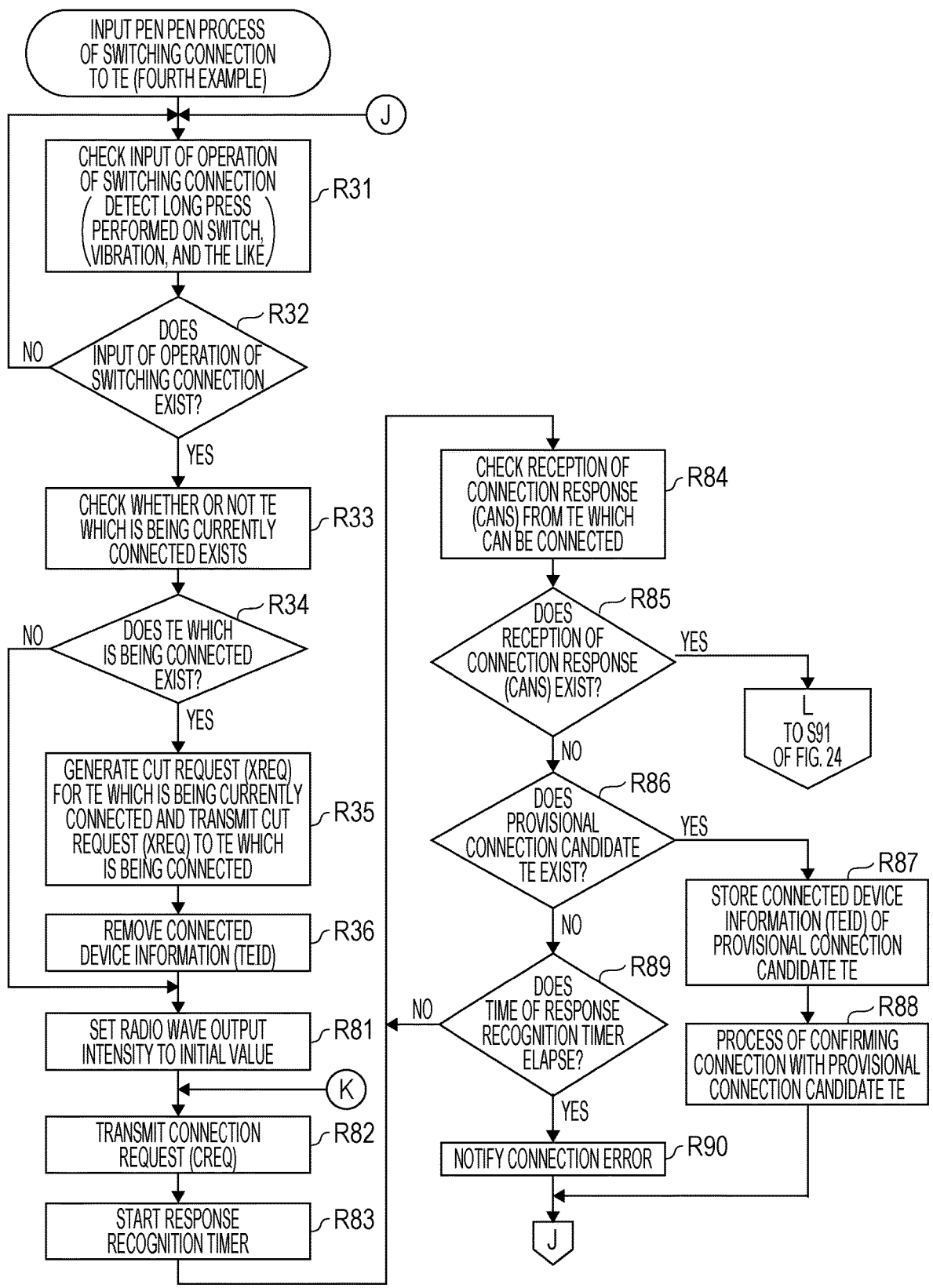
FIG. 23 is a flowchart illustrating a fourth example of the process of switching connection of the information processing device in the input pen according to the present disclosure.
Figure 24:
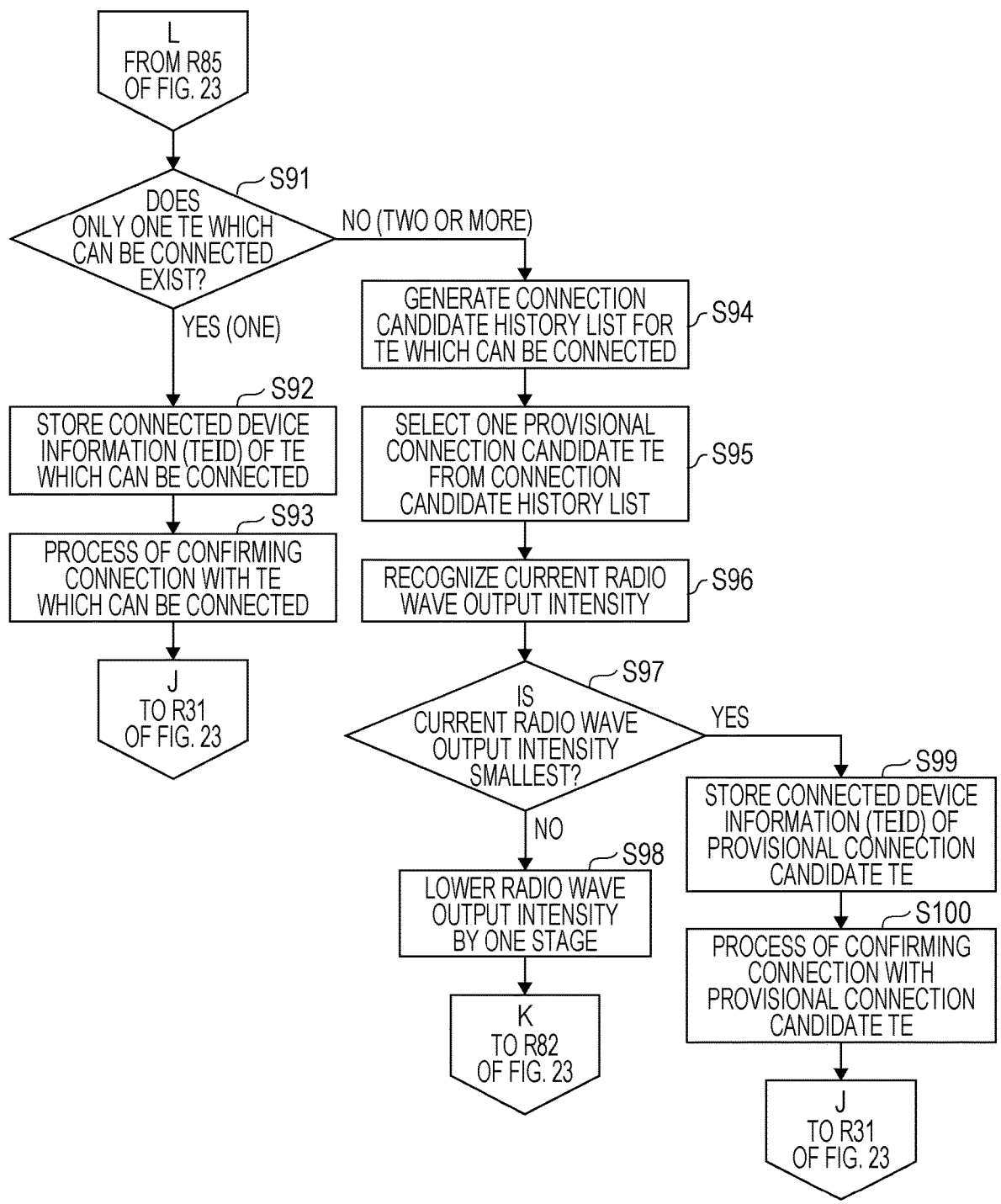
FIG. 24 is a flowchart illustrating the fourth example of the process of switching connection of the information processing device in the input pen according to the present disclosure.

FIGS. 23 and 24 are flowcharts illustrating a fourth example of the process of switching connection of the information processing device TE in the input pen according to the present disclosure.

Figure 25:
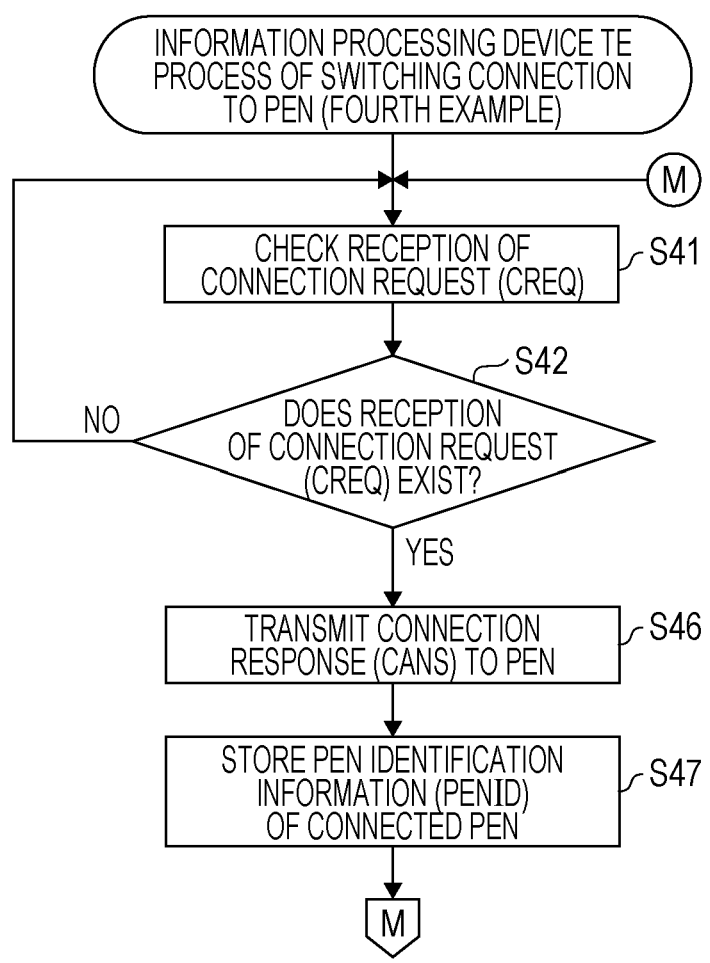
FIG. 25 is a flowchart illustrating the fourth example of the process of switching connection of the input pen in the information processing device according to the present disclosure.

FIG. 25 is a flowchart illustrating the fourth example of the process of switching connection of the input pen PEN in the information processing device according to the present disclosure.

The process of switching connection corresponds to the process of the fourth example illustrated in FIG. 6.

In steps below, the same step numbers are given in a case where processes which are the same as the processes illustrated in FIG. 13 or the like are performed.

In addition, FIGS. 30A to 30E are schematic explanatory diagrams illustrating the operation performed by the user in the fourth example.

Figure 30A:
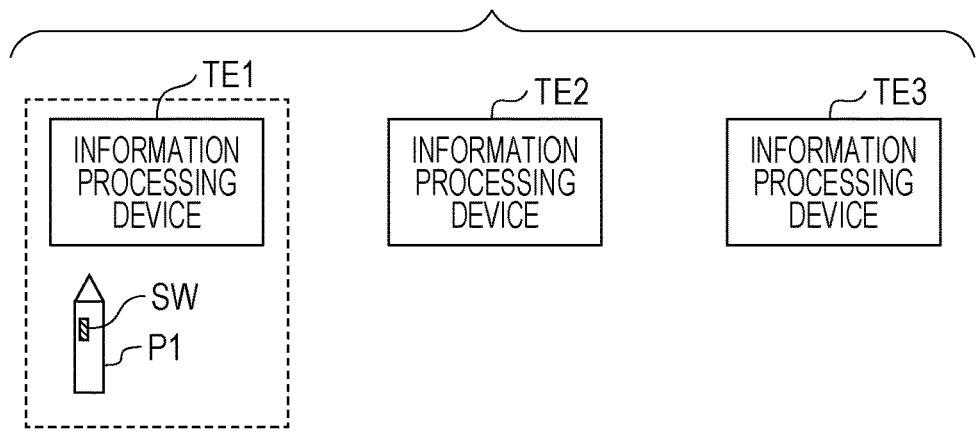
FIGS. 30A to 30E are schematic explanatory diagrams illustrating a user operation in a fourth example of the process of switching connection of the input pen according to the present disclosure.

Here, for example, as illustrated in FIG. 30A, it is assumed that the input pen P1 and the information processing device TE1 are in the connection state.

Figure 30B:
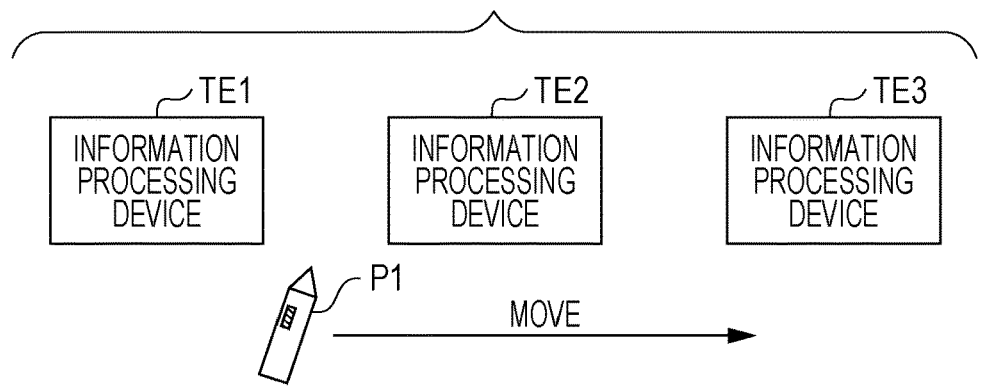

In a case where the user desires to switch connection of the input pen, first, the user possesses the input pen P1, and moves in a direction of the information processing device TE3 desired to be used as illustrated in FIG. 30B.

Figure 30C:
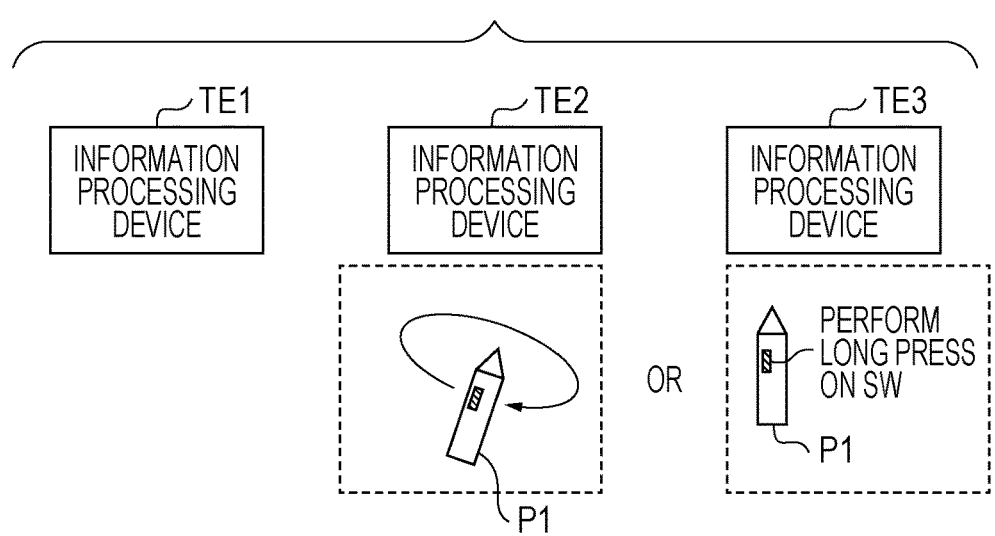

Subsequently, in the same manner as the first example, the user performs the operation of switching connection as illustrated in FIG. 30C on the input pen P1. The user performs long press on the switch SW of the input pen P1 or vibrates the input pen P1.

Figure 30D:
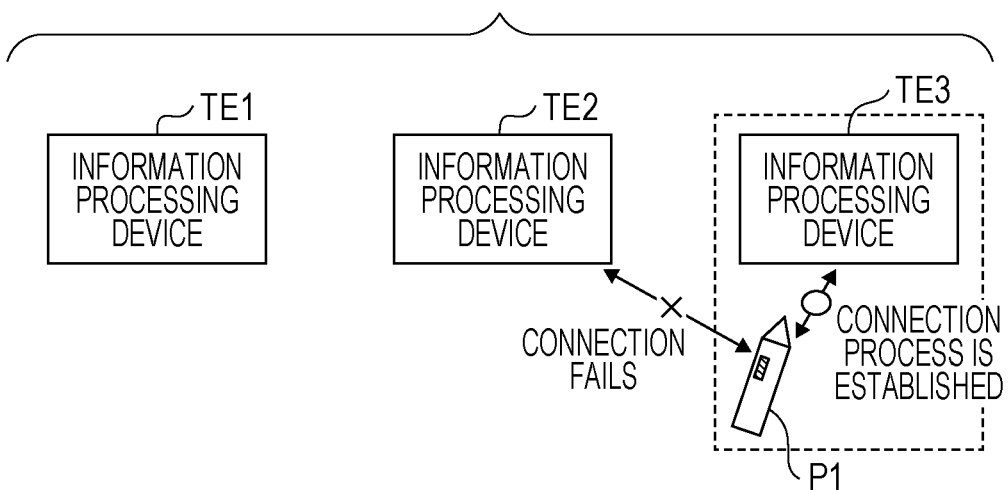

Furthermore, as illustrated in FIG. 30D, the user causes the input pen P1 to approach the information processing device TE3 desired to be used as close as possible. However, it is not desired to cause the input pen P1 to touch the information processing device TE3.

Figure 30E:
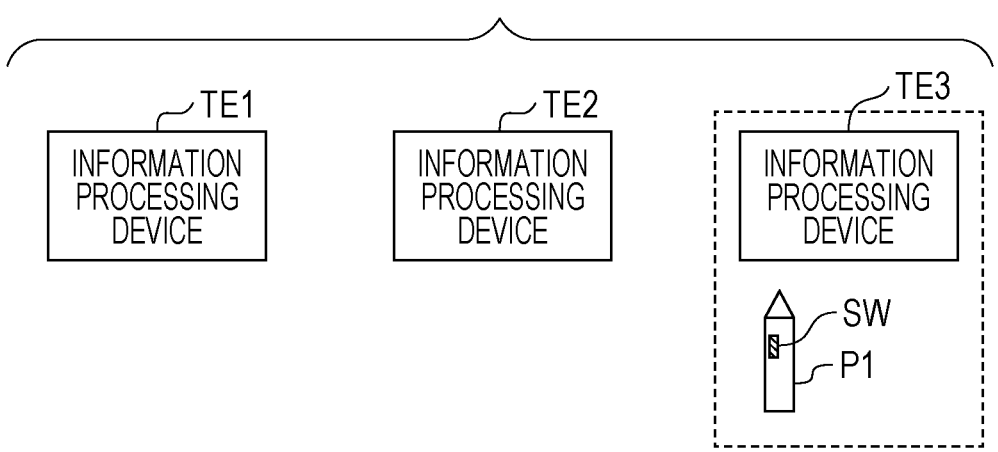

In a case where, in a state in which the input pen P1 is caused to approach the information processing device TE3, intensity of the radio waves transmitted from the input pen P1 is adjusted and a process of connection establishment only between the input pen P1 and the information processing device TE3 is established, the input pen P1 can be used in the information processing device TE3 as illustrated in FIG. 30E.

In the process of switching connection in the input pen PEN of FIG. 23, first, processes which are the same as in steps R31 to R36 illustrated in FIG. 13 are performed.

That is, the input of the operation of switching connection is checked and the process of connection release from the information processing device TE which is being connected is performed.

Subsequent to step R36, in step R81, the radio wave output intensity of a wireless signal output from the input pen PEN is set to an initial value. For example, the radio wave output intensity is set to a predetermined maximum value.

In step R82, the connection request (CREQ) is transmitted.

In step R83, the response recognition timer starts in the same manner as in step R38.

In step R84, the reception of the connection response (CANS) transmitted from TE which can be connected is checked.

In a case where the radio wave output intensity of the connection request (CREQ) is large, there is a case where a plurality of information processing devices TE which can receive the connection request (CREQ) exist around the input pen PEN. In this case, connection responses (CANS) are transmitted from the plurality of information processing devices TE which received the connection request (CREQ), that is, there is a case where one connection response (CANS) is received and there is a case where a plurality of connection responses (CANS) are received.

Here, it is assumed that all the received connection responses (CANS) are received.

In a case where the reception of the connection response (CANS) exists in step R85, the process proceeds to step R91 of FIG. 24. In a case where the connection response (CANS) is not received at all, the process proceeds to step R86.

In a case where one connection response (CANS) is received in step R91 of FIG. 24, that is, in a case where there is only one information processing device TE which can be connected, the process proceeds to step R92.

In contrast, in a case where two or more connection responses (CANS) are received, that is, two or more information processing devices TE which can be connected exist, the process proceeds to step R94.

In step R92, only one information processing device TE which can be connected exists. Therefore, TE to be connected is determined to the information processing device TE which transmitted the connection response (CANS), and the connection device information (TEID) of the information processing device TE which can be connected is stored.

In step R93, a process of confirming connection with the information processing device TE which can be connected is performed.

For example, a confirmation request and a confirmation response which are not illustrated in the drawing may be transmitted and received, and communication setting information, such as pen setting data and passwords used thereafter, may be transmitted and received. Otherwise, the connection request including the pen setting data may be transmitted.

Thereafter, the process returns to step R31 of FIG. 23 or the process ends.

In step R94, since two or more information processing devices TE which can be connected exist, a connection candidate history list including a plurality of information processing devices TE which can be connected is generated in order to determine the information processing device TE to be connected.

In the connection candidate history list, the information processing devices TE may be arranged, for example, in order of new information processing device TE in time in which the connection response (CANS) is received.

In step R95, one provisional connection candidate TE is selected from the connection candidate history list. A method of selecting the provisional connection candidate TE is not particularly limited and arbitrary information processing device TE may be selected. A provisional connection candidate TE at the top of the connection candidate history list or the newest information processing device TE in time in which the connection response (CANS) is received may be selected.

In step R96, currently set radio wave output intensity is read, and it is recognized whether or not the current radio wave output intensity is in a predetermined minimum level.

In a case where the currently set radio wave output intensity is in the minimum level in step R97, the process proceeds to step R99. In a case where the currently set radio wave output intensity is not in the minimum level, the process proceeds to step R98.

In step R98, the radio wave output intensity is lowered by one stage. In a case where the radio wave output intensity is lowered by one stage, a range at which the wireless signal arrives becomes narrow, and thus it is possible to narrow down the information processing device TE which can be connected.

Thereafter, the process returns to step R82 of FIG. 23, the processes subsequent to step R82 are performed again.

In step R99, since the currently set radio wave output intensity is already at the minimum level in which it is not possible to lower the radio wave output intensity anymore, the information processing device TE, which is currently set to the provisional connection candidate TE, is set to a device to be connected. Here, the connection device information (TEID) of the provisional connection candidate TE is stored in the storage unit 70.

In step R100, a process of confirming connection of the provisional connection candidate TE is performed. Here, a process which is the same as in step R93 may be performed.

Thereafter, the process returns to step R31 of FIG. 23 or the process ends.

in step R86 of FIG. 23, it is checked whether or not all of the provisional connection candidates TE are selected. In a case where the provisional connection candidate TE exists, the process proceeds to step R87. In a case where the provisional connection candidate TE does not exist, the process proceeds to step R89.

In a case where the process proceeds to step R87, it is considered that, although the provisional connection candidate TE is set, the radio wave output intensity is too much lowered thereafter, and thus it is difficult to receive the connection response (CANS).

Here, in step R87, in order to set the information processing device TE, which is set as the provisional connection candidate TE, as a device to be connected, the connection device information (TEID) of the provisional connection candidate TE is stored in the storage unit 70.

In step R88, a process of confirming connection of the provisional connection candidate TE is performed. Here, a process which is the same as in step R93 may be performed.

Thereafter, the process returns to step R31 of FIG. 23 or the process ends.

In a case where the time which is set in the response recognition timer elapses in step R89, the process proceeds to step R90. In a case where the time does not elapse, the process returns to step R84.

In step R90, a connection error notification is provided in the same manner as in step R43 of FIG. 13. However, the process in step R90 may be omitted.

Thereafter, the process returns to step R31 of FIG. 23 or the process ends.

Hereinabove, a process of switching connection on the side of the input pen in the fourth example is described.

A process of switching connection in the information processing device TE illustrated in FIG. 25 is a process performed in the information processing device TE which can receive the connection request (CREQ) transmitted from the input pen PEN.

As illustrated in FIG. 30B, the user possesses the input pen P1 and moves to the information processing device TE3 that the user desires to use from now on. In a case where the radio wave output intensity of a wireless signal transmitted from the input pen P1 is large, there is a possibility that the process of switching connection is performed in a plurality of information processing devices TE.

In a process of switching connection in the information processing device TE of FIG. 25, first, step S41 illustrated in FIG. 14 is performed. Thereafter, processes which are the same as in steps S42, S46, and S47 illustrated in FIG. 14 are performed.

That is, in a case where the reception of the connection request (CREQ) is checked and the connection request (CREQ) is received, the connection response (CANS) is transmitted, and the pen identification information (PENID) of the connected pen is stored.

Hereinabove, the process of switching connection on the side of the information processing device in the fourth example is described.

As described above, in a case where the processes of switching connection of FIGS. 23 to 25 are performed, the connection between the input pen P1 and the information processing device TE1 is released, the input pen P1 is connected to the information processing device TE3, and the input pen P1 can be used in the information processing device TE3, as illustrated in FIG. 30E.

In this case, as illustrated in FIG. 30B, the user possesses the input pen P1, moves in the direction of the information processing device TE3 that the user desires to use from now on, and performs the operation of switching connection illustrated in FIG. 30C. Thereafter, as illustrated in FIG. 30D, in a case where the operation of causing the input pen P1 to approach the information processing device TE3 is performed, the process of switching connection is performed, and thus it is possible to rapidly perform the process of switching connection. Furthermore, the input operation of displaying the switch display screen or the like is not performed, and thus it is possible to reduce operational loads of the user. Also, after the connection is established, the radio wave intensity returns to an initial value (intensity value at which it is possible to perform sufficient communication), and thus convenience is not lowered due to deterioration in communication qualities during use.

The present disclosure contains subject matter related to that disclosed in Japanese Priority Patent Application JP 2017-26172 filed in the Japan Patent Office on Feb. 15, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system which comprises an input pen and an information processing device and inputs information using the input pen,
wherein the input pen includes
switching operation detection circuitry that detects an operation of switching connection between the input pen and the information processing device,
touch detection circuitry that detects whether or not the input pen is in a state in which the input pen touches the information processing device,
a storage that stores predetermined information, and
device connection control circuitry that controls connection with the information processing device,
communication circuitry that wirelessly transmits a connection request signal, and
radio wave output setting circuitry that sets radio wave intensity of a wireless signal output from the input pen, and
wherein the information processing device includes
a display that displays information,
a touch panel that is disposed to overlap the display and to which information of a position touched by the input pen is input,
touch information processing circuitry that detects that the input pen touches the information processing device and obtains information of a touch position, and
pen connection control circuitry that controls connection with the input pen, and
wherein, in a case where the switching operation detection circuitry detects an operation of switching connection performed by a user and the touch information processing circuitry detects that the input pen touches an information processing device within a predetermined time, the device connection control circuitry and the pen connection control circuitry wirelessly communicate a part or all of the predetermined information stored in the storage of the input pen and predetermined connection information, thereby establishing connection between the input pen and the information processing device which is touched by the input pen, and
after the switching operation detection circuitry detects a predetermined operation of switching connection performed by the user, the communication circuitry repeats transmission of the connection request signal while the radio wave output setting circuitry gradually lowers the radio wave intensity of the connection request signal, and connection is established between the input pen and the information processing device in a case where the number of information processing devices, which send a connection response signal for the connection request signal as a reply, is one.

2. The information processing system according to claim 1,
wherein the input pen further includes a switch on a side of the input pen, and
wherein, in a case where the switch is pressed equal to or longer than a predetermined time, the switching operation detection circuitry determines that the operation of switching connection between the input pen and the information processing device is performed.

3. The information processing system according to claim 1,
wherein the input pen further includes motion detection circuitry that detects a motion applied to the input pen, and
wherein, in a case where the motion detection circuitry detects a predetermined motion, it is determined that the operation of switching connection between the input pen and the information processing device is performed.

4. The information processing system according to claim 3,
wherein, in a case where the touch detection circuitry of the input pen detects a state in which the input pen touches the information processing device, the motion detection circuitry does not detect the motion, and the touch information processing circuitry of the information processing device detects that the input pen touches the information processing device for a predetermined time, it is determined that the operation of switching connection between the input pen and the information processing device is performed.

5. The information processing system according to claim 1,
wherein, in a case where a time difference between a timing, at which the information processing device receives a connection request wirelessly transmitted according to a change in a touch state of the input pen on the information processing device, which is detected by the touch detection circuitry of the input pen, and a timing, at which the touch information processing circuitry of the information processing device detects the change in the touch state of the input pen, is within a predetermined time, the device connection control circuitry and the pen connection control circuitry wirelessly communicate the predetermined connection information, thereby establishing connection between the input pen and the information processing device which is touched by the input pen.

6. The information processing system according to claim 5,
wherein the change in the touch state of the input pen on the information processing device, which is detected by the touch detection circuitry of the input pen, and the change in the touch state of the input pen, which is detected by the touch information processing circuitry of the information processing device, correspond to at least any one or both of a change in a state from non-touch to touch and a change in a state from touch to non-touch.

7. The information processing system according to claim 1,
wherein, in a case where the input pen and a predetermined information processing device are already in a connection state and the switching operation detection circuitry detects the operation of switching connection between the input pen and the information processing device, after the device connection control circuitry of the input pen performs a process of connection release from the predetermined information processing device which is already in the connection state, and when the touch detection circuitry detects that the input pen is touched with another information processing device, the device connection control circuitry of the input pen and the pen connection control circuitry of the another information processing device, which is touched by the input pen, wirelessly communicate the predetermined connection information, thereby establishing connection between the input pen and the another information processing device which is touched by the input pen.

8. The information processing system according to claim 1,
- wherein the storage of the input pen stores pen setting data relevant to drawing, and
- wherein, after the connection between the input pen and the information processing device is switched, the pen setting data is transmitted from the input pen to the information processing device, and the information processing device obtains the pen setting data and synchronizes the pen setting data of the input pen and the pen setting data of the information processing device.

9. The information processing system according to claim 8,
- wherein, in a case where the information processing device connected to the input pen transmits a setting update request, which includes newly set pen setting data, to the input pen, the input pen stores the pen setting data, which is included in the received setting update request, in the storage.

10. The information processing system according to claim 1,
- wherein the input pen includes a tip part that is a movable member installed at one end of the input pen, and
- wherein the touch detection circuitry of the input pen detects whether or not the input pen touches the information processing device based on a sliding state of the tip part.

11. The information processing system according to claim 1,
- wherein the display and the touch panel of the information processing device are formed to overlap each other.

* * * * *